(12) United States Patent
Fujiyama et al.

(10) Patent No.: US 11,002,670 B2
(45) Date of Patent: May 11, 2021

(54) DEVICE FOR OBSERVING WATER CONTENT, METHOD FOR OBSERVING WATER CONTENT, AND CULTIVATION DEVICE

(71) Applicant: PANASONIC INTELLECTUAL PROPERTY MANAGEMENT CO., LTD., Osaka (JP)

(72) Inventors: Takeshi Fujiyama, Fukuoka (JP); Yuuji Terashima, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 354 days.

(21) Appl. No.: 15/779,759

(22) PCT Filed: Oct. 21, 2016

(86) PCT No.: PCT/JP2016/004653
§ 371 (c)(1),
(2) Date: May 29, 2018

(87) PCT Pub. No.: WO2017/130249
PCT Pub. Date: Aug. 3, 2017

(65) Prior Publication Data
US 2020/0309687 A1    Oct. 1, 2020

(30) Foreign Application Priority Data

Jan. 29, 2016 (JP) .............................. JP2016-015777
Feb. 26, 2016 (JP) .............................. JP2016-036405

(51) Int. Cl.
*G01N 21/3554* (2014.01)
*A01G 25/16* (2006.01)
(Continued)

(52) U.S. Cl.
CPC ......... *G01N 21/3554* (2013.01); *A01G 25/16* (2013.01); *G01N 21/359* (2013.01);
(Continued)

(58) Field of Classification Search
CPC ........... G01N 21/3554; G01N 21/3151; G01N 21/359; G01N 21/84; G01N 21/4738; G01N 21/3155; G01N 21/8466
See application file for complete search history.

(56) References Cited

U.S. PATENT DOCUMENTS 5,001,346 A * 3/1991 Barkhoudarian ....... G01M 3/38
250/330
6,052,187 A * 4/2000 Krishnan .................. G01J 3/42
356/364
(Continued)

FOREIGN PATENT DOCUMENTS

JP     2001-272373      10/2001
WO     2001/038946 A1    5/2001

OTHER PUBLICATIONS

International Search Report (ISR) from International Searching Authority (Japan Patent Office) in International Pat. Appl. No. PCT/JP2016/004653, dated Jan. 24, 2017.
(Continued)

*Primary Examiner* — Blake C Riddick
(74) *Attorney, Agent, or Firm* — Greenblum & Bernstein, P.L.C.

(57) ABSTRACT

A first beam source radiates, as a reference beam, 905 nm of near infrared beam having a characteristic in which light tends not to be absorbed in water toward a leaf of a plant. A second beam source radiates, as a measuring beam, 1550 nm of near infrared beam having a characteristic in which light tends to be absorbed in water toward the leaf of the plant. A threshold level setter/water content index detector calculates a water content index of one leaf which is a total sum Σ Ln
(Continued)

($I_{905}/I_{1550}$) of the reflection intensity ratio. A controller displays a graph representing the time-serial change of the water content contained in the plant from the start to the end of the measurement period on a UI screen of a monitor. Further, the controller is connected to an environmental control device that controls environmental conditions surrounding the plant, and instructs the control device to change or maintain the environmental conditions based on a change of increase and decrease in the water content contained in the calculated plant.

20 Claims, 36 Drawing Sheets

(51) Int. Cl.

| | | |
|---|---|---|
| *G01N 21/3563* | (2014.01) | |
| *G01N 21/359* | (2014.01) | |
| *G01N 21/47* | (2006.01) | |
| *G01N 21/84* | (2006.01) | |

(52) U.S. Cl.
CPC ..... *G01N 21/3563* (2013.01); *G01N 21/4738* (2013.01); *G01N 21/84* (2013.01); *G01N 2021/8466* (2013.01)

(56) References Cited

U.S. PATENT DOCUMENTS

| | | | | |
|---|---|---|---|---|
| 6,646,264 B1* | 11/2003 | Modiano | ............ | G01N 21/359 250/339.07 |
| 7,660,698 B1* | 2/2010 | Seelig | ............ | G01R 33/072 702/170 |
| 8,228,504 B2 | 7/2012 | Galtie et al. | | |
| 2006/0186340 A1* | 8/2006 | Lievois | ............ | G01N 21/3554 250/339.12 |
| 2006/0208171 A1* | 9/2006 | Holland | ............ | G01N 21/64 250/221 |
| 2008/0239293 A1* | 10/2008 | Fuchigami | ............ | G01N 21/3151 356/73 |
| 2010/0182604 A1* | 7/2010 | Galtie | ............ | A01G 7/00 356/432 |
| 2011/0026029 A1* | 2/2011 | Iwasaki | ............ | G01J 3/02 356/417 |
| 2011/0047867 A1* | 3/2011 | Holland | ............ | G01J 3/36 47/1.5 |
| 2013/0111811 A1* | 5/2013 | Miyauchi | ............ | A01G 9/246 47/57.7 |
| 2013/0120753 A1* | 5/2013 | Haas | ............ | A01C 21/007 356/448 |
| 2013/0152464 A1* | 6/2013 | Groz | ............ | G01N 21/55 47/58.1 LS |
| 2015/0015697 A1* | 1/2015 | Redden | ............ | A01G 22/00 348/89 |
| 2017/0115210 A1 | 4/2017 | Fujiyama et al. | | |
| 2020/0264045 A1* | 8/2020 | Eikenberry | ............ | G01N 21/84 |

OTHER PUBLICATIONS

U.S. Appl. No. 15/525,431 to Takeshi Fujiyama et al., which was filed on May 9, 2017.
U.S. Appl. No. 16/066,216 to Takeshi Fujiyama et al., which was filed on Jun. 26, 2018.
U.S. Appl. No. 16/065,892 to Takeshi Fujiyama et al., which was filed on Jun. 25, 2018.
The Extended European Search Report from the European Patent Office (EPO) dated Oct. 29, 2018 for the related European Patent Application No. 16887838.7.
Nancy K. Okamura et al: "Nondestructive Detection of Water Stress in Tomato Plants by NIR Spectroscopy", Seibutsu Kankyo Chosetsu / Environment Control in Biology, vol. 39, No. 2, Jan. 1, 2001 (Jan. 1, 2001), pp. 75-85, XP055516288.
E. Raymond Hunt et al: "Detection of Changes in Leaf Water Content Using Near- and Middle-Infrared Reflectances", Remote Sensing of Environment., vol. 30, No. 1, Jan. 1, 1989 (Jan. 1, 1989), pp. 43-54, XP055516278.
E. Raymond Hunt et al: "Measurement of Leaf Relative Water Content by Infrared Reflectance", Remote Sensing of Environment., vol. 22, No. 3, Jan. 1, 1987 (Jan. 1, 1987), pp. 429-435, XP055516275.
H.-D. Seelig et al: "The assessment of leaf water content using leaf reflectance ratios in the visible, near-, and short-wave-infrared", International Journal of Remote Sensing, vol. 29, No. 13, Jun. 14, 2008 (Jun. 14, 2008), pp. 3701-3713, XP055516282.

* cited by examiner

FIG. 10
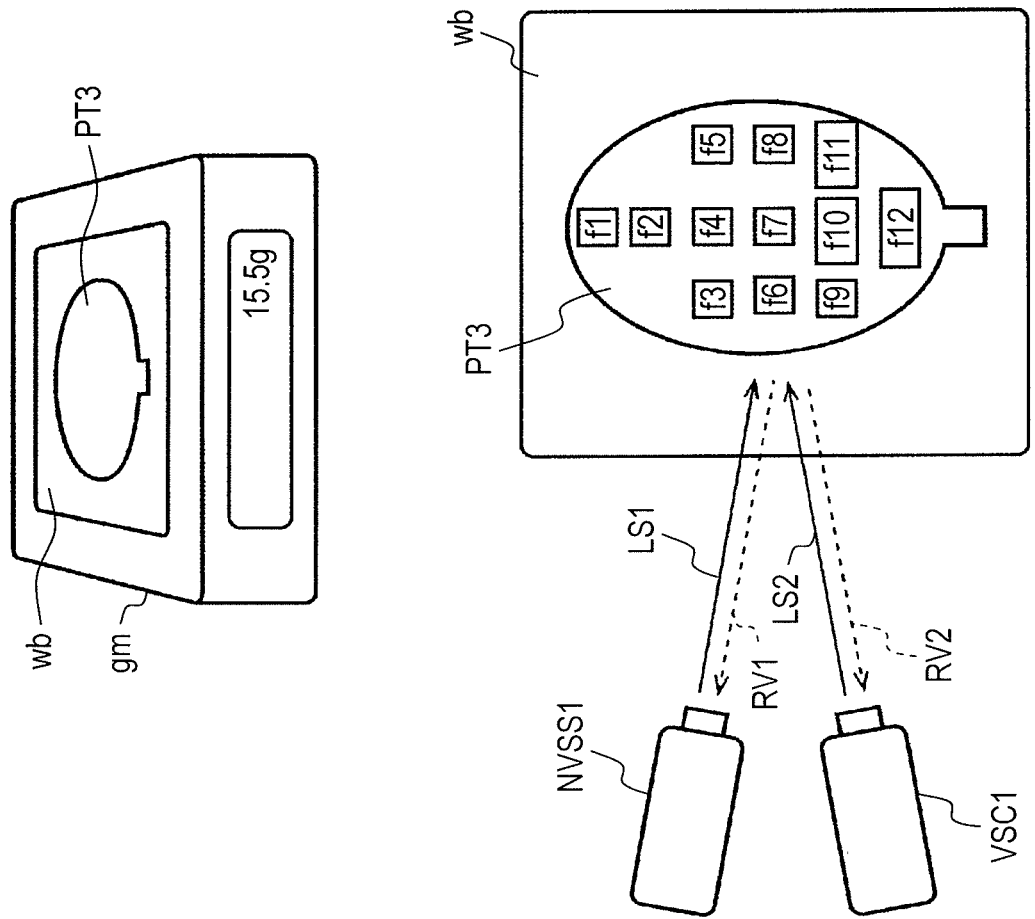
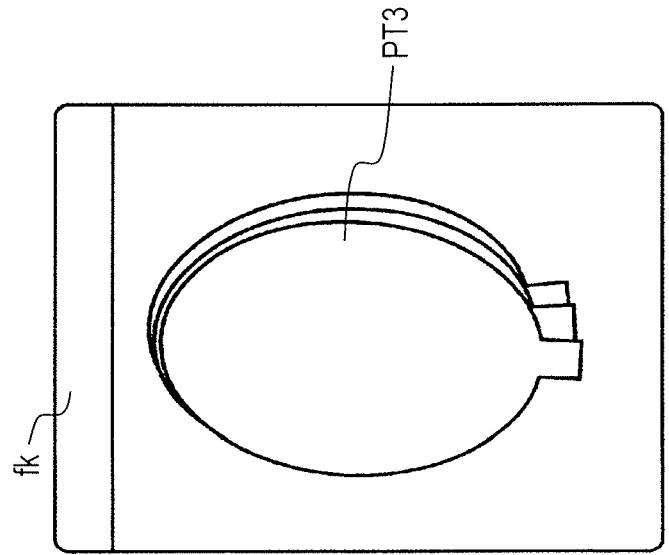

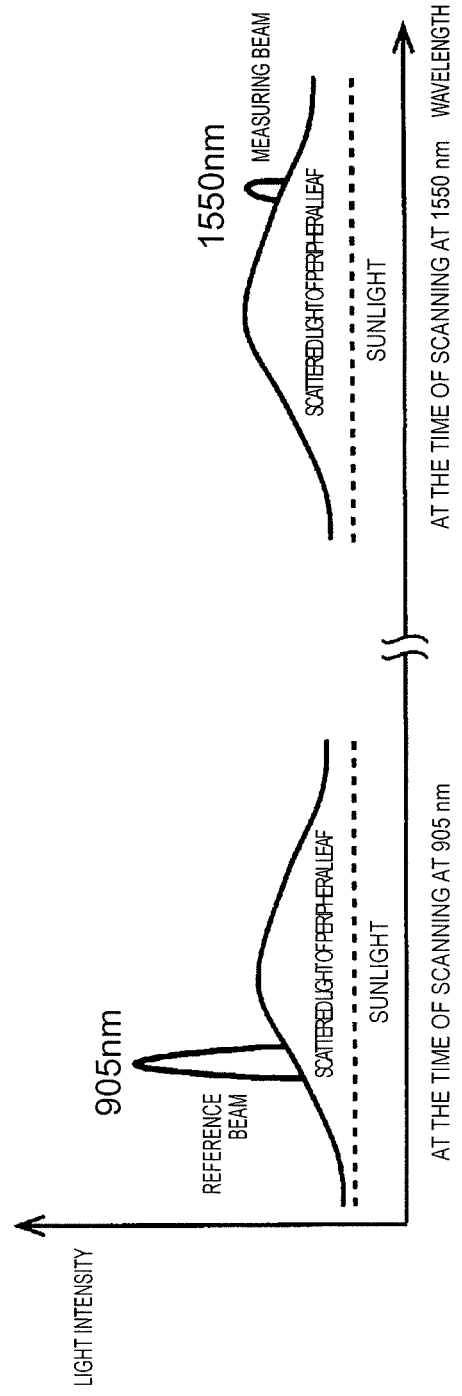

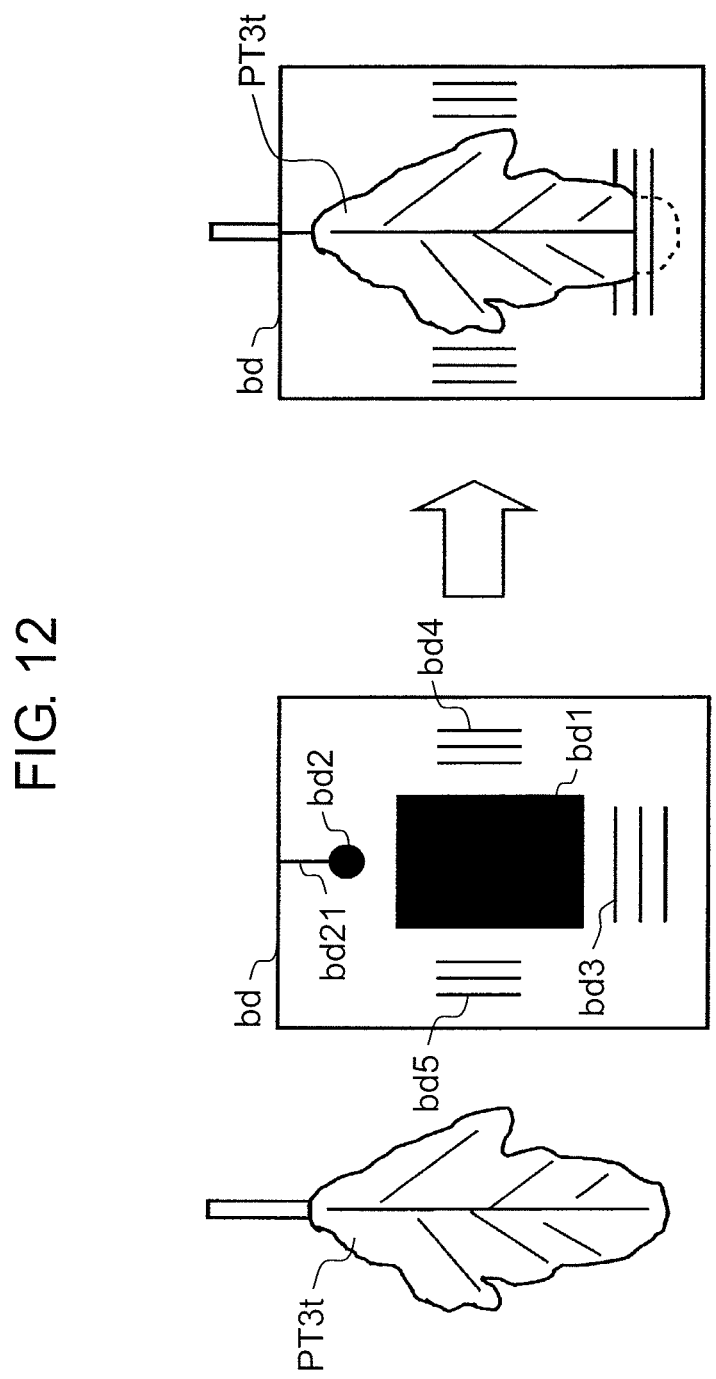

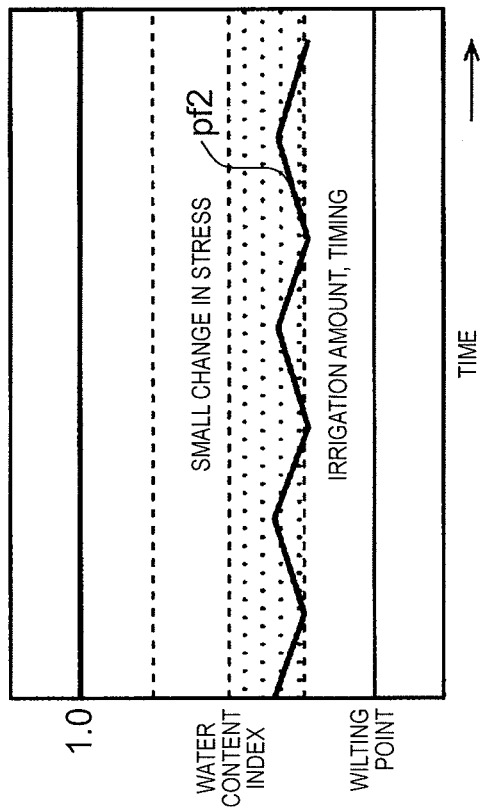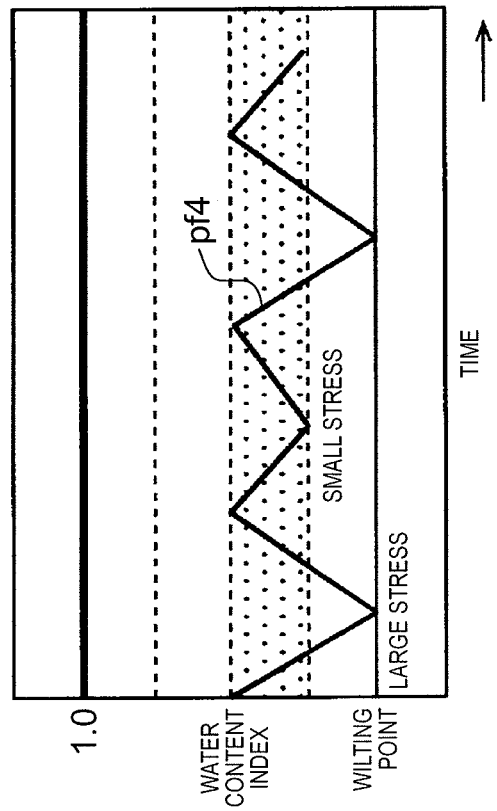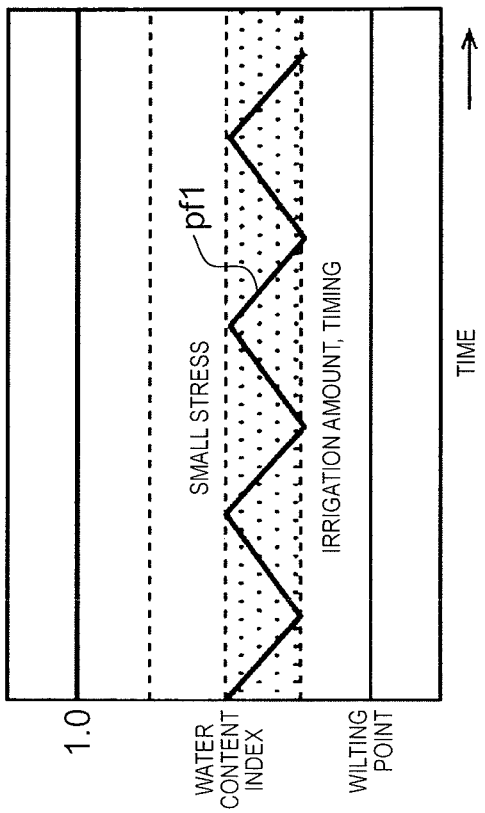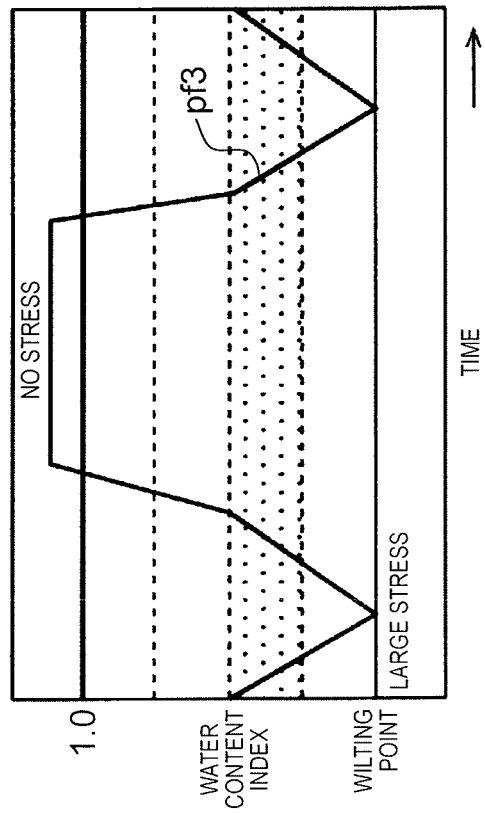

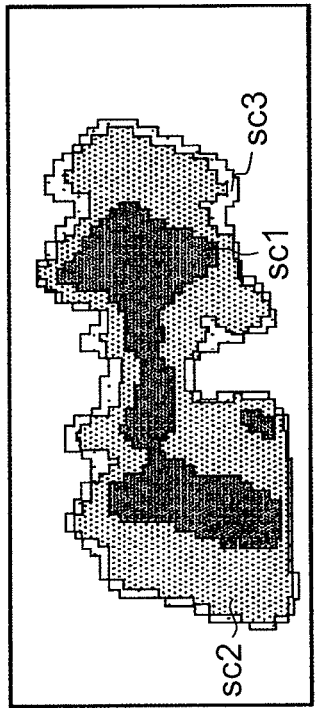
FIG. 22A BEFORE POSITIONAL DEVIATION
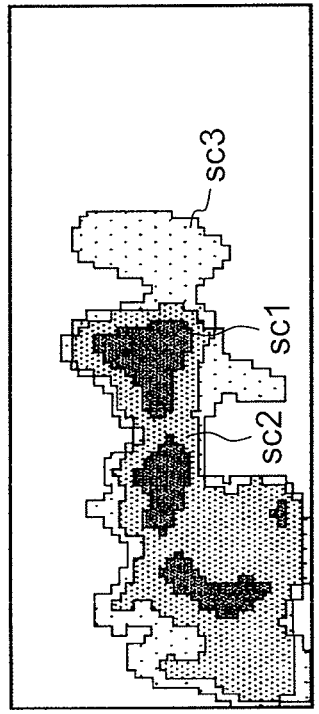
FIG. 22B AFTER POSITIONAL DEVIATION

FIG. 24

| TIME | ELAPSED TIME (MINUTE) | STANDARDIZED PIXEL AVERAGE WATER CONTENT INDEX ||
|---|---|---|---|
| | | BEFORE CORRECTION | AFTER CORRECTION |
| ⋮ | 15950 | 0.6879 | 0.6879 |
| | 15980 | 0.6586 | 0.6586 |
| | 16010 | 0.6639 | 0.6639 |
| | 16040 | 0.6674 | 0.6674 |
| | 16070 | 0.6650 | 0.6650 |
| | 16100 | 0.6593 | 0.6593 |
| | 16130 | 0.6425 | 0.6425 |
| | 16160 | 0.6503 | 0.6503 |
| | 16190 | 0.6530 | 0.6530 |
| | 16220 | 0.6416 | 0.6416 |
| 17:10 | 16250 16280 | CORRECTION OF DEVIATION ||
| 18:40 | 16310 | 0.8785 | 0.6416 |
| | 16340 | 0.8694 | 0.6350 |
| | 16370 | 0.8444 | 0.6167 |
| ⋮ | 16400 | 0.8515 | 0.6218 |
| | 16430 | 0.8524 | 0.6225 |
| | 16460 | 0.8584 | 0.6269 |
| | 16490 | 0.8647 | 0.6315 |
| | 16520 | 0.8601 | 0.6281 |
| | 16550 | 0.8400 | 0.6135 |

FIG. 33A    ref.    

DEVICE FOR OBSERVING WATER CONTENT, METHOD FOR OBSERVING WATER CONTENT, AND CULTIVATION DEVICE

TECHNICAL FIELD

The present disclosure relates to a device for observing water content which observes water content contained in a plant, a method for observing water content, and a cultivation device.

BACKGROUND ART

There is a potential difference inside and outside of a cell in a normal plant and electromotive force is generated. It is possible to describe a mechanism which generates such electromotive force based on, for example, an electrophysiological model of an axial organ of a higher plant. In particular, various methods are suggested in which a state of a root of the plant (for example, water stress) is examined non-destructively utilizing electromotive force between the root and soil.

As a technique in which water stress in a plant is measured utilizing the method described above, for example, Patent Document 1 discloses connecting a first nonpolarizable electrode to the plant, connecting a second nonpolarizable electrode to soil in which the plant is planted, providing a potentiometer between the two nonpolarizable electrodes, and being able to measure water stress which is received by the plant by measuring electromotive force between both nonpolarizable electrodes using the potentiometer.

In order to increase a sugar content of a fruit such as a tomato as an example of a plant, the amount of water content contained in a leaf or the like of the tomato is considered. The water content of a leaf of the tomato is fluctuated under the influence of a water supply content by manual irrigation by a user (farmer) or automatic irrigation of an irrigation device (for example, an irrigator), or surrounding environmental conditions (for example, temperature and humidity).

As one means for improvement of a value (that is, unit price) of the tomato, it is considered to improve the sugar content of the tomato. Here, the kind of irrigation to be performed and the timing of the irrigation for increasing the sugar content is mainly attributable to artificial arrangements such as farmer's past experience and intuition.

Increasing a sugar content of a fruit such as a tomato leads to quality improvement, and thus the unit price rises. On the other hand, if it is not easy to cultivate, the yield is decreased and thereby production may be decreased. In other words, there is a trade-off relationship between high performance of fruits and the yield. For this reason, in the future, it is expected to increase the productivity by improving the yield.

Further, there is a need for a technique for measuring the water content that can be performed so as not to hurt a measurement target of the plant.

An object of the present disclosure is to quantitatively and time-serially suggest a change of a water content contained in a plant and teach the timing of irrigation to the plant and the amount of the irrigation.

CITATION LIST

Patent Literature

PTL 1: Japanese Patent Unexamined Publication No. 2001-272373

SUMMARY OF THE INVENTION

A device for observing water content of the present disclosure is provided with a first light source which radiates a near infrared laser reference beam of a first wavelength having a characteristic in which light tends not to be absorbed in water while sequentially scanning toward a plant; a second light source which radiates a near infrared laser measuring beam of a second wavelength having a characteristic in which light tends to be absorbed in water while sequentially scanning toward the plant; a water content calculation unit that repeatedly calculates the water content contained in the plant based on reflection light of the near infrared laser reference beam reflected on the plant and reflection light of the near infrared laser measuring beam reflected on the plant, in a certain measurement period; and a controller that displays a time-serial change of the water content, which is contained in the plant from start to end of a measurement period, calculated by the water content calculation unit.

The cultivation device of the present disclosure is provided with the device for observing water content, and a cultivation controller that irrigates the plant with a predetermined amount of water based on the time-serial change of the water content calculated by water content calculation unit in a certain period of the measurement periods.

A method for observing water content in a device for observing water content contained in a plant of the present disclosure, the method includes radiating a near infrared laser reference beam of a first wavelength having a characteristic in which light tends not to be absorbed in water while sequentially scanning toward a plant, by a first beam source; radiating a near infrared laser measuring beam of a second wavelength having a characteristic in which light tends to be absorbed in water while sequentially scanning toward the plant, by a second beam source; repeatedly calculating the water content contained in the plant based on reflection light of the near infrared laser reference beam reflected on the plant and reflection light of the near infrared laser measuring beam reflected on the plant, in a certain measurement period; and displaying a time-serial change of the water content contained in the plant from start to end of a measurement period.

According to the present disclosure, the water content contained in the plant is measured so as not to hurt the plant that is a measurement target, the change of the measurement result is quantitatively and time-serially suggested, and thereby it is possible to contribute to teaching of irrigation timing and irrigation amount to the plant. Further, according to the present disclosure, in consideration of influence of surrounding environmental conditions, it is possible to flexibly control the water content contained in the plant including a fruit such as a tomato.

BRIEF DESCRIPTION OF DRAWINGS

FIG. 10 is a diagram illustrating an example of the method of measuring Comparative Examples.

FIG. 11A is a graph illustrating an example of the reflection light intensity with respect to wavelength of the near infrared beam when near infrared beam is radiated toward the leaf outdoors.

FIG. 11B is a graph illustrating an example of the reflection light intensity with respect to wavelength of the near infrared beam when near infrared beam is radiated toward the leaf on which white reference substrate bd is installed indoors and outdoors.

FIG. 12 is a diagram which describes an example of attachment of the leaf on a white reference substrate.

FIG. 20A is a graph schematically illustrating an example of a water stress profile.

FIG. 20B is a graph schematically illustrating an example of a water stress profile.

FIG. 20C is a graph schematically illustrating an example of a water stress profile.

FIG. 20D is a graph schematically illustrating an example of a water stress profile.

FIG. 22A is a diagram illustrating an example of an image indicating a water content in a leaf that is a measurement target, which is imaged by a plant detection camera of the second embodiment, and an example of an image of a leaf before positional deviation.

FIG. 22B is a diagram illustrating an example of an image indicating a water content in a leaf that is a measurement target, which is imaged by a plant detection camera of the second embodiment, and an example of an image of a leaf after positional deviation.

FIG. 24 is a table indicating an example of the standardized pixel average water content index before and after positional deviation correction in time series.

FIG. 33A is a schematic view illustrating an example of a water stress profile based on the transpiration of leaves by changing the temperature and the relative humidity.

DESCRIPTION OF EMBODIMENTS

Hereinafter, embodiments in which a device for observing water content, a cultivation device, and a method for observing water content according to the present disclosure are specifically described are described in detail with reference to the drawings as appropriate. However, detailed description may be omitted as necessary. For example, detailed description of already well-known matter and overlapping description with respect to substantially the same configuration may be omitted. This is because the following description is prevented from unnecessarily becoming redundant, and a process of the inventor is easily set. Note that, drawings and the following description are provided by the inventor for sufficient understanding of the present disclosure, and thereby, the present disclosure is not intended to be limited to a subject described in the range of the claims.

First Embodiment

Figure 1:
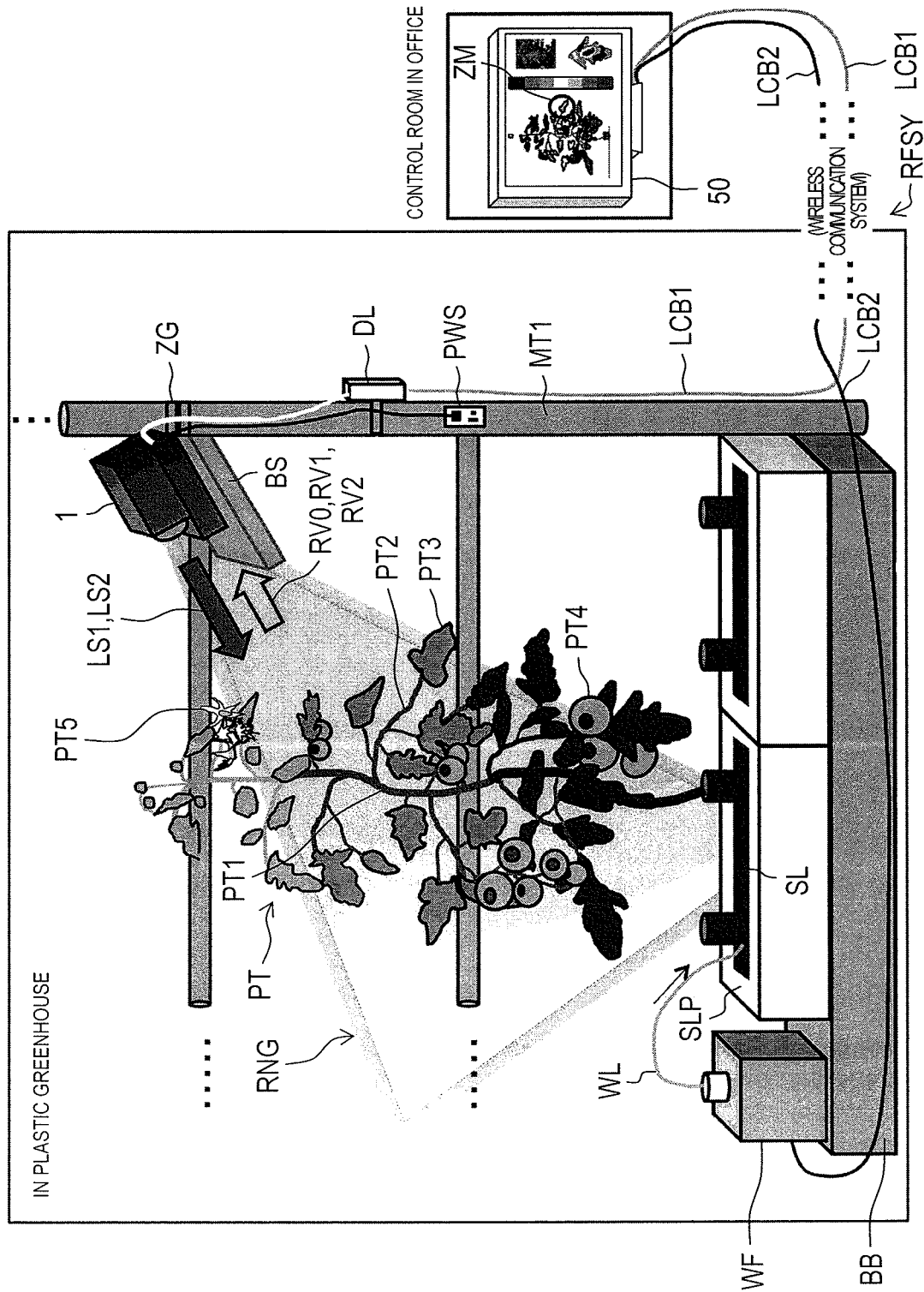
FIG. 1 is a conceptual explanatory diagram illustrating an example of usage circumstances of a plant detection camera in the respective embodiments.

As an example of the device for observing water content of the present embodiment, description will be given by exemplifying plant detection camera 1 as illustrated in FIG. 1. In addition, the cultivation device of the present embodiment has a configuration of including plant detection camera 1 as illustrated in FIG. 1, fertilizer water supply device (fertilizer or water supply device) WF as an example of a cultivation controller that supplies a fertilizer (for example, a liquid fertilizer) or irrigates the plant with a predetermined amount of the water, and monitor 50 that displays (user Interface) screen 60 (refer to FIG. 17) or the like. Further, the present disclosure can realize a method for observing water content for executing each process performed by plant detection camera 1. Plant detection camera 1 of the present embodiment is able to detect a distribution state of presence or absence of water content of the leaf or the part of the plant.

Here, an observation target of plant detection camera 1 of the present embodiment is the leaf or the part of the plant, and description is made by exemplifying a fruit vegetable that is given as a more specific example. Since sugar content of a fruit of a tomato is increased in growth of fruit vegetables such as, for example, the tomato, it is known that it is necessary for water or fertilizer to be in an insufficient state and not a state in which water or fertilizer is sufficiently supplied as a result of water or fertilizer of a root or a leaf being digested by a suitable amount in photosynthesis. For example, if sufficient water is supplied to the leaf, the leaf has a flat shape in a sound state. Meanwhile, when water of the leaf is equivalently insufficient, the shape of the leaf is bent. Meanwhile, when fertilizer in the soil is equivalently insufficient, a condition is generated of the leaf turning yellow and the like.

In the present embodiment below, an example is described in which plant detection camera 1 radiates laser beams of a plurality of types which are different in wavelength on the plant (for example leaf), and detects water content of the leaf based on an intensity ratio of respective diffuse reflection light that are reflected on irradiation positions of the leaf. Note that, in the present embodiment, the leaf of the plant is the measurement target, but the measurement target is not limited to the leaf, and may be other parts of a seed, stalk, flower, and the like. A second embodiment is also the same.

(Outline of Plant Detection Camera)

FIG. 1 is a conceptual explanatory diagram illustrating an example of usage circumstances of plant detection camera 1 in the respective embodiments. Plant detection camera 1 is installed at a fixed point within a plastic greenhouse in which, for example, fruit vegetables such as the tomato are planted. In detail, for example, plant detection camera 1 is installed on base BS that is fixed to mounting jig ZG which is attached so as to interpose support column MT1 with a cylindrical shape extend in a vertical direction from the ground. Plant detection camera 1 operates by a power source to be supplied from power source switch PWS that is attached to support column MT1, and radiates reference beam LS1 and measuring beam LS2 that are a plurality of types of laser beams which have different wavelengths toward plant PT that is the observation target across irradiation range RNG.

Plant PT is, for example, a fruit vegetable plant such as the tomato, a root of plant PT which grows from soil SL that is filled in soil pot SLP which is installed on base BB, and plant PT has each of stem PT1, stalk PT2, leaf PT3, fruit PT4, and flower PT5. Fertilizer water supply device WF is installed on base BB. Fertilizer water supply device WF supplies water to soil spot SLP via, for example, cable WL according to an instruction from wireless communication system RFSY that is connected via local area network (LAN) cable LCB2. Thereby, since water is supplied to soil SL, the root of plant PT absorbs water, and transmits water to each part within plant PT (that is, stem PT1, stalk PT2, leaf PT3, fruit PT4, and flower PT5).

In addition, plant detection camera 1 receives diffuse reflection light RV1 and RV2 that are reflected on an irradiation position of plant PT which is radiated by reference beam LS1 and measuring beam LS2, and furthermore, receives ambient light RV0. As will be described later, plant detection camera 1 has a normal camera function, and is able to image an image (that is, visible light image of plant PT within the plastic greenhouse indicated in FIG. 1) within a default angle of view due to ambient light RV0 entering. Plant detection camera 1 outputs output data which includes various detection results (refer to description below) or image data to data logger DL based on diffuse reflection light RV1 and RV2.

Data logger DL transmits output data from plant detection camera 1 to management personal computer (PC) of a control room within an office at a position geographically separated from the plastic greenhouse via LAN cable LCB1 and wireless communication system RFSY. Wireless communication system RFSY is not particularly limited in communication specification, but controls communication between data logger DL within the plastic greenhouse and management PC within the control room in the office, and furthermore transmits an instruction from management PC which relates to supply of water or fertilizer of soil spot SLP to fertilizer water supply device WF.

Monitor 50 is connected to management PC within the control room in the office, and management PC displays output data of plant detection camera 1 that is transmitted from data logger DL on monitor 50. In FIG. 1, for example, monitor 50 displays the entirety of plant PT that is the observation target and a distribution state which relates to presence or absence of water in the entirety of plant PT. In addition, monitor 50 generates and is able to comparatively display an enlargement distribution state of a specific designated location out of the entirety of plant PT (that is, designated location ZM that is specified by a zoom operation of an observer who uses management PC) and image data corresponding to the designated location of the enlargement distribution state. Further, monitor 50, which is an example of the display unit, displays UI screen 60 including screen for monitoring water content in leaf Gm1 (refer to FIG. 17) described later.

Plant detection camera 1 has a configuration which includes visible light camera VSC and invisible light sensor NVSS. Visible light camera VSC (acquiring unit) images plant PT within the plastic greenhouse using ambient light RV0 with respect to invisible light that has a predetermined wavelength (for example, 0.4 to 0.7 μm) in the same manner as, for example, existing monitoring camera. Image data of the plant that is imaged by visible light camera VSC refers to "visible light camera image data".

Invisible light sensor NVSS incidents reference beam LS1 and measuring beam LS2 which is invisible light (for example, infrared beam) that has a plurality of types of wavelengths (refer to description below) with respect to the same plant PT as visible light camera VSC. Invisible light sensor NVSS detects presence or absence of water at the irradiation position of plant PT which is the monitoring target using the intensity ratio of diffuse reflection light RV1 and RV2 that are reflected on the irradiation position of plant PT which is radiated by reference beam LS1 and measuring beam LS2.

In addition, in visible light camera image data that is imaged by visible light camera VSC, plant detection camera 1 generates and outputs output image data (hereinafter referred to as "detection result image data") which is equivalent to the detection result of water of invisible light sensor NVSS or display data that composites information which relates to detection result image data. Display data is not limited to image data in which detection result image data and visible light camera image data are composited, and for example, may be image data that is generated such that detection result image data and visible light camera image data are able to be compared. An output destination of the display data from plant detection camera 1 is an externally connected device that is connected to plant detection camera 1 via, for example, a network, and is data logger DL or communication terminal MT (refer to FIG. 3). The network may be a wired network (for example, intranet or internet), and may be a wireless network (for example, wireless LAN).

(Plant Observation System in which Plant Detection Camera is Installed in Green House)

Figure 2:
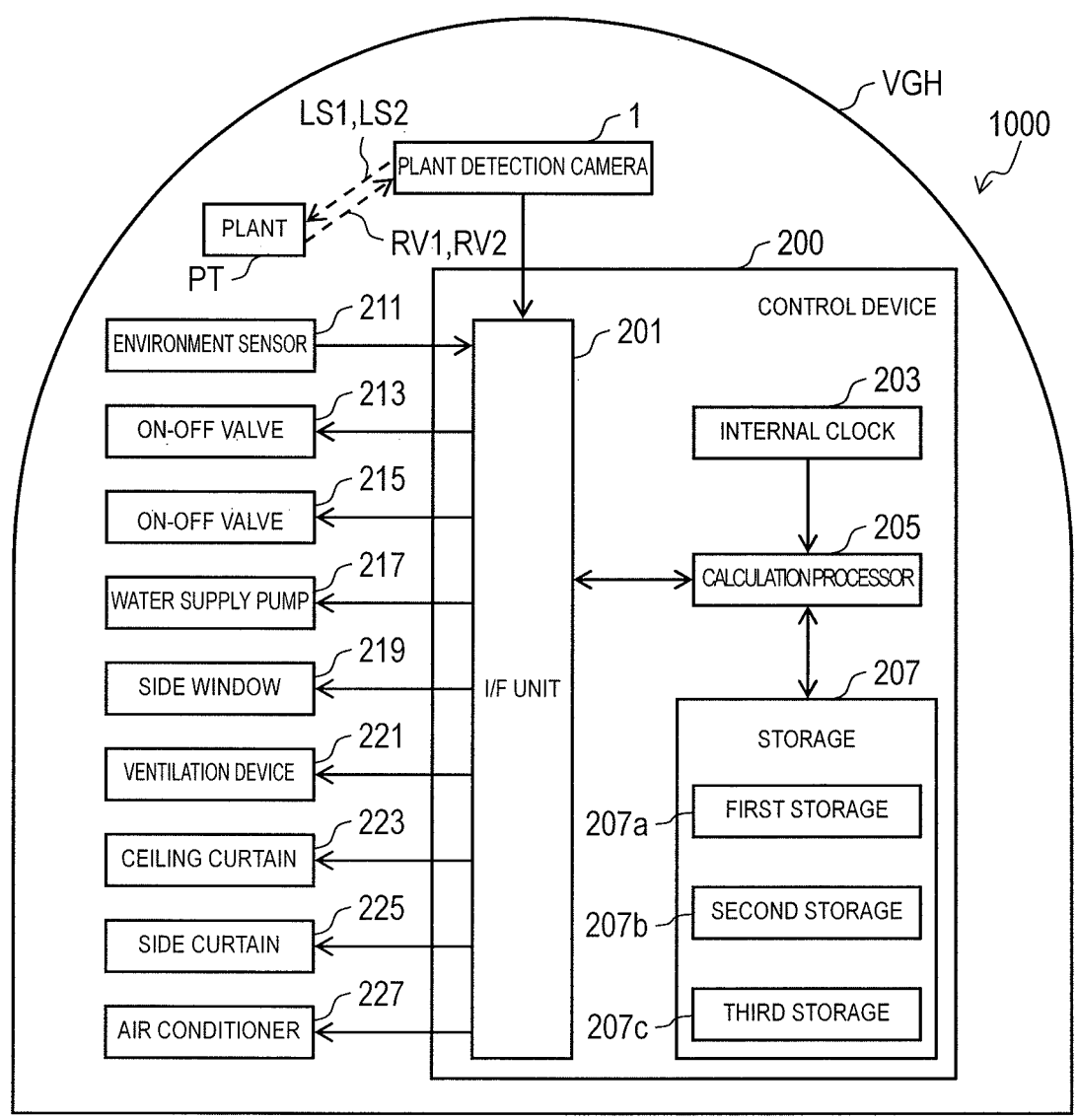
FIG. 2 is a block diagram illustrating a configuration example of a plant observation system in which a plant detection camera in the respective embodiments is disposed in a plastic greenhouse together with a control device for controlling environmental conditions in the plastic greenhouse.

Next, a configuration example of plant observation system 1000 in which plant detection camera 1 of the respective embodiments is installed in greenhouse VGH will be described with reference to FIG. 2. FIG. 2 is a block diagram illustrating a configuration example of plant observation system 1000 in which plant detection camera 1 in the respective embodiments is disposed in plastic greenhouse VGH together with control device 200 for controlling environmental conditions in plastic greenhouse VGH. Note that, among the respective portions as illustrated in FIG. 2, details of an operation of each portion except for plant detection camera 1 and air conditioner 227 may be incorporated in the present specification with reference to a public document filed by the same applicant of the present application (specifically, Japanese Patent Unexamined Publication No. 2014-57570). Here, a configuration example of plant observation system 1000 in which plant detection camera 1 is installed in plastic greenhouse VGH in a state where the environmental conditions (for example, temperature and humidity) surrounding the plant (for example, a fruit such as a tomato) cultivated in plastic greenhouse VGH can be changed.

Plant observation system 1000 as illustrated in FIG. 2 is configured to include plant detection camera 1, control device 200, environment sensor 211, on-off valves 213 and 215, water supply pump 217, side window 219, ventilation device 221, ceiling curtain 223, side curtain 225, and air conditioner 227. Control device 200 has a role as an environmental control device that can maintain and change the environmental conditions (for example, temperature and humidity) surrounding the plant cultivated in plastic greenhouse VGH. Control device 200 is configured to include I/F unit 201, internal clock 203, calculation processor 205, and storage 207. Storage 207 includes first storage 207a, second storage 207b, and third storage 207c.

The main body of plastic greenhouse VGH is formed, for example, in an inverted U-shaped cross section and is integrally provided with a roof part in a semicircular cross section, a pair of side walls which supports the roof part and face each other, and a pair of transverse walls which are orthogonal to the side walls and face each other. Hereinafter, a direction that passes through the pair of transverse walls is called a longitudinal direction, and a direction that passes through the pair of side walls is called a transverse direction. Note that, the shape of the main body of plastic greenhouse VGH is merely one example and is not limited to that shape.

The environment sensor 211 measures, as the ambient temperature of plant PT, room temperature in plastic greenhouse VGH surrounding plant PT, and underground temperature of culture land SL in which plant PT is seeded. In addition, environment sensor 211 is preferably provided with a humidity sensor which measures humidity surrounding plant PT, and an illumination sensor which measures illumination surrounding plant PT. Environment sensor 211 outputs measurement results (for example, ambient temperature and humidity of plant PT) to control device 200.

In plastic greenhouse VGH, a water supply device formed of a sprinkler and a mist sprayer is installed in order to spray water to a group of plant PT cultivated in plastic greenhouse VGH. The sprinkler is provided with two sprinkling tubes, and when it passes through this sprinkling tube, water is ejected in a shower shape or a fountain shape through a water hole. Two sprinkling tubes are laid along the pair of side walls of plastic greenhouse VGH over substantially the entire length in the longitudinal direction of plastic greenhouse VGH. Further, the mist sprayer is provided with a mist tube, which has a large number of nozzles attached to a tube wall through which water passes, and when water passes through the mist tube, water is sprayed from the nozzle.

In order to individually control the timing of ejecting water or hot water from each of the sprinkler and the mist sprayer, this water supply device is equipped with on-off valves 213, and 215 formed of a solenoid valve on the flow path for supplying water to the sprinkler and mist sprayer. On-off valves 213 and 215 are individually controlled via I/F unit 201 of control device 200, and whether or not water or hot water is supplied to the sprinkler and the mist sprayer is individually selected. The water or hot water supplied to the sprinkler and the mist sprayer is pressurized at a predetermined pressure by water supply pump 217.

In the main body of plastic greenhouse VGH, ceiling curtain 223 which can be opened and closed between a closed state in which external light (for example, sunlight) incident from the roof part is diminished, and an opened state in which plant PT is irradiated without diminishing the external light (for example, sunlight) incident from the roof part is mounted.

On a side wall of the main body of plastic greenhouse VGH, side window 219 which can be opened and closed, and airflow resistance of air when external air is taken into the main body of plastic greenhouse VGH is adjusted by adjusting the opening amount of side window 219. Further, on the side wall of the main body of plastic greenhouse VGH, side curtain 225 is disposed in addition to side window 219.

Side curtain 225 is configured to be opened and closed between a closed state in which external light (for example, sunlight) incident from the side wall of the main body of plastic greenhouse VGH is diminished, and an opened state in which plant PT is irradiated without diminishing the external light (for example, sunlight) incident from the roof part is mounted. Ceiling curtain 223, side curtain 225, and side window 219 are driven by control device 200. When ceiling curtain 223 and side curtain 225 are opened and closed, the amount of heat entering the main body of plastic greenhouse VGH is adjusted, and the speed of temperature rise in an interior space of the main body of plastic greenhouse VGH is adjusted by opening and closing ceiling curtain 223 and side curtain 225. In addition, when the opening amount of side window 219 is adjusted, the speed at which the external air is taken into the main body of plastic greenhouse VGH. Ceiling curtain 223 and side curtain 225 mainly contribute to adjusting the heat amount incident into internal space of the main body of plastic greenhouse VGH. In addition, side window 219 is used in a case where temperature is adjusted by using the temperature difference between the inside and outside of the main body of plastic greenhouse VGH when the external air is taken into the main body of plastic greenhouse VGH.

Ventilation device 221 is disposed above the pair of transverse walls so as to form an air current surrounding plant PT. Ventilation device 221 is operated as necessary, and during side window 219 is opened, ventilation device 221 is operated such that the external air is forcibly taken into the main body of plastic greenhouse VGH. Ventilation device 221 may be any one of a ventilation fan for exhausting from the main body of plastic greenhouse VGH, and a blower for taking the external air into the main body of plastic greenhouse VGH. The blower is disposed in the main body of plastic greenhouse VGH and forcibly form an air current surrounding plant PT so as to adjust the humidity surrounding plant PT. In addition, as necessary, air conditioner 227 may be disposed in plastic greenhouse VGH. Air conditioner 227 has a role of adjusting the temperature and the humidity in plastic greenhouse VGH.

The environment in which plant PT grows in the main body of plastic greenhouse VGH is changed by controlling side window 219, ventilation device 221, ceiling curtain 223, side curtain 225, and air conditioner 227 in addition to the above described water supply device. As an environmental control device for controlling the environmental conditions (for example, temperature and humidity) surrounding plant PT, control device 200 controls side window 219, ventilation device 221, ceiling curtain 223, side curtain 225, and air conditioner 227 in addition to the above described water supply device.

Control device 200 controls open and close of on-off valves 213 and 215, adjustment of water supply pressure and water temperature of water supply pump 217, open and close of ceiling curtain 223 and side curtain 225, adjustment of opening amount of side window 219, operation and stop of ventilation device 221, and airflow to the blower pipe. An electromagnetic contactor (electromagnetic relay) that turns on and off power supply to each device is used for starting energization and stopping energization to each of these devices. Control device 200 is housed in a casing attached to the main body of plastic greenhouse VGH and constitutes a control panel. In addition, control device 200 performs control by acquiring information (for example, temperature information and humidity information) on the environmental conditions in a predetermined period from environment sensor 211, and using information on the acquired environmental conditions and instruction information (described below) from plant detection camera 1. A specific operation of control device 200 will be described below. Control device 200 is provided with a device such as a microcomputer operating in accordance with a program as a main hardware.

For example, control device 200 is configured as a personal computer, receives the output of environment sensor 211 through I/F unit 201, and gives an instruction to each device. That is, control device 200 can control each device by executing a program. Noted that control device 200 may be configured as a dedicated device, not a general-purpose personal computer.

As illustrated in FIG. 2, control device 200 is provided with I/F unit 201 to which the above-described devices and environment sensor 211 are connected, storage 207 which stores various types of data, and internal clock 203 such as a real time clock which clocks date and time. Further, calculation processor 205 that controls the above-described devices by using information on the environmental conditions acquired from environment sensor 211 through I/F unit 201, and various types of data stored in storage 207 is provided in control device 200. I/F unit 201 is provided with the electromagnetic contactor that turns on and off power supply to each device. The time interval at which I/F unit 201 acquires the information on the environmental conditions from environment sensor 211 is set to be approximately 1 to 15 minutes, for example. A device serving as a user interface is connected to I/F unit 201, and through this device, the user can set contents to be stored in storage 207, and perform time adjustment of internal clock 203.

First storage 207a stores the ambient temperature and the water content in association with each other according to a growth stage of plant PT. Second storage 207b stores the ambient temperature and the timing of water spraying in association with each other according to the growth stage of plant PT. Third storage 207c stores the number of days after plant PT is germinated and a height position of environment sensor 211 in association with each other.

For example, in order to decrease the temperature of leaf PT3 of plant PT, control device 200 uses diminution by ceiling curtain 223 and side curtain 225, ventilation or dehumidification by side window 219, ventilation device 221, air conditioner 227, and water spraying by the sprinkler and the mist sprayer in combination.

Ceiling curtain 223 and side curtain 225 not only suppress the rise of the internal temperature of the main body of plastic greenhouse VGH by diminution but also suppress strong light in the summer season, and thereby the effect of efficiently effecting photosynthesis of plant PT can be expected.

Ventilation device 221 and side window 219 perform ventilation by exhausting the air inside the main body of plastic greenhouse VGH and taking the external air into the main body of plastic greenhouse VGH, and control the rise of the internal temperature of the main body of plastic greenhouse VGH. In addition, air conditioner 227 promotes a transpiration action (refer to the following description) of plant PT by forming an air current surrounding plant PT, and furthermore, lowers the ambient humidity of plant PT.

Further, the sprinkler and the mist sprayer are used for decreasing the temperature of leaf PT3 by spraying water having temperature lower than the ambient temperature of plant PT to plant PT, and decreasing the ambient temperature of plant PT by removing the vaporization heat. The sprinkler mainly contributes to decreasing the temperature of leaf PT3 of plant PT and ambient temperature of plant PT in a lower portion of the main body of plastic greenhouse VGH. The mist sprayer mainly contributes to decreasing the temperature in the upper portion of the main body of plastic greenhouse VGH.

It is desirable to set water temperature to be approximately 10° C. by a chiller in the summer season in a case of spraying water for the purpose of decreasing the temperature of the leaf. Since the chiller requires a relatively long time until the water temperature reaches the setting temperature, in a case of using the chiller, it is necessary that temperature control is performed retroactively from the timing of supplying water from the water supply device to plant PT in consideration of the time until the water temperature reaches the setting temperature, and from the water supply device. Note that in a case where the temperature of plant PT becomes low as in the winter season, the temperature of the leaf may be raised by setting the water temperature to be approximately 15° C. by the chiller.

In the present embodiment, as described above, in order to control the environment of plant PT, diminution by ceiling curtain 223 and side curtain 225, ventilation or dehumidification by side window 219, ventilation device 221, air conditioner 227, and water spraying by the sprinkler and the mist sprayer are used in combination.

The sprinkler and the mist sprayer are mainly used for the supply of water to plant PT and the control of ambient temperature of plant PT. Therefore, control device 200 controls at least one of the timing of water spraying by the sprinkler and the mist sprayer and water content according to the ambient temperature and humidity of plant PT measured by environment sensor 211. The timing of water spraying and the water content with respect to the ambient temperature and humidity of plant PT which are detected by environment sensor 211 are stored in storage 207.

In addition, control device 200 may operate ventilation device 221 (including air conditioner 227 as necessary) for the purpose of dehumidification, cooling, ventilation, and the like according to the conditions such as the temperature, the humidity, and the illumination measured by environment sensor 211.

(Description of Each Part of Plant Detection Camera)

Figure 3:
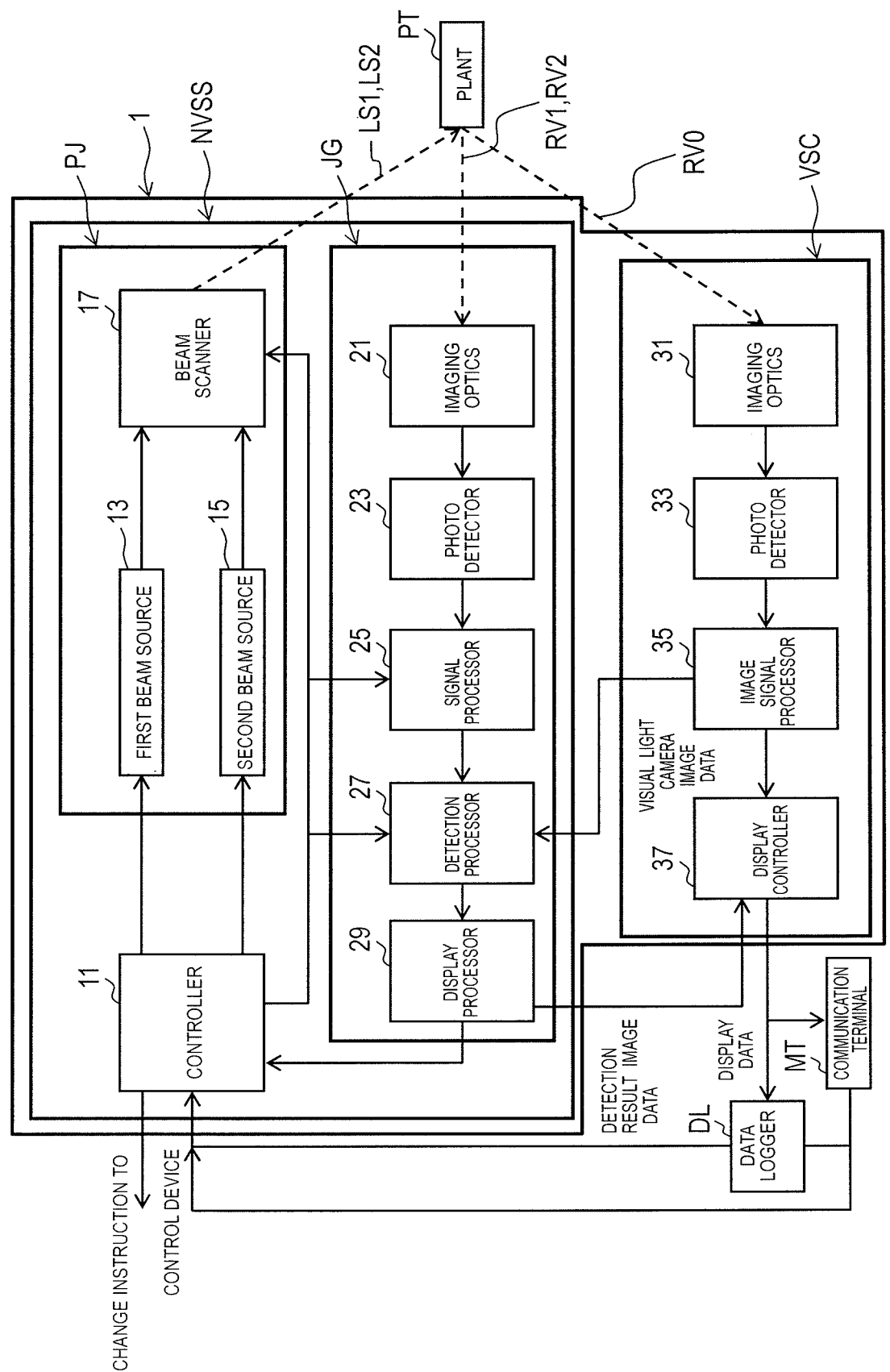
FIG. 3 is a block diagram illustrating in detail an example of an internal configuration of the plant detection camera.

FIG. 3 is a block diagram illustrating in detail an example of an internal configuration of plant detection camera 1. Plant detection camera 1 which is illustrated in FIG. 3 has a configuration which includes invisible light sensor NVSS and visible light camera VSC. Invisible light sensor NVSS has a configuration which includes controller 11, beam output PJ, and determiner JG. Beam output PJ has first beam source 13, second beam source 15, and beam scanner 17. Determiner JG has imaging optics 21, photo detector 23, signal processor 25, detection processor 27, and display processor 29. Visible light camera VSC has imaging optics 31, photo detector 33, image signal processor 35, and display controller 37. Communication terminal MT is portable by a user (for example, observer of growth of plant PT of fruit vegetable plant such as the tomato, hereinafter the same).

In the description of each part of plant detection camera 1, controller 11, invisible light sensor NVSS, and visible light camera VSC are described in order.

Controller 11 is configured using, for example, a central processor (CPU), a microprocessor (MPU), or a digital signal processor (DSP), (and also configured using, for example, a program memory and a work memory,) and performs a signal process for totally controlling an operation control of each part of visible light camera VSC and invisible light sensor NVSS, an input and output process of data within other parts, a computing process of data, and a storage process of data. In addition, controller 11 includes timing controller 11a described later (refer to FIG. 4).

Controller 11 sets detection threshold level M of plant PT which is the detection target of invisible light sensor NVSS to detection processor 27 described later. Details of the operation of controller 11 will be described later with reference to FIG. 5.

Timing controller 11a controls output of first beam source 13 and second beam source 15 in beam output PJ. In detail, timing controller 11a outputs timing signal for beam scanning TR to first beam source 13 or second beam source 15 in a case where light is incident to first beam source 13 or second beam source 15.

In addition, during the start of a predetermined incidence period, timing controller 11a alternately outputs beam output signal RF to first beam source 13 or second beam source 15. In detail, during the start of the incidence period of an odd number of times, timing controller 11a outputs beam output signal RF to first beam source 13 and during the start of the incidence period of an even number of times, outputs beam output signal RF to second beam source 15.

Next, each part of invisible light sensor NVSS is described.

When first beam source 13 as an example of the first light source receives timing signal for beam scanning TR from timing controller 11a of controller 11, reference beam LS1 (for example, near infrared beam) that is a laser beam of invisible light that has a predetermined wavelength (for example, 905 nm) is incident on plant PT via beam scanner 17 according to beam output signal RF from timing controller 11a in each incidence period (default value) of an odd number of times.

Note that, presence or absence of detection of water in plant PT may be determined by comparing to the predetermined detection threshold level M. Detection threshold level M may be a predetermined value, may be an arbitrarily set value, and furthermore, may be a value based on intensity of the diffuse reflection light that is acquired in a state in which there is no water (for example, a value in which a predetermined margin is added to a value of intensity of the diffuse reflection light that is acquired in a state in which there is no water). That is, presence or absence of detection of water may be determined by comparing detection result image data that is acquired in a state in which there is no water and detection result image data that is acquired thereafter. In this manner, it is possible to set a threshold level appropriate for an environment in which plant detection camera 1 is installed as detecting threshold level M of presence or absence of water by acquiring intensity of the diffuse reflection light in the state in which there is no water.

When second beam source 15 as an example of the second light source receives timing signal for beam scanning TR from timing controller 11a of controller 11, measuring beam LS2 (for example, infrared beam) that is the laser beam of invisible light that has a predetermined wavelength (for example, 1550 nm) is incident on plant PT via beam scanner 17 according to beam output signal RF from timing controller 11a in each incidence period (default value) of an even number of times. In the present embodiment, measuring beam LS2 that is incident from second beam source 15 is used in determination of presence or absence of detection of water in plant PT. Wavelength 1550 nm of measuring beam LS2 is a wavelength which has a characteristic in which light tends to be absorbed in water (refer to FIG. 7).

Furthermore, plant detection camera 1 detects presence or absence of water at the irradiation position of plant PT that is radiated by reference beam LS1 and measuring beam LS2 using diffuse reflection light RV1 of reference beam LS1 as reference data for detecting water at the irradiation position of plant PT, and using diffuse reflection light RV2 at the irradiation position of plant PT that is radiated by measuring beam LS2 and diffuse reflection light RV1 of reference beam LS1. Accordingly, plant detection camera 1 is able to detect water of plant PT with high precision using reference beam LS1 and measuring beam LS2 of two types of wavelengths that detect water in plant PT differently and diffuse reflection lights RV1 and RV2 thereof.

Beam scanner 17 two-dimensionally scans reference beam LS1 which is incident from first beam source 13 and measuring beam LS2 which is incident from second beam source 15 with respect to plant PT that is present in a detection area in invisible light sensor NVSS. Thereby, plant detection camera 1 detects presence or absence of water at the irradiation position of plant PT that is radiated by reference beam LS1 and measuring beam LS2 based on diffuse reflection light RV2 that is reflected at the irradiation position of plant PT by measuring beam LS2 and diffuse reflection light RV1 described above.

Figure 4:
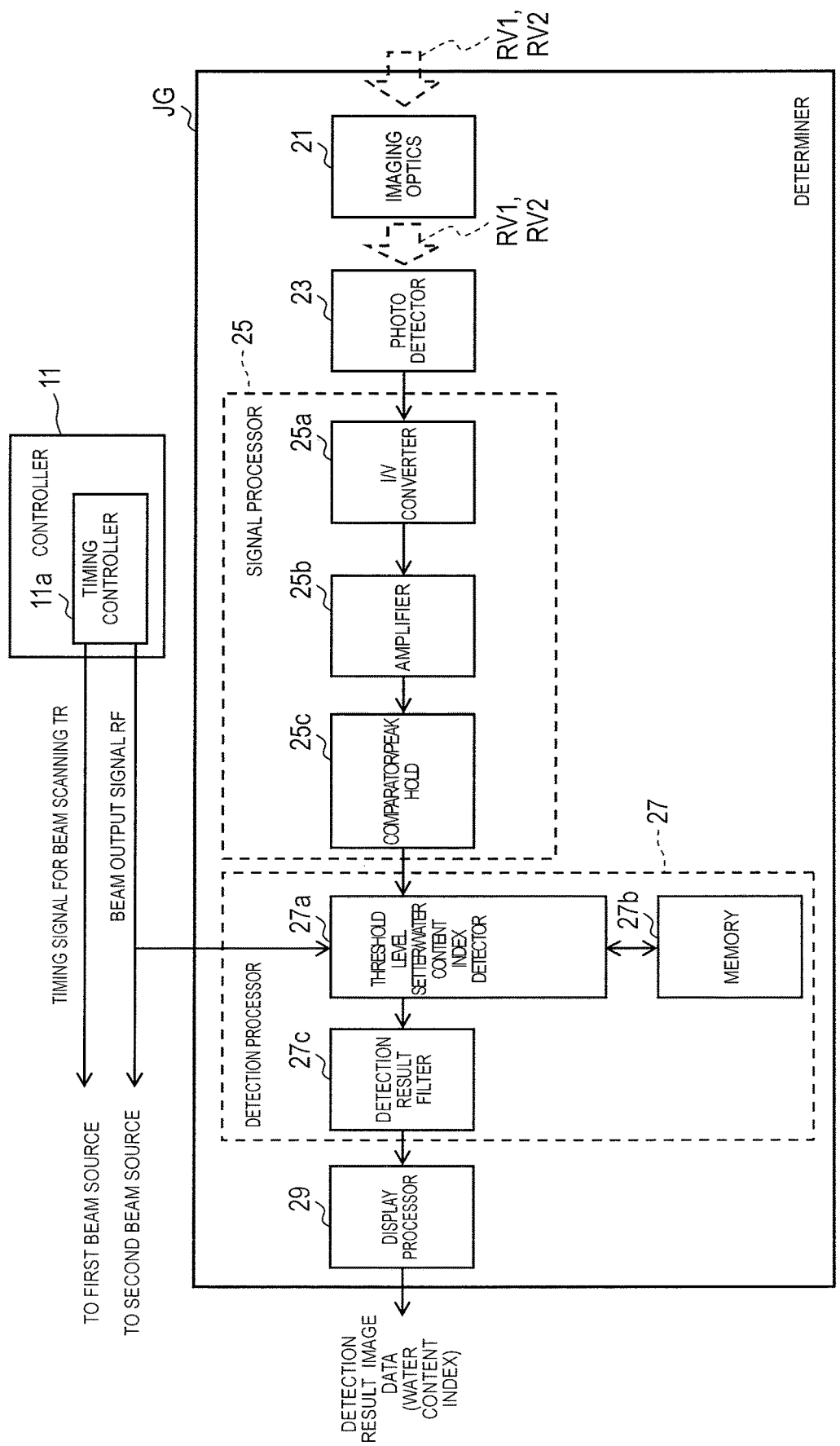
FIG. 4 is a diagram illustrating in detail an example of an internal configuration of a determiner of the plant detection camera.

Next, an internal configuration of determiner JG is described in detail with reference to FIGS. 3 and 4. FIG. 4 is a diagram illustrating in detail an example of an internal configuration of a determiner JG of plant detection camera 1.

Imaging optics 21 is configured using, for example, a lens, light (for example, diffuse reflection light RV1 or diffuse reflection light RV2) which is incident from outside of plant detection camera 1 is concentrated, and diffuse reflection light RV1 or diffuse reflection light RV2 form an image on a predetermined imaging area of photo detector 23.

Photo detector 23 is an image sensor which has a peak of spectral sensitivity with respect to wavelengths of both of reference beam LS1 and measuring beam LS2. Photo detector 23 converts an optical image of diffuse reflection light RV1 or diffuse reflection light RV2 that form an image on the imaging area to an electrical signal. Output of photo detector 23 is input to signal processor 25 as the electrical signal (current signal). Note that, imaging optics 21 and photo detector 23 functions as an imaging unit in invisible light sensor NVSS.

Signal processor 25 has I/V converter 25a, amplifier 25b, and comparator/peak hold 25c. I/V converter 25a converts the current signal that is an output signal (analog signal) of photo detector 23 to a voltage signal. Amplifier 25b amplifies a level of the voltage signal that is the output signal (analog signal) of I/V converter 25a up to a processable level in comparator/peak hold 25c.

Comparator/peak hold 25c binarizes the output signal of amplifier 25b and outputs to threshold level setter/water content index detector 27a according to a comparative result of the output signal (analog signal) of amplifier 25b and the predetermined threshold level. In addition, comparator/peak hold 25c includes an analog digital converter (ADC), detects and holds the peak of an analog digital (AD) converter result of the output signal (analog signal) of amplifier 25b and furthermore, outputs peak information to threshold level setter/water content index detector 27a.

Detection processor 27 has threshold level setter/water content index detector 27a, memory 27b, and detection result filter 27c. Threshold level setter/water content index detector 27a generates and registers frequency distribution data in advance. Frequency distribution data indicates frequency distribution of the reflection intensity ratio in all pixels or one frame image. As will be described later, threshold level setter/water content index detector 27a as a threshold level calculation unit is set by calculating threshold level Sh of the reflection intensity ratio for identifying the shape of the leaf using the frequency distribution data.

In addition, threshold level setter/water content index detector 27a detects presence or absence of water at the irradiation position of reference beam LS1 and measuring beam LS2 of plant PT based on output (peak information) of comparator/peak hold 25c in diffuse reflection light RV1 of reference beam LS1 and output (peak information) of comparator/peak hold 25c in diffuse reflection light RV2 of measuring beam LS2.

In detail, threshold level setter/water content index detector 27a temporarily stores, for example, output (peak information) of comparator/peak hold 25c in diffuse reflection light RV1 of reference beam LS1 in memory 27b, and next, waits until the output (peak information) of comparator/peak hold 25c in diffuse reflection light RV2 of measuring beam LS2 is obtained. Threshold level setter/water content index detector 27a obtains output (peak information) of comparator/peak hold 25c in diffuse reflection light RV2 of measuring beam LS2, and then calculates a ratio of output (peak information) of comparator/peak hold 25c in diffuse reflection light RV1 of reference beam LS1 and output (peak information) of comparator/peak hold 25c in diffuse reflection light RV2 of measuring beam LS2 in the same line of plant PT that are contained in the angle of view with reference to memory 27b.

For example, at the irradiation position at which there is water, since a portion of measuring beam LS2 tends to be absorbed, the reflection efficiency at the irradiation position is lowered, and intensity (that is, amplitude) of diffuse reflection light RV2 is attenuated. Accordingly, it is possible for threshold level setter/water content index detector 27a to detect presence or absence of water at the irradiation position of reference beam LS1 and measuring beam LS2 based on a calculation result (for example, calculation result of difference (difference ΔV of amplitude) of each intensity of diffuse reflection light RV1 and diffuse reflection light RV2 or intensity ratio of diffuse reflection light RV1 and diffuse reflection light RV2) of each line of plant PT which is contained in the angle of view.

Note that, threshold level setter/water content index detector 27a may detect presence or absence of water at the irradiation position of reference beam LS1 and measuring beam LS2 of plant PT (refer to FIG. 6) according to a comparison of the size of rate RT of amplitude difference between amplitude VA of diffuse reflection light RV1 of reference beam LS1 and amplitude VB of diffuse reflection light RV2 of measuring beam LS2 (VA-VB) and amplitude VA with predetermined detection threshold level M.

Further, threshold level setter/water content index detector 27a calculates the intensity ratio of diffuse reflection light RV1 to diffuse reflection light RV2, that is, the reflection intensity ratio (also referred to as measurement value) Ln ($I_{905}/I_{1550}$), and obtains a total sum of the water content index corresponding to the water content contained in the leaf from the total sum of reflection intensity ratio Ln ($I_{905}/I_{1550}$). Reflection intensity ratio Ln ($I_{905}/I_{1550}$) is, for example, calculated in each predetermined pixel number (1×1 pixels, 4×4 pixels) in all pixels in one frame of visible light image that is imaged by, for example, visible light camera VSC, or in all pixels constituting one frame of the invisible light image obtained by invisible light sensor NVSS so as to be expressed as reflection intensity rate W1 to Wk in each predetermined pixel number.

Memory 27b is configured using, for example, a random access memory (RAM), and temporarily stores output (peak information) of comparator/peak hold 25c in diffuse reflection light RV1 of reference beam LS1.

Detection result filter 27c filters extra components such as noise and then extracts information which relates to detection result of water from plant detection camera 1 based on output of threshold level setter/water content index detector 27a. Detection result filter 27c outputs information which relates to the detection result to display processor 29. For example, detection result filter 27c outputs information which relates to the extraction result of water at the irradiation position of reference beam LS1 and measuring beam LS2 of plant PT to display processor 29.

Display processor 29 uses output of detection result filter 27c and generates data of an invisible light image (detection result image) that indicates the position of water at the irradiation position at each distance from plant detection camera 1 as an example of information which relates to water at the irradiation position. Display processor 29 outputs detection result image data which includes information on distance from plant detection camera 1 to the irradiation position to display controller 37 of visible light camera VSC. The invisible light image does not need to include information on the distance from plant detection camera 1 to the irradiation position.

Next, each part of visible light camera VSC will be described. Imaging optics 31 is configured using, for example, a lens, ambient light RV0 from in the angle of view of plant detection camera 1 is concentrated, and ambient light RV0 forms an image on a predetermined imaging area of photo detector 33.

Photo detector 33 is an image sensor which has a peak of spectral sensitivity with respect to wavelength of visible light (for example, 0.4 to 0.7 μm). Photo detector 33 converts an optical image that forms an image on the imaging surface to the electrical signal. Output of photo detector 33 is input to image signal processor 35 as the electrical signal. Note that, imaging optics 31 and photo detector 33 function as an imaging unit in visible light camera VSC.

Image signal processor 35 uses the electrical signal which is output of photo detector 33, and visible light image data is generated which is specified by a person in recognizable red, green, and blue (RGB), brightness and color difference (YUV), and the like. Thereby, visible light image data that is imaged by visible light camera VSC forms visible light camera image data. Image signal processor 35 outputs the visible light image data to display controller 37.

In a case where display controller 37 uses visible light image data that is output from image signal processor 35 and detection result image data that is output from display processor 29, and detects water at any position of the visible light image data, display data in which visible light image data and detection result image data are composited, or display data which comparatively represents the visible light image data and detection result image data are generated as examples of information related to water. Display controller 37 (output unit) prompts display by transmitting display data to data logger DL or communication terminal MT that are connected via, for example, a network.

Data logger DL transmits display data that is output from display controller 37 to communication terminal MT or one or more externally connected device, and prompts display of display data on a display screen of communication terminal MT or one or more externally connected device (for example, monitor 50 within the control room in the office indicated in FIG. 1).

Communication terminal MT is, for example, a portable communication terminal which is used by an individual user, receives display data that is transmitted from display controller 37 via the network, and displays display data on the display screen of communication terminal MT.

(Description of Example of Initial Operation in Invisible Light Sensor Controller)

Figure 5:
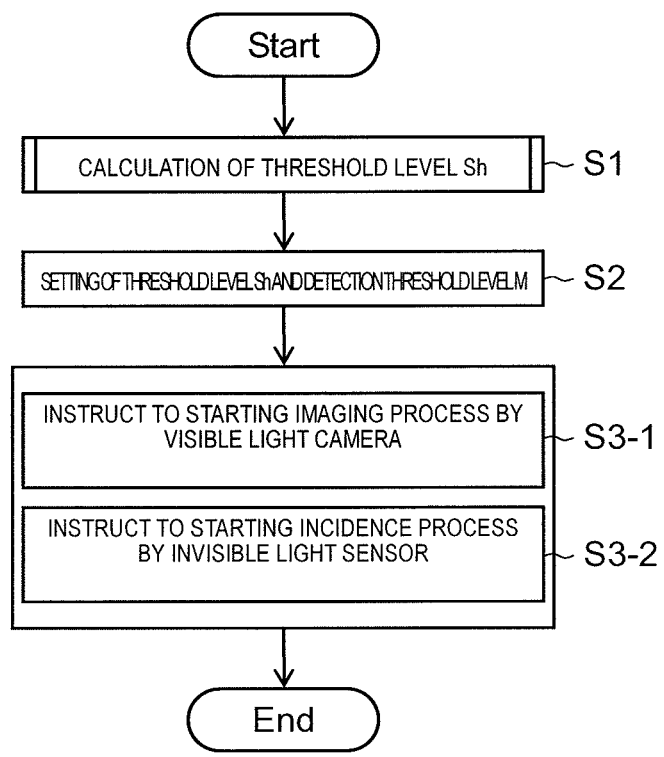
FIG. 5 is a flow chart illustrating an example of an initial setting operation in controller of the plant detection camera.

Next, an example of an initial operation in controller 11 of invisible light sensor NVSS of plant detection camera 1 of the present embodiment will be described with reference to FIG. 5. FIG. 5 is a flow chart illustrating an example of an initial setting operation in controller 11 of plant detection camera 1.

When controller 11 instructs settings of threshold level Sh of reflection intensity ratio for identifying the shape of the leaf with respect to threshold level setter/water content index detector 27a, threshold level setter/water content index detector 27a calculates and sets threshold level Sh (S1). Details of the process in which threshold level Sh is set will be described below with reference to FIGS. 28A to 30. Note that, in a case where threshold level Sh is a fixed value, the process of step S1 may be omitted.

Controller 11 sets detection threshold level M of water in detection processor 27 of invisible light sensor NVSS in threshold level setter/water content index detector 27a (S2). It is preferable to appropriately provide detection threshold level M according to the plant that is a detection target.

After the process of step S2, controller 11 outputs a control signal for starting an imaging process to each part of visible light camera VSC (S3-1). Furthermore, controller 11 outputs to first beam source 13 or second beam source 15 of invisible light sensor NVSS timing signal for beam scanning TR for starting incidence of reference beam LS1 and measuring beam LS2 to first beam source 13 or second beam source 15 (S3-2). Note that, either an execution timing of an operation of step S3-1 or an execution timing of an operation of step S3-2 may be first, or may be simultaneous.

Figure 6:
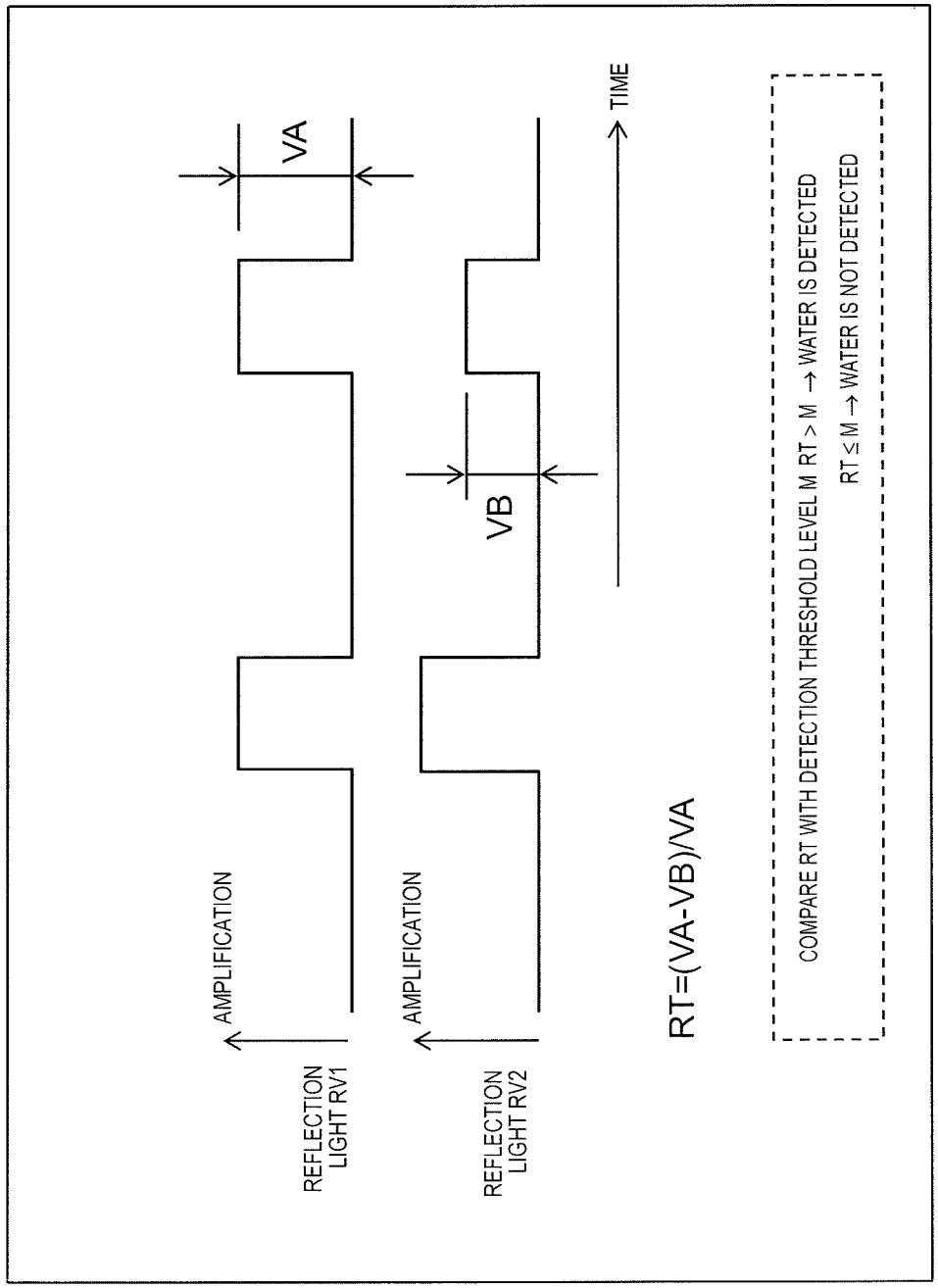
FIG. 6 is a principle explanatory diagram of detection of water in invisible light sensor.

FIG. 6 is a principle explanatory diagram of detection of water in invisible light sensor NVSS. For example, threshold level setter/water content index detector 27a may determine that water is detected if RT>M, and may determine that water is not detected if RT M. In this manner, threshold level setter/water content index detector 27a is able to eliminate influence of noise (for example, disturbance light) and is able to detect presence or absence of water with high precision by detecting presence or absence of water according to a comparative result of rate RT between amplitude difference (VA-VB) and amplitude VA and detection threshold level M.

Figure 7:
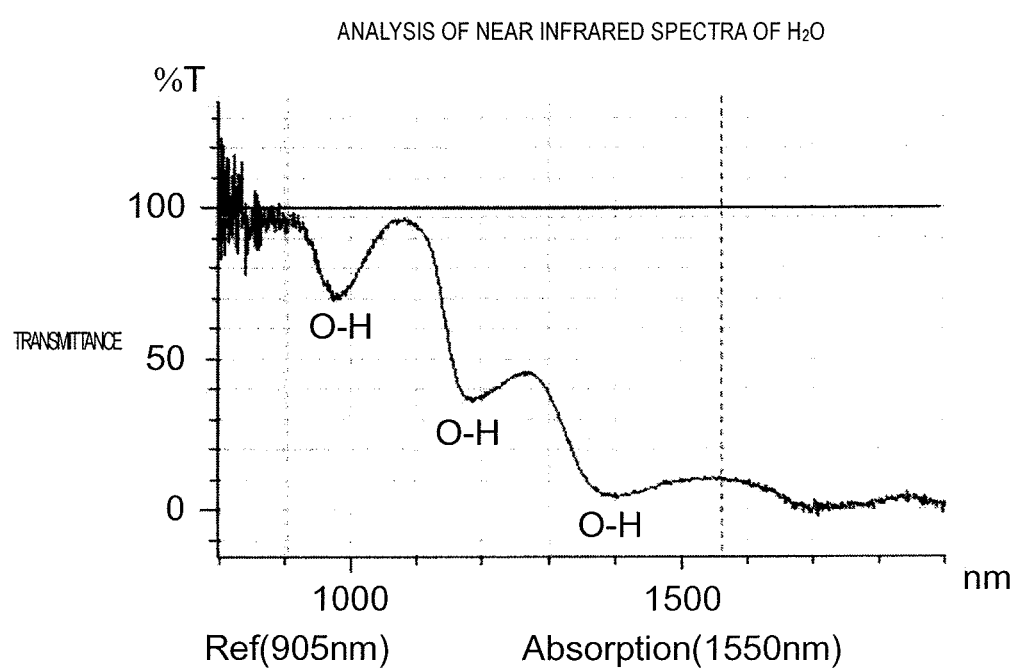
FIG. 7 is a graph illustrating an example of near infrared spectra of water ($H_2O$).

FIG. 7 is a graph illustrating an example of the near infrared spectra of water ($H_2O$). A horizontal axis of FIG. 7 indicates wavelength (nm), and a vertical axis of FIG. 7 indicates transmittance (transparency) (%). As shown in FIG. 7, since reference beam LS1 of wavelength 905 nm has transmittance in water ($H_2O$) that is close to 100%, it is understood that reference beam LS1 has a characteristic in which light tends not to be absorbed in water. In the same manner, since measuring beam LS2 of wavelength 1550 nm has transmittance in water ($H_2O$) that is close to 10%, it is understood that measuring beam LS2 has a characteristic of tending to be absorbed in water. Therefore, in the present embodiment, the wavelength of reference beam LS1 which is incident from first beam source 13 is 905 nm, and the wavelength of measuring beam LS2 which is incident from second beam source 15 is 1550 nm.

Even in a case where the projection range of the near infrared beam is decreased as the leaf withers, or the leaf is warped or rolled up to increase the thickness of the leaf, in the present embodiment, an average value (hereinafter, referred to as "pixel average water content index") obtained by dividing a total sum of the reflection intensity ratio in all the pixel areas (that is, each pixel) constituting the invisible light image of the leaf by the number of pixels, and a total sum (hereinafter, referred to as "total sum of the water content index") for each pixel of the reflection intensity ratio in all the pixels constituting the invisible light image of the leaf by the number of pixels are used as indexes of the water content. Further, a value of the pixel average water content index when water stress is not given (that is, at an initial stage) and a value of the total sum of the water content index each of which are normally indicated as 1.0 are also referred to as a standardized pixel average water content index (or simply referred to as "water content index") and a total sum of the standardized water content index. In this way, by expressing the initial value as 1.0 with relative value, it is possible to easily perform relative comparison of temporal changes of "pixel average water content index" and "total sum of the water content index" of leaves having different angle and leaf thickness. These pixel average water content index and the total sum of the water content index are calculated by using the reflection intensity ratio calculated for each pixel constituting the invisible light image of the leaf. Accordingly, the pixel average water content index is represented by "(1/number of pixels constituting invisible light image of leaf)×Σ Ln $(I_{905}/I_{1550})$", the total sum of the water content index is represented by "Σ Ln $(I_{905}/I_{1550})$", and both have a strong correlation with the water potential (in other words, the amount of water stress applied to plants). Note that, all the pixel areas constituting the invisible light image of the leaf are, for example, a set of areas where the pixel value (that is, the value of the reflection intensity ratio in the pixels corresponding to the positions where reference beam LS1 and measuring beam LS2 are radiated) is greater than threshold level Sh at the beginning of the measurement period. Note that, threshold level Sh may be a predetermined value, or may be calculated by using a method illustrated in FIG. 29 described below.

(Description of Detailed Operation relating to Detection of Water of Invisible Light Sensor)

Figure 8:
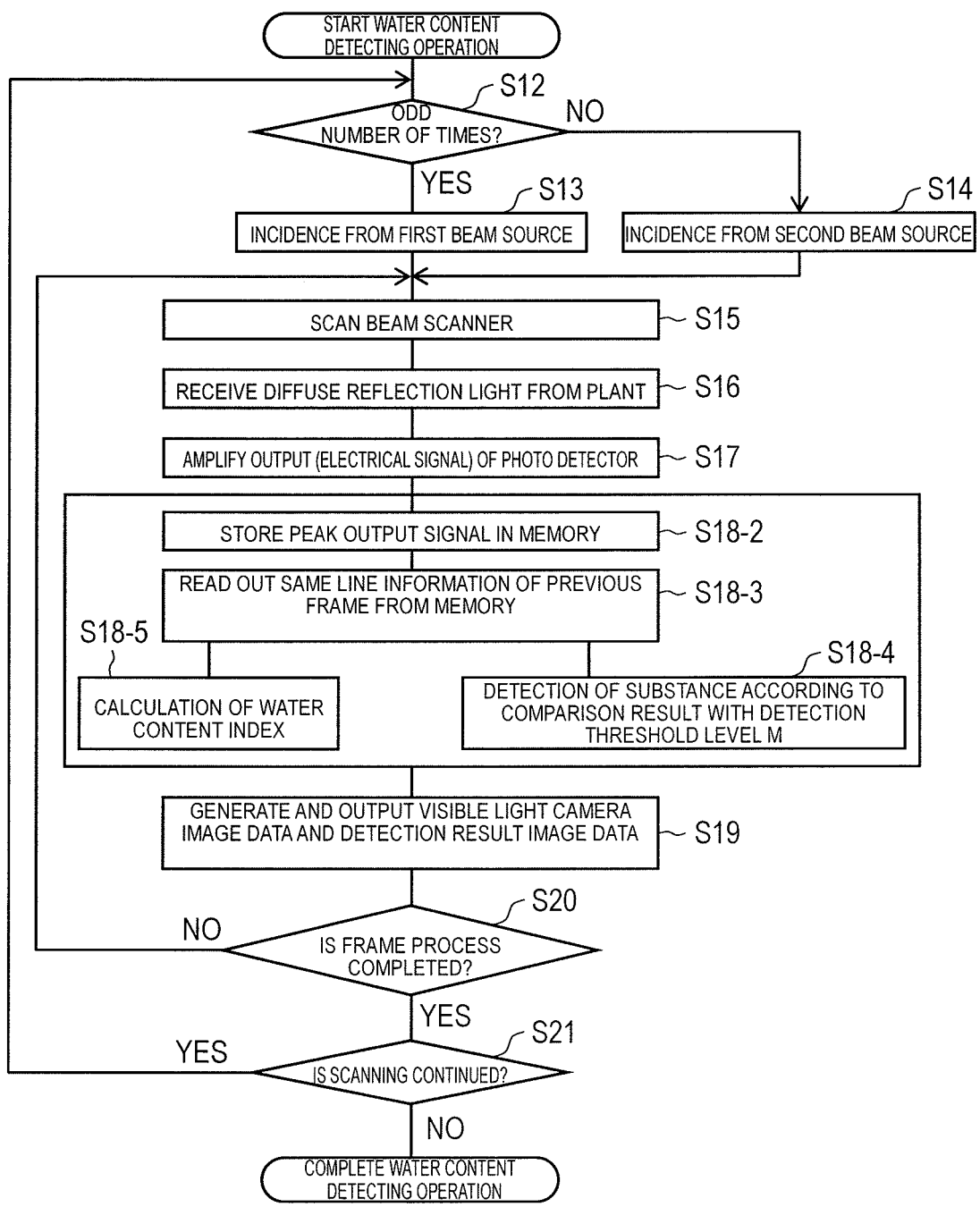
FIG. 8 is a flow chart illustrating a detailed operation procedure which relates to detection of water that is contained in a leaf of a plant in an invisible light sensor.

Next, a detailed operation procedure which relates to detection of water in invisible light sensor NVSS of plant detection camera 1 will be described with reference to FIG. 8. FIG. 8 is a flow chart illustrating a detailed operation procedure which relates to detection of water that is contained in leaf PT3 of plant PT in invisible light sensor NVSS. As a premise of description of the flow chart illustrated in FIG. 8, timing controller 11a outputs timing signal for beam scanning TR to first beam source 13 or second beam source 15, and reference beam LS1 or measuring beam LS2 from plant detection camera 1 is radiated toward leaf PT3 of plant PT.

In FIG. 8, controller 11 determines whether or not beam output signal RF in incidence period of an odd number of times is output from timing controller 11a (S12). In a case where controller 11 determines that beam output signal RF in incidence period of an odd number of times is output from timing controller 11a (YES in S12), first beam source 13 incidents reference beam LS1 according to beam output signal RF from timing controller 11a (S13). Beam scanner 17 one-dimensionally scans reference beam LS1 of one line or more in an X direction of plant PT which is contained in the angle of view of plant detection camera 1 (S15). At the irradiation position on each line in the X direction on which the reference beam LS1 is radiated, diffuse reflection light RV1 that is generated by reference beam LS1 being diffused and reflected is received by photo detector 23 via imaging optics 21 (S16).

In signal processor 25, output (electrical signal) in photo detector 23 of diffuse reflection light RV1 is converted to the voltage signal, and the level of the electrical signal is amplified up to a processable level in comparator/peak hold 25c (S17). Comparator/peak hold 25c binarizes the output signal of amplifier 25b and outputs to threshold level setter/water content index detector 27a according to a comparative result of the output signal of amplifier 25b and the predetermined threshold level. Comparator/peak hold 25c outputs peak information of output signal of amplifier 25b to threshold level setter/water content index detector 27a.

Threshold level setter/water content index detector 27a temporarily stores output (peak information) of comparator/peak hold 25c with respect to diffuse reflection light RV1 of reference beam LS1 in memory 27b (S18-2). In addition, threshold level setter/water content index detector 27a reads from memory 27b output of comparator/peak hold 25c with respect to the same line in diffuse reflection light RV1 or diffuse reflection light RV2 with respect to reference beam LS1 or measuring beam LS2 in a previous frame (incidence period) that is stored in memory 27b (S18-3).

Threshold level setter/water content index detector 27a detects presence or absence of water on the same line based on output (peak information) of comparator/peak hold 25c in diffuse reflection light RV1 of reference beam LS1 and output (peak information) of comparator/peak hold 25c in diffuse reflection light RV2 of measuring beam LS2 on the same line and predetermined detection threshold level M (S18-4).

Threshold level setter/water content index detector 27a as a water content calculation unit calculates the water content index which is total sum Σ Ln $(I_{905}/I_{1550})$ of the reflection intensity ratio (S18-5). Details of calculation of the water content index will be described below.

Display processor 29 uses output of detection result filter 27c and generates detection result image data that indicates the detection position of water. Display controller 37 outputs detection result image data that is generated by display processor 29 and visible light camera image data of a visible light image that is imaged by visible light camera VSC (S19). Each operation of steps S15, S16, S17, S18-2 to S18-5, and S19 is executed in each line within the detection area of one frame (incidence period).

That is, when each operation of steps S15, S16, S17, S18-2 to S18-5, and S19 is completed with respect to one line in the X direction, each operation of steps S15, S16, S17, S18-2 to S18-5, and S19 is performed with respect to a subsequent line in the X direction (NO in S20), hereinafter until each operation of steps S15, S16, S17, S18-2 to S18-5, and S19 is complete in one frame, each operation of steps S15, S16, S17, S18-2 to S18-5, and S19 is repeated.

Meanwhile, in a case where execution of each operation of steps S15, S16, S17, S18-2 to S18-5, and S19 is completed with respect to all lines in one frame (YES in S20), and in a case where scanning of incident light is continued (YES in S21), an operation of invisible light sensor NVSS returns to step S12. Meanwhile, in a case where scanning of reference beam LS1 and measuring beam LS2 is not continued (NO in S21), the operation of invisible light sensor NVSS is complete.

Figure 9:
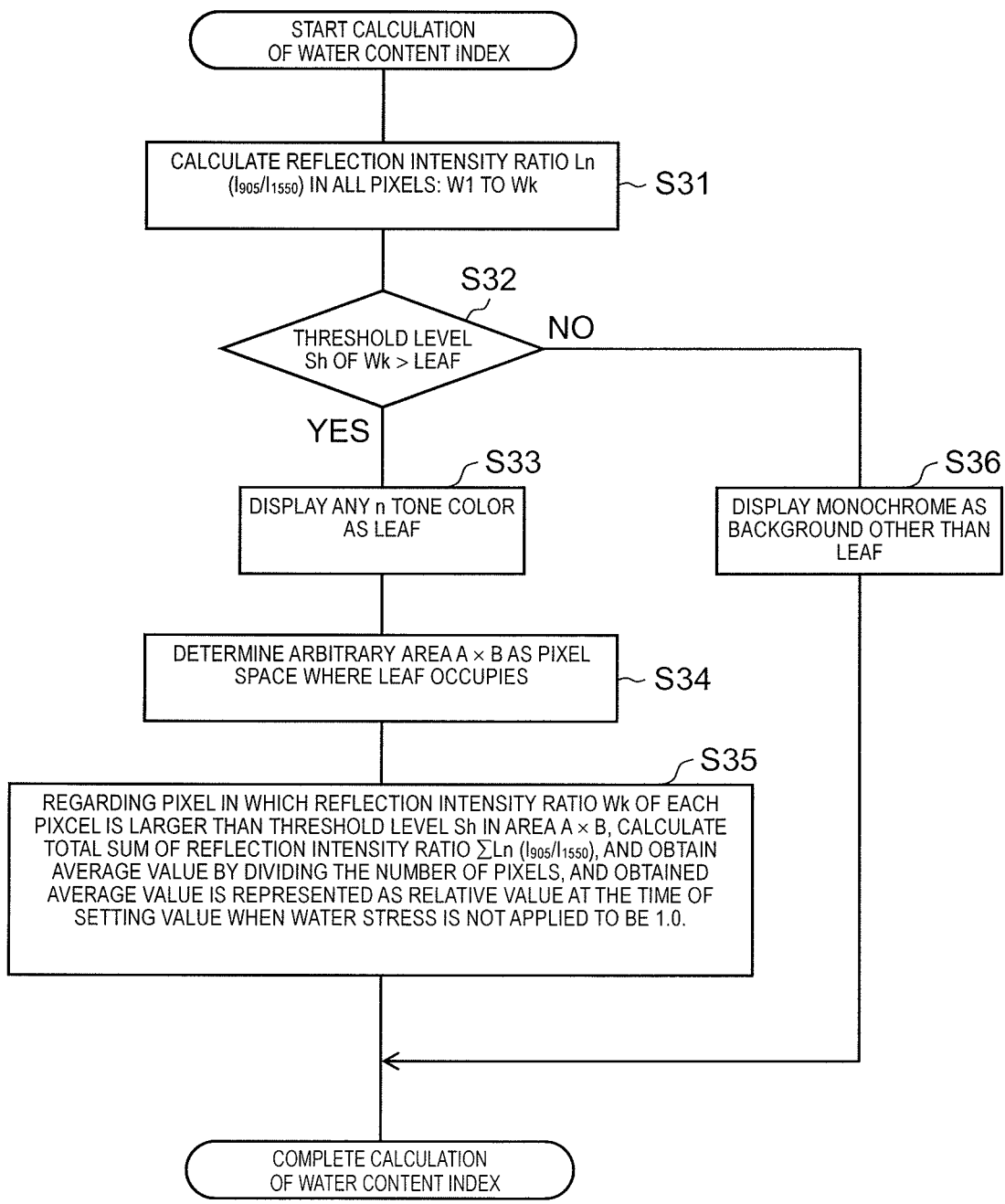
FIG. 9 is a flow chart illustrating a calculation procedure of a water content index in step S18-5.

FIG. 9 is a flow chart illustrating a calculation procedure of a water content index in step S18-5. Threshold level setter/water content index detector 27a calculates reflection intensity ratio Ln ($I_{905}/I_{1550}$) in all pixels from one frame of detection result image data which is invisible light image data (S31). Here, a measurement value of reflection intensity ratio Ln ($I_{905}/I_{1550}$) of each pixel is represented by reflection intensity ratios W1 to Wk. For example, in a case where the image of the near infrared beam is configured from 76,800 (=320×240) pixels, a suffix k of Wk is a variable which represents 1 to 76,800.

Threshold level setter/water content index detector 27a determines whether or not reflection intensity ratio Wk of each pixel is larger than threshold level Sh for identifying leaf PT3 (S32). An initial value of threshold level Sh is registered in advance in threshold level setter/water content index detector 27a as an empirical value. The empirical value is determined according to a specification of the device for observing water content (intensity of the irradiation laser beam, sensitivity of a light receiving element, and the like), water content (approximately 90%) of the leaf that is the measurement target, thickness of the leaf (for example, 200 μm), inside/outside (or "indoor/outdoor"), and the like. In particular, in a case of outside, there is change according to how sunlight hits or manner of growth of foliage, and the variable is changed each time.

For example, as the empirical value, in the case of an imaging distance of 1 m, threshold level Sh during imaging inside is set to approximately 0.3. Threshold level Sh during imaging outside is set to approximately 0.9. In addition, in the case of an imaging distance of 3 m, threshold level Sh during imaging inside is set to approximately 0.05. It is preferable to change threshold level Sh in a case where threshold level Sh is set as the initial value, it is determined whether or not the threshold level is optimal in comparison to the actual shape of the leaf, and the threshold level is not optimal. In addition, as will be described later, a calculation process of threshold level Sh is performed, and it is possible to register calculated threshold level Sh as the initial value.

In step S32, in a case where reflection intensity ratio Wk is less than threshold level Sh, the pixel is a pixel that represents a background other than the leaf, and display processor 29 generates monochromatic display data for displaying pixels monochromatically (S36).

Meanwhile, in step S32, in a case where reflection intensity ratio Wk is threshold level Sh or more (threshold level or more), display processor 29 displays pixels in a tone color corresponding to reflection intensity ratio Ln ($I_{905}/I_{1550}$) (S33). Here, it is possible to display the tone color corresponding to reflection intensity ratio Ln ($I_{905}/I_{1550}$) at n tone. n is an arbitrary positive number.

In detail, in a case where reflection intensity ratio Ln ($I_{905}/I_{1550}$) is less than 0.3, that is, in a case of being threshold level Sh of the leaf or less, the pixel is displayed using, for example, white (monochrome). Meanwhile, in a case where reflection intensity ratio Ln ($I_{905}/I_{1550}$) is 0.3 to less than 0.4, the pixel is displayed using, for example, dark green. In the same manner, in a case of being 0.4 to less than 0.5, the pixel is displayed using green. In a case of being 0.5 to less than 0.55, the pixel is displayed using yellow. In a case of being 0.55 to less than 0.6, the pixel is displayed using orange. In a case of being 0.6 to less than 0.75, the pixel is displayed using red. In a case of being 0.75 or more, the pixel is displayed using purple. In this manner, the color of the pixel that belongs to the leaf is set in any of six tones.

Note that, in a case where a pixel space which the leaf occupies is not appropriate in comparison to the actual shape of the leaf, the user may set threshold level Sh up or down in each predetermined increment (for example, 0.01). Alternatively, the user may set appropriate threshold level Sh by activating a process in which threshold level Sh described later is automatically set.

Threshold level setter/water content index detector 27a specifies an area of the pixel space where the leaf occupies (S34). The pixels of the leaf are pixels in which reflection intensity ratio Ln ($I_{905}/I_{1550}$) exceeds threshold level Sh (here, 0.3). In addition, area ARE of a rectangle (A×B) is specified such that the pixels of the leaf are enclosed. Area ARE is used as a value which determines the size of the leaf. Note that, the size of the leaf may represent the pixel number which exceeds threshold level Sh.

Threshold level setter/water content index detector 27a (water content calculation unit) calculates the total sum of the water content index Σ Ln ($I_{905}/I_{1550}$) that is a sum total of reflection intensity ratio Ln ($I_{905}/I_{1550}$) where a measurement value (reflection intensity ratio Ln ($I_{905}/I_{1550}$) is larger than threshold level Sh in area ARE (S35). The total sum of the water content which is contained in the entirety of the leaf is understood by obtaining water content index Σ Ln ($I_{905}/I_{1550}$).

Furthermore, in step S35, it is possible for threshold level setter/water content index detector 27a to calculate the number of pixels in which the measurement value (reflection intensity ratio Ln ($I_{905}/I_{1550}$) is larger than threshold level Sh in area ARE, and calculate an average value (referred to as pixel average water content index) by dividing total sum Σ Ln ($I_{905}/I_{1550}$) of the reflection intensity ratio by the number of calculated pixels. The average value is a value in which the total sum of the reflection intensity ratio is divided by the area of the leaf where the external form of the leaf is determined by threshold level Sh, and a value in which the total sum of the reflection intensity ratio in a spot is divided by a fixed area of the spot are different. After this, the calculation operation of the water content index ends.

In this manner, in the present embodiment, the reflection intensity ratio of each irradiation position is not obtained, the reflection intensity ratio of each pixel in the frame image is obtained, and it is possible to correctly calculate the water content index from the total sum of reflection intensity ratio of each pixel. Accordingly, it is possible to accurately determine status of the leaf, that is, the plant.

Figure 28A:
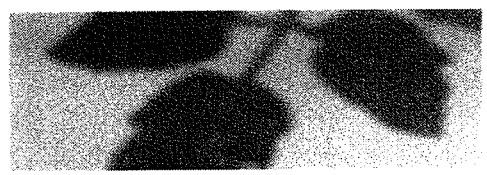
FIG. 28A is a frame image that images stalks and leaves of a tomato.
Figure 28B:
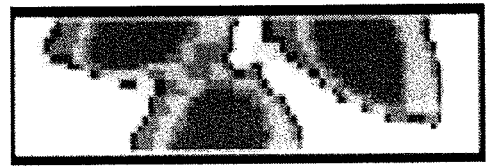
FIG. 28B is a diagram illustrating the occupancy space of the leaf which is obtained in a case where the imaging distance is set to 3 m and a threshold level is set to 0.05 with respect to the visible light image in FIG. 28A.
Figure 28C:
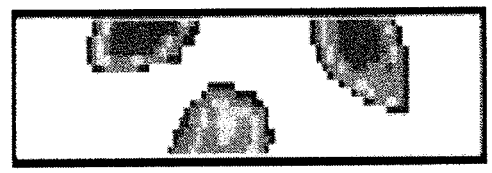
FIG. 28C is a diagram illustrating the occupancy space of the leaf which is obtained in a case where the imaging distance is set to 1 m and a threshold level is set to 0.3 with respect to the visible light image in FIG. 28A.

Here, as described above, threshold level Sh of the leaf is set to a subsequent value as the initial value. In a case where plant detection camera 1 is installed inside and leaf PT3 is imaged inside, and in a case where imaging distance is empirically 1 m, threshold level Sh is set to approximately 0.3. In the case of an imaging distance of 3 m, threshold level Sh is set to approximately 0.05. Meanwhile, in a case of imaging outside (for example, in a plastic greenhouse VGH), since a condition of external light (for example, sunlight) is fluctuated, threshold level Sh is empirically set to approximately 0.9. FIGS. 28A to 28C are diagrams illustrating an occupancy range of the leaf. FIG. 28A is a frame image that images stalks and leaves of a tomato. A distance between leaves is approximately 1 cm. FIG. 28B illustrates the occupancy space of the leaf which is obtained in a case where the imaging distance is set to 3 m and threshold level Sh is set to 0.05 with respect to the visible light image in FIG. 28A. In this case, it is understood that the leaves overlap in portions and threshold level Sh (=0.05) is a value that is inappropriately set. FIG. 28C illustrates the occupancy space of the leaf which is obtained in a case where the imaging distance is set to 1 m and threshold level Sh is set to 0.3 with respect to the visible light image in FIG.

28A. In this case, the outer form of the leaf does not overlap with another leaf, in addition, the occupancy space of the leaf is the same as the size of the outer form of the leaf of the visible light image. In this case, it is understood that threshold level Sh (=0.3) is a value that is correctly set.

Figure 29:
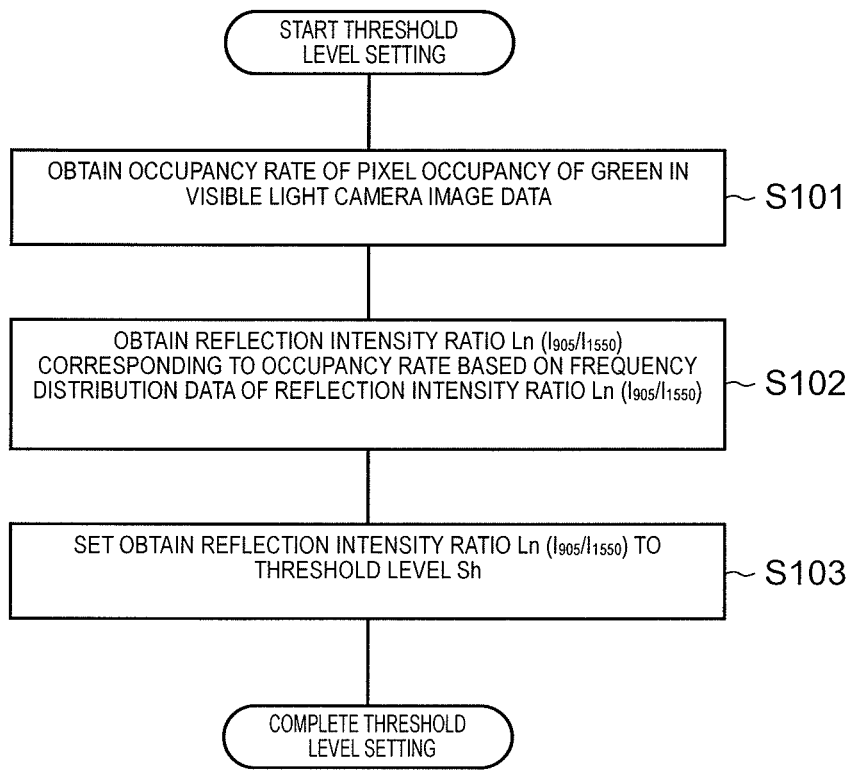
FIG. 29 is a flow chart illustrating a threshold level setting procedure.

In addition, threshold level Sh of the leaf may not be registered before the subsequent process is performed and the calculation process of the water content index indicated in FIG. 8 is executed. FIG. 29 is a flow chart illustrating a threshold level setting procedure.

Threshold level setter/water content index detector 27a obtains an occupancy rate that is determined as the leaf (G pixel number/all pixel numbers), i.e. a pixel occupancy of green (G) that is determined as the color of the leaf with respect to the frame image (for example, refer to FIG. 28A) that is imaged by visible light camera VSC (S101).

Figure 30:
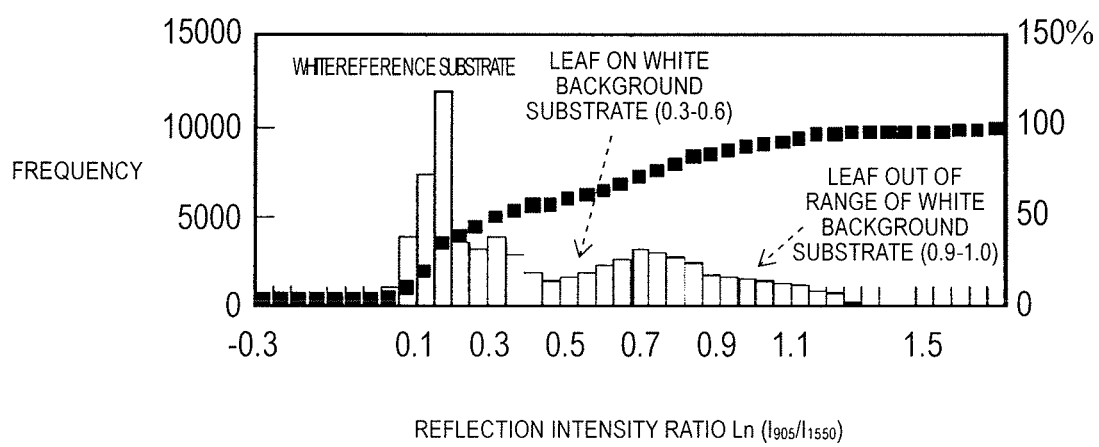
FIG. 30 is a graph illustrating the frequency distribution of the reflection intensity ratio in all pixels.

Threshold level setter/water content index detector 27a obtains the water content index corresponding to the occupancy rate of the leaf based on frequency distribution data of the water content index (S102). FIG. 30 is a graph illustrating the frequency distribution of the reflection intensity ratio in all pixels. Frequency distribution data is registered in threshold level setter/water content index detector 27a. When using the frequency distribution data, in a case where, for example, the occupancy rate that is determined as the pixel occupancy of green (G) that is determined as the color of the leaf is 52%, the water content index is approximately 0.3.

Threshold level setter/water content index detector 27a sets the water content index that is obtained in step S102 to threshold level Sh (S103). After this, threshold level setter/water content index detector 27a ends the present process.

In this manner, it is possible to correctly determine the outer form of the leaf by obtaining an occupancy pixel number of green (specified color) of the leaf and threshold level Sh corresponding to cumulative frequency of Ln ($I_{905}/I_{1550}$) that is the measurement value which is the same pixel number by utilizing the visible light image that is imaged by visible light camera VSC, that is, by modifying the threshold level of the water content of each pixel that is contained in the leaf. Accordingly, it is possible to accurately calculate the average value of the pixel unit by correctly determining the outer form of the leaf. In contrast to this, in a case where the fixed area of the spot or the outer form of the visible light image is used, when the outer form of the leaf is not correctly captured, a large error is generated in the average value of the pixel unit.

Here, Comparative Examples will be described for another method of measuring the water content in the leaf. FIG. 10 is a diagram illustrating an example of the method of measuring Comparative Examples. Macrophyll leaf PT3 that is sealed and packed in vinyl bag fk is taken out and fixed to white board wb such that leaf PT3 does not move. White board wb that is firmly fixed to leaf PT3 is placed on weight scale gm, and the weight is measured. At this time, since the weight of white board wb is measured in advance, and is adjusted by 0 points, the weight of the leaf is displayed on a meter of weight scale gm. Change of weight due to transpiration of the leaf is measured while the time elapses. After all measurement ends, the leaf completely dries and the weight is obtained. The average water content of the leaf during measurement is obtained by deducting the weight of the leaf during drying from the weight of the leaf during measurement. The average water content of the leaf substantially lowers while the time elapses.

On the other hand, in the present embodiment, at the time of measuring the water content of the leaf, a background material is disposed so as to cover a back surface (rear side) of the leaf that is the measurement target. As the material of the background material, a material that does not contain water and that does not deform due to pesticide, sprinkling, or $CO_2$ spraying is given such as plastic, coated paper, sheets such as aluminum foil (plate), a plate, or a block. In addition, it is desirable that the size of the background material has a large surface such that the leaf that is the measurement target is covered and is a size so as not to interfere with photosynthesis of another leaf within two times the projection area of the leaf that is the measurement target. In addition, it is preferable that the thickness of the background material is a thickness of 50 μm to 1 mm self-supporting without curling, and in particular, 50 to 200 μm. In addition, in a case of being supported by the stalk of the leaf, it is preferable that the weight of the background material is a weight to a degree that the leaf does not wilt. In addition, it is preferable that the color of the background material is white or silver with high reflectance of visible light and the near infrared beam.

In the present embodiment, as the background material, a case of using a white reference substrate is indicated. Note that, a white plastic plate, an aluminum plate, a standard white plate, white paper, and the like are given as the white reference substrate.

FIG. 11A is a graph illustrating an example of the reflection light intensity with respect to wavelength of the near infrared beam when near infrared beam is radiated toward the leaf outdoors. The vertical axis indicates intensity of the near infrared light which is detected by invisible light sensor NVSS, and the horizontal axis indicates wavelength of a near infrared area. Intensity of light that is scattered by the peripheral leaf other than intensity of light according to sunlight is included in intensity of the near infrared light which is detected by invisible light sensor NVSS. That is, a rise of the background due to multiple scattering of sunlight being carried out on the peripheral leaf is included in the intensity of the detected near infrared light. In addition, intensity of light detected by invisible light sensor NVSS is small due to the near infrared beam which has a wavelength of 1550 nm being absorbed by the peripheral leaf. Accordingly, the value of reflection intensity ratio Ln ($I_{905}/I_{1550}$) is large. Therefore, in a case where water content of the leaf outside is measured, it is necessary to set the value of threshold level Sh that is compared to reflection intensity ratio Ln ($I_{905}/I_{1550}$ to be large.

FIG. 11B is a graph illustrating an example of the reflection light intensity with respect to wavelength of the near infrared beam when near infrared beam is radiated toward the leaf on which white reference substrate bd is installed indoors and outdoors. The vertical axis indicates intensity of the near infrared light which is detected by invisible light sensor NVSS, and the horizontal axis indicates wavelength of a near infrared area. Multiple scattering from peripheral leaf PT3o does not occur due to white reference substrate bd being disposed to cover the back surface (rear side) of leaf PT3t that is the measurement target. Accordingly, a lowering of intensity of the near infrared beam which has a wavelength of 1550 nm does not occur. In addition, in the case of inside, a rise of the background does not occur. Note that, in a case of measuring outside, threshold level Sh is set to approximately 0.5. In addition, in a case of measuring inside, threshold level Sh is set to approximately 0.3.

In a case where white reference substrate bd is disposed on the back surface of leaf PT3t that is the measurement target, the leaf may be disposed without being fixed, and leaf PT3t may be attachably fixed to white reference substrate bd. Here, a case where leaf PT3t is attached to white reference substrate bd is illustrated. In each embodiment including the present embodiment, as seen from first beam source 13 and second beam source 15 of plant detection camera 1, white reference substrate bd is disposed on the back of at least one leaf that is the measurement target.

FIG. 12 is a diagram which describes an example of attachment of leaf PT3t on white reference substrate bd. White reference substrate bd is a white plastic plate which has a vertical rectangular shape. Aperture bd1 that is hollowed out in a rectangular shape is formed in the center of white reference substrate bd. In addition, round hole bd2 is formed in an upper portion of white reference substrate bd. Slit bd21 which reaches up to an upper end surface is formed on hole bd2. In addition, three slits bd3, bd4, and bd5 are respectively formed on the lower side and both sides of aperture bd1 that is formed on white reference substrate bd.

In a case where leaf PT3t is attached to white reference substrate bd, a tip end of leaf PT3t is inserted into one of three slits bd3, a void is generated by shifting horizontal white reference substrate bd in a longitudinal direction centered on slit bd21, stalk PT2 of the leaf passes inside, and stalk PT2 is fixed to hole bd2.

Next, control experiment for the water potential contained in the leaf is performed as the observation of the water content contained in the leaf of plant PT by using plant detection camera 1 of the present embodiment, and the sugar content in the leaf due to the water stress obtained by the result of the experiment is considered.

Figure 13:
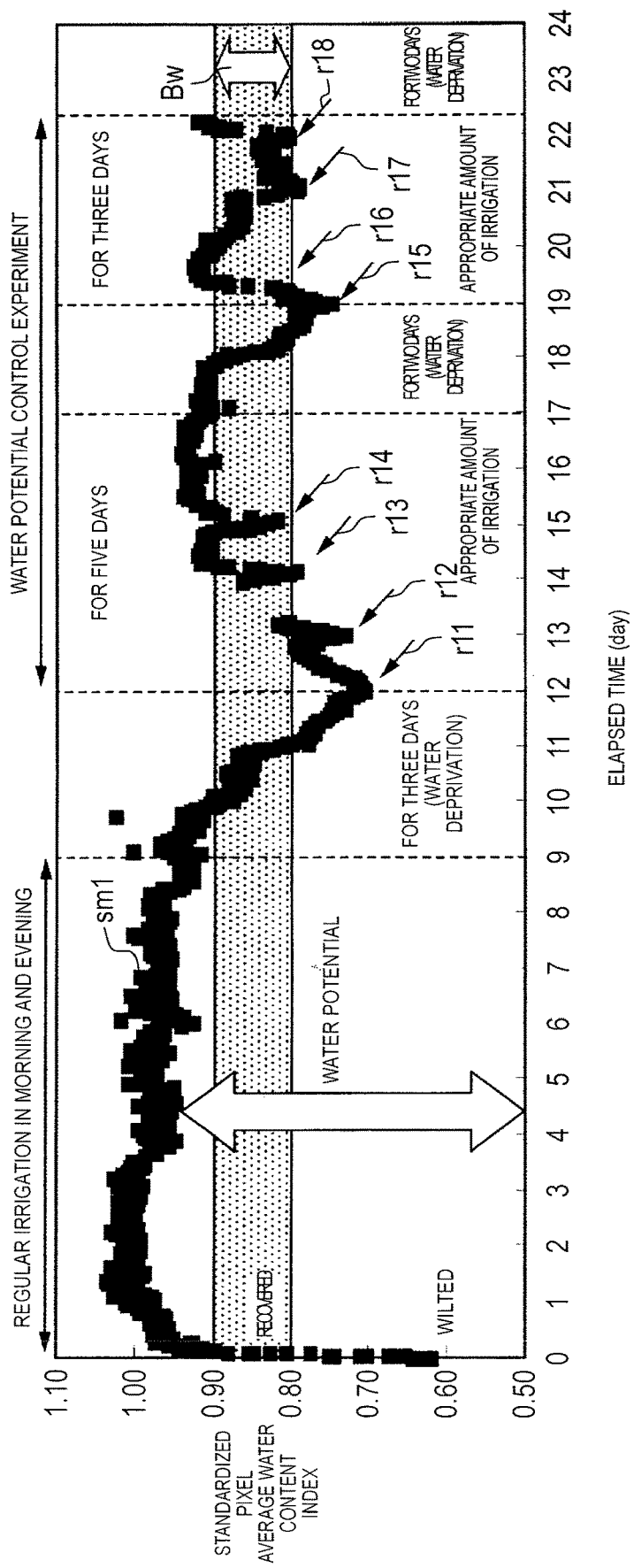
FIG. 13 is a graph illustrating an example of a time change of a standardized pixel average water content index in a first water potential control experiment.

FIG. 13 is a graph illustrating an example of a time change of standardized pixel average water content index Dw in the first water potential control experiment. The vertical axis of the graph indicates a standardized pixel average water content index. The standardized pixel average water content index corresponds a water potential as an index of the water content contained in the leaf that is a measurement target, and represents an average water content in the leaf contained in each pixel in the invisible light image (that is, a detection result image output from display processor 29) with respect to the leaf of the plant. The horizontal axis of the graph represents the elapsed time in days. Target range Bw as an example of the range of the target water content represents, for example. The target range of water content determined to be suitable for increasing a sugar content of a fruit of a tomato, and here, a value corresponding to standardized pixel average water content index Dw is set to be a value in a range of 0.8 to 0.9. This target range Bw varies depending on the types of plants and even the same plants or the site of observation (leaves, stems, and the like). In addition, in FIG. 13 and FIG. 14, in a case where standardized pixel average water content index Dw is smaller than target range Bw, the plant feels water stress.

The first water potential control experiment as illustrated in FIG. 13 shows an example of time-serial change of the standardized pixel average water content index in a case where irrigation with nearly adequate irrigation amount is performed at irrigation timing. In FIG. 13, starting from a state where the leaf which is plant sample sm1 is wilted, the water potential control experiment is started after recovering by regular irrigation. In the regular irrigation, irrigation was periodically performed twice a day in the morning and evening in the day. On the other hand, in the water potential control experiment, the irrigation is performed at the timing determined to be appropriate based on the value of standardized pixel average water content index Dw, and periodical irrigation is not performed. Hereinafter, experiment results illustrated in FIG. 13 will be described. In addition, a temporal change of standardized pixel average water content index Dw as illustrated in FIG. 13 is displayed on monitor 50.

Standardized pixel average water content index Dw of the leaf begins with a wilting state close to the value 0.60 and normal irrigation is started (day 0). After the start of normal irrigation, the next day, standardized pixel average water content index Dw of the leaf recovered to the value close to 1.0. In addition, the normal irrigation was periodically (days 1 to 8) performed so that the value of standardized pixel average water content index Dw of the leaf was kept to be close to 1.0 for about a week. After that, water deprivation was performed for three days (days 9, 10, and 11). As a result of water deprivation, standardized pixel average water, content index Dw of the leaf was gradually decreased and fell down to the value close to 0.7 (day 12).

As indicated by arrow r11 at current point, when a certain amount of irrigation is performed, standardized pixel average water content index Dw in the leaf rises and the peak thereof is temporarily included within target range Bw, then falls down based on the non-irrigation, and falls out of target range Bw. When the same certain amount of the irrigation is performed again at the timing indicated by arrow r12, standardized pixel average water content index Dw in the leaf rises again and the peak thereof is temporarily included in target range Bw, and thereafter, standardized pixel average water content index Dw in the leaf falls down based on the non-irrigation. At this time, standardized pixel average water content index Dw is lower than target range Bw, but the deviation amount thereof is smaller than that in the previous time. When the same certain amount of the irrigation is performed again at the timing indicated by arrow r13, the peak of standardized pixel average water content index Dw falls down after exceeding the upper limit value of target range Bw, but in this time, standardized pixel average water content index Dw is not lower than target range Bw. Furthermore, when the same certain amount of the irrigation is performed at the timing indicated by arrow r14, the peak of standardized pixel average water content index Dw falls down after exceeding the upper limit value of target range Bw, but standardized pixel average water content index Dw is mostly stayed in target range Bw (days 12 to 16).

Even though water deprivation occurred for the following two days (days 17 and 18), as indicated by arrows r15, r16, r17, and r18, similar irrigation was performed so that standardized pixel average water content index Dw was controlled to be substantially within target range Bw.

Figure 14:
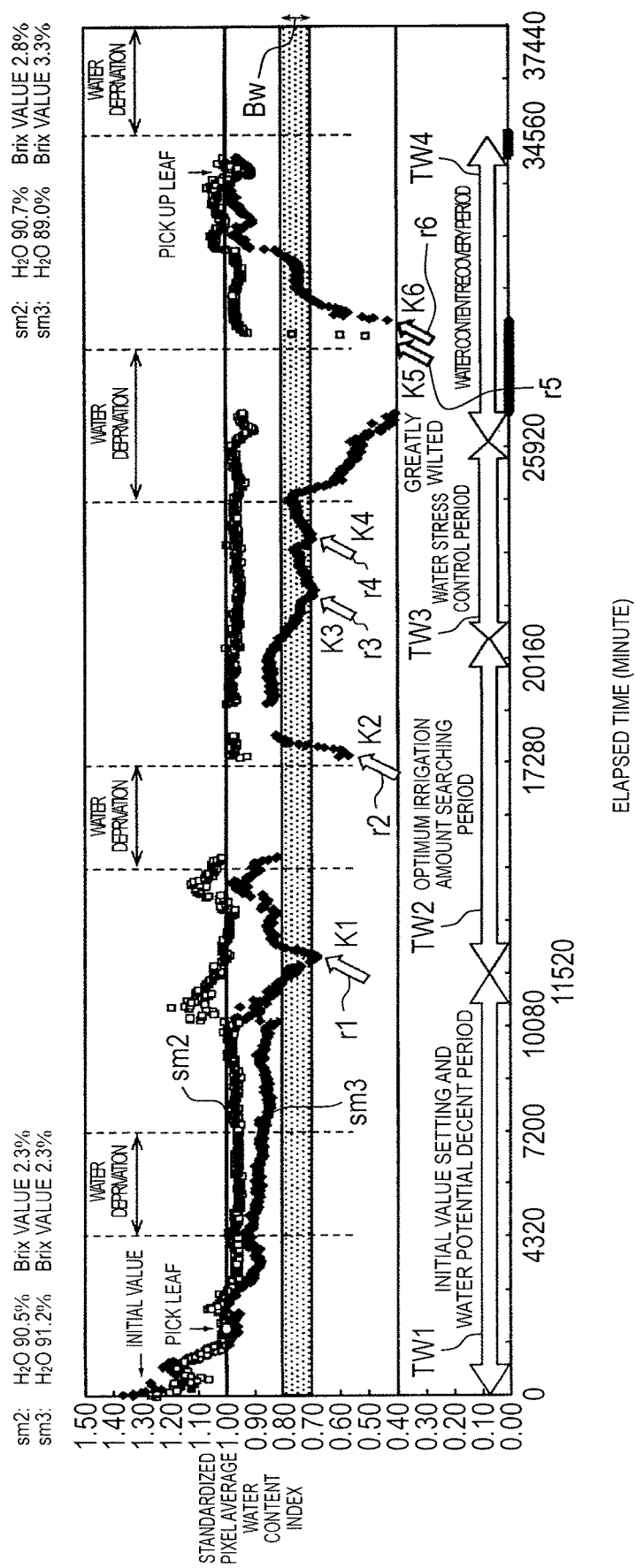
FIG. 14 is a graph illustrating an example of a time change of a standardized pixel average water content index in a second water potential control experiment.

FIG. 14 is a graph illustrating an example of a time change of standardized pixel average water content index Dw in the second water potential control experiment. The vertical axis of the graph indicates standardized pixel average water content index Dw, as illustrated in FIG. 13. The horizontal axis of the graph represents the elapsed time in minutes. In the second water potential control experiment, two plant samples sm2 and sm3 (for example, tomatoes) of the same types, which are different from the first plant sample sm, were used. For plant sample sm2 (Comparative Example), the normal irrigation is periodically performed twice a day in the morning and evening in the day. On the other hand, for plant sample sm3 (Example corresponding to the present embodiment), the irrigation is performed while applying the water stress based on the non-irrigation. That is, for plant sample sm3, similar to the water potential control period (days 12 to 22) as illustrated in FIG. 13, the irrigation is only performed at the irrigation timing.

In the second water potential control experiment, as illustrated in FIG. 14, the observation of standardized pixel average water content index Dw in the leaf was performed during four periods of water potential descent period TW1, optimum irrigation amount searching period TW2, water stress control period TW3, and water content recovery period TW4. Target range Bw of standardized pixel average water content index Dw was different from target range Bw illustrated in FIG. 13, and was set to be a value in a range of in a range of 0.70 to 0.80. The reason for this is that the plant samples used in the second water potential control experiment were different from each other.

The initial values of the water content rate of the leaf in Comparative Example and Example are respectively 90.5% and 91.2%, which are almost the same each other. In addition, these standardized pixel average water content indexes Dw are close to the value of 1.30, which are almost the same each other. Further, the Brix values representing the sugar content of Comparative Example and Examples are the value of 2.3%, which are almost the same each other.

During the period of the control experiment of the water potential, the normal irrigation was continued for plant sample sm2 of Comparative Example.

On the other hand, the irrigation was not performed for plant sample sm3 of Example during water potential descent period TW1 (period from 0 to 11520 minutes) for plant sample sm3 of Example. As a result, since the initial value is set, standardized pixel average water content index Dw in the leaf of Comparative Example is nearly constant at the value close to 1.0; whereas standardized pixel average water content index Dw in the leaf of Example is gradually lowered, and is smaller than the value 0.70 which is the lower limit value of target range Bw at the end of water potential descent period TW1.

In optimum irrigation amount searching period TW2 (period from 11520 to 20160 minutes), firstly, standardized pixel average water content index Dw in the leaf of Example was smaller than the lower limit value of 0.70 of the target range so that the irrigation of irrigation amount K1 was performed at the time (timing) indicated by arrow r1. As a result, standardized pixel average water content index Dw in the leaf of Example rapidly rose, exceeded the upper limit value of target range Bw, and became the value close to 1.00. It is determined that irrigation amount K1 was excessively large at this point. After that, the water deprivation period began, and standardized pixel average water content index Dw in the leaf of Example was smaller than the lower limit value of the target range again so as to reach the value of 0.60. The water deprivation period is completed, irrigation of irrigation amount K2 was performed at the time indicated by arrow r2. As a result, standardized pixel average water content index Dw rose, and slightly exceeded target range Bw. Based on these results displayed on monitor 50, it can be determined that the optimum irrigation amount is less than irrigation amounts K1 and K2.

In water stress control period TW3 (period from 20160 to 25920), when standardized pixel average water content index Dw in the leaf of Example was decreased again, and was smaller than the lower limit value of target range Bw, the irrigation with irrigation amount K3 smaller than irrigation amounts K1 and K2 was performed at the time indicated by arrow r3. Also, standardized pixel average water content index Dw was smaller than the lower limit value of target range Bw, and at the time indicated by arrow r4, the irrigation was performed with irrigation water amount K4 similar to irrigation water amount K3. As described above, when the irrigation with irrigation water amounts K3 and K4 is intermittently performed, standardized pixel average water content index Dw transitions so as to be substantially within target range Bw while applying the water stress to plant sample sm3. Thereafter, since the leaf of plant sample sm3 of Example entered a certain water deprivation period, the degree of wilting of the leaf was increased, standardized pixel average water content index Dw was decreased, and thereby standardized pixel average water content index Dw of plant sample sm3 dropped to the value of 0.4.

The water deprivation period was completed, and in water content recovery period TW4 (period from 25920 to 34560), the degree of wilting of the leaf of plant sample sm3 was large, and thus the irrigation was performed with irrigation amounts K5 and K6 which are larger than irrigation amounts K3 and K4 at the time indicated by arrows r5 and r6.

At the end of water content recovery period TW4, when the rate of water content in the leaf of the plant samples sm2 and sm3 in Comparative Example and Example reached approximately the same values as the initial values (90.7%, 89.0%), as a result of measuring the Brix value representing each sugar content, the Brix value in Comparative Example was 2.8%; whereas in Example, the Brix value was 3.3%. That is, the Brix value of Comparative Example was increased by 0.5% from the value of 2.3% to 2.8% before and after the water potential control; whereas the Brix value of Example was greatly increased by 1% from the value of 2.3% to 3.3%.

In this way, compared to plant sample sm2 of Comparative Example in which the irrigation was performed at regular intervals without applying the water stress, in plant sample sm3 of Example, the irrigation was performed at the timing when standardized pixel average water content index Dw reached close to the lower limit of the target range so that an increase in the sugar content in the leaf was increased, and the sugar content in the leaf was increased due to the water stress. In this way, it was found that the leaf quality was increased by applying the water stress through the water potential control experiment in FIG. 14.

Here, the sugar content in the leaf was measured in the following procedures (T1) to (T5).

(T1) A leaf such as a tomato is dried at temperature of 105° C. for two hours. From this change in weight, the water content can be calculated.

(T2) The dried leaf is put into a mortar, and is crushed and ground to be in a powder state.

(T3) The powder obtained by crushing the leaf is put into a container containing hot water at 60° C. which has four times water content (before drying) contained in the leaf, and stir at room temperature for 2 hours.

(T4) The container containing the leaf powder is left to stand, and the leaf powder is allowed to be settled spontaneously for 15 hours or more.

(T5) A supernatant was extracted and the Brix value thereof was measured by using a sugar meter. Here, since this Brix value is a provisional Brix value obtained using hot water four times the water content in the leaf, a true Brix value can be obtained according to Expression (1). Note that, the calculation of the true Brix value by Expression (1) may be performed by controller 11 when the Brix value obtained by the sugar content meter is input.

$$\text{True Brix value (\%)} = [\text{provisional Brix value} \times \text{after content} \times 4 \text{ times}/(1-\text{provisional Brix value})] \div [\text{water content} + (\text{provisional Brix value} \times \text{water content} \times 4 \text{ times})/(1-\text{provisional Brix value})] \times 100 \qquad (1)$$

Figure 15:
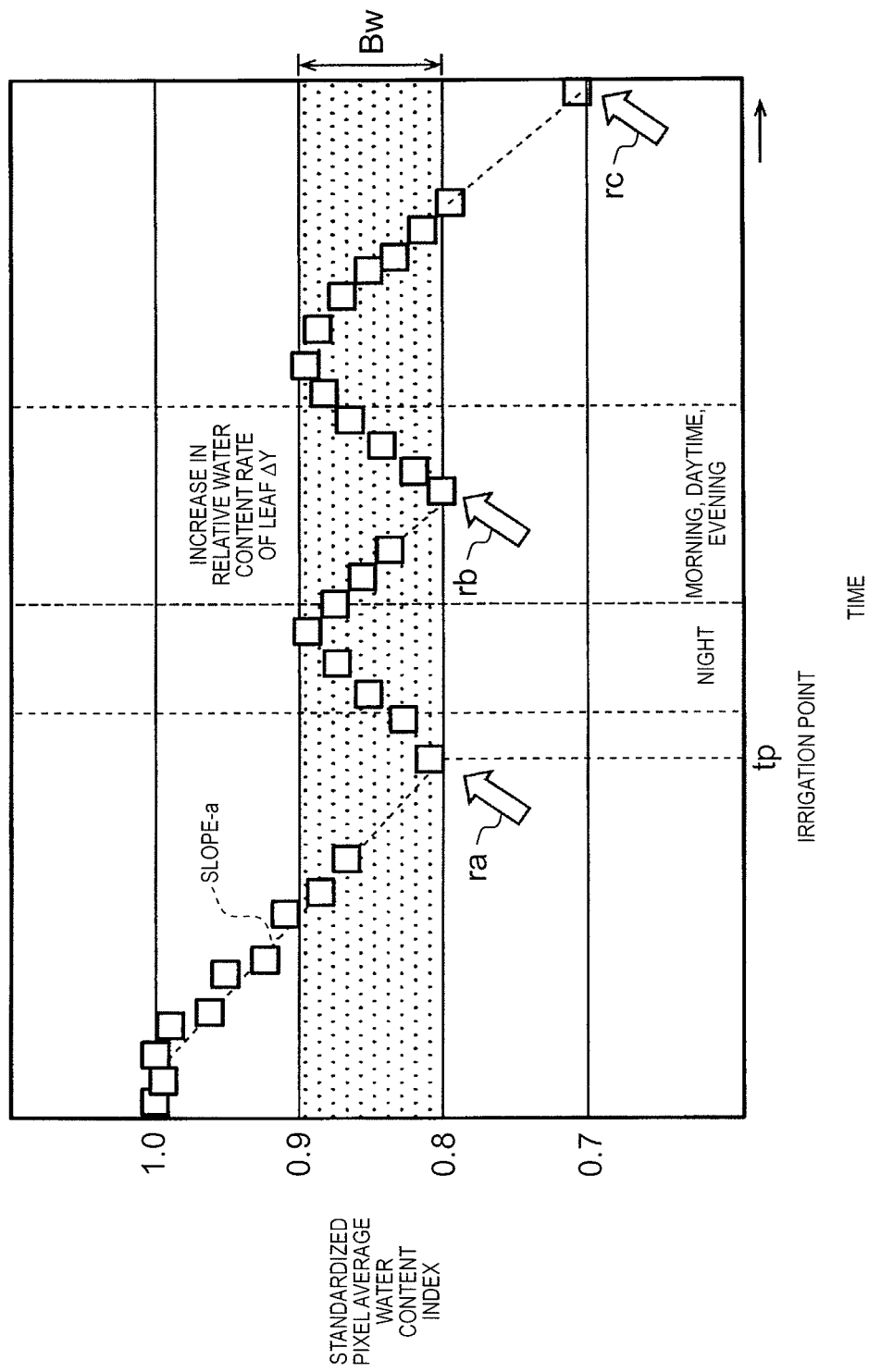
FIG. 15 is a graph illustrating an example of an irrigation amount and irrigation timing.

On the basis of the control experiment of the water potential, the following irrigation amount and irrigation timing are considered. FIG. 15 is a graph illustrating an example of an irrigation amount and irrigation timing. The vertical axis of the graph indicates a standardized water content index (that is, standardized pixel average water content index Dw). The horizontal axis represents elapsed time. In the graph, a measurement point is represented by a rectangle. Target range Bw is set to be a value in a range of 0.8 to 0.9.

An initial value of standardized pixel average water content index Dw in the leaf is set a value of 1.0. When standardized pixel average water content index Dw is gradually decreased with the lapse of time from the initial value and reaches close to the lower limit value of target range Bw, the following irrigation is performed. When a slope (descending speed) at which standardized pixel average water content index Dw is decreased is "−a", the timing indicated by arrow ra at which standardized pixel average water content index Dw crosses the lower limit value of target range Bw is irrigation point tp.

Irrigation amount Kp in irrigation point tp is calculated by using, for example, Expression (2).

$$\text{Next water content in leaf} = \text{present water content in leaf} + \text{amount of water absorption from root} - \text{amount of transpiration from leaf} \quad (2)$$

Here, the amount of water absorption from the root is calculated by the irrigation amount, osmotic pressure (electric conductivity) of a liquid fertilizer, the number (surface area) of roots, and the like. The amount of transpiration from the leaf is obtained from the number of leaves, a leaf area, saturation deficit (that is, a difference between saturated water vapor pressure and relative humidity), and the like. Generally, it is said that photosynthesis of a leaf is active and the transpiration is actively performed on a sunny day and when the saturation deficit is between 3 to 7 $g/m^3$ (that is, the period in which the relative humidity is around 75% RH). Therefore, the water content in the leaf tends to be decreased due to the transpiration in the morning and daytime on a sunny day; whereas in the evening (sunset), when the amount of transpiration of the leaf is decreased, the water content in the leaf is increased. In addition, the leaf is not subjected to the photosynthesis at night, and thus the change in the water content in the leaf is small. Since the relative humidity is high on a rainy day, the transpiration is not performed even if the pore is opened, and thus the change in the water content in the leaf is small, and on the day when the temperature is high such as summer, the plant closes the pores so as not to lose the water in the body any more so that the transpiration is not performed, and thereby the change in the water content in the leaf is small.

When the irrigation is performed, standardized pixel average water content index Dw rises, reaches the upper limit value of target range Bw, and then repeats a falling-down operation. At the timing indicated by arrow rb, the same irrigation as that at the timing indicated by arrow ra is performed. Thereafter, at the timing indicated by arrow rc, the irrigation is performed at the timing when standardized pixel average water content index Dw reaches the value 0.7, which is lower than the lower limit value of target range Bw, that is, in a state where the water stress is increased. This makes it possible to apply the water stress to the plant.

Figure 16:
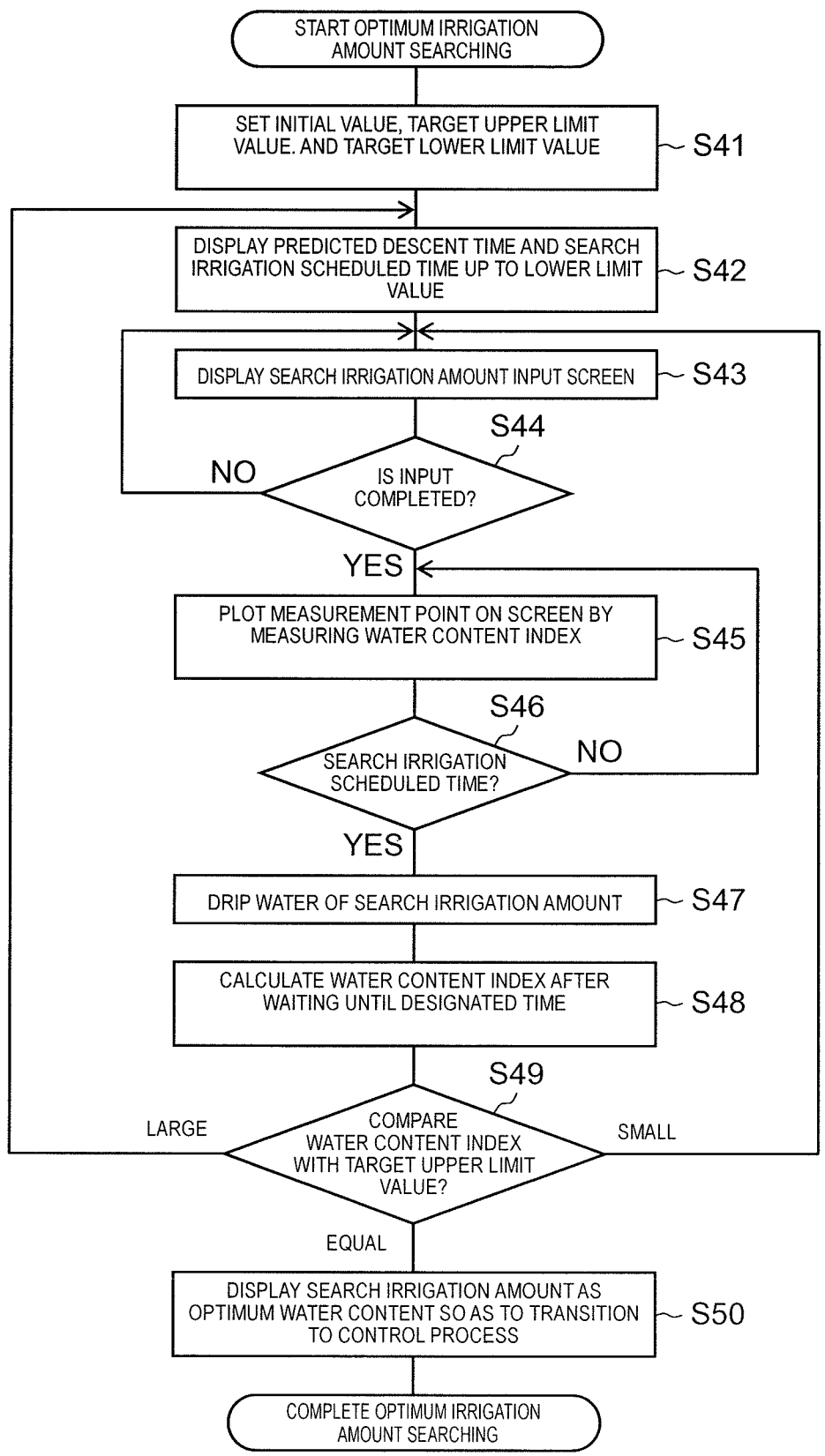
FIG. 16 is a flow chart illustrating an example of searching procedure of the optimum irrigation amount of the first embodiment.
Figure 17:
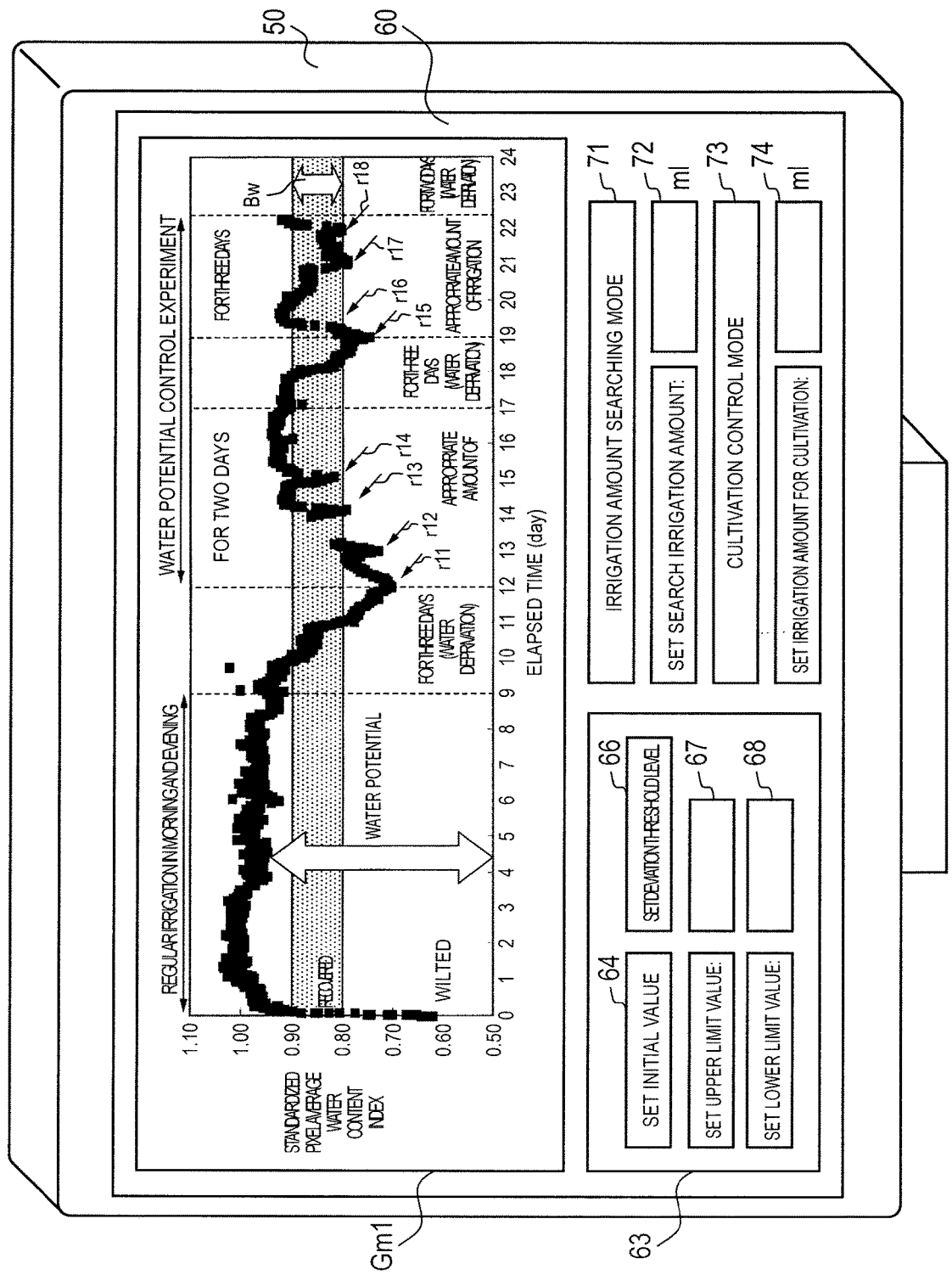
FIG. 17 is a diagram illustrating an example of a user interface (UI) screen relating to water potential control.

FIG. 16 is a flow chart illustrating an example of searching procedure of the optimum irrigation amount in the first embodiment. This optimum irrigation amount searching operation is a process executed in optimum irrigation amount searching period TW2 as illustrated in FIG. 14. For example, when irrigation amount searching mode button 71 is pressed on UI screen 60 as illustrated in FIG. 17, the optimum irrigation amount searching operation is executed.

In the optimum irrigation amount searching operation, first, controller 11 sets an initial value, and the upper limit value and the lower limit value of target range Bw by the operation of a user (for example, a farmer who is a breeder of tomatoes) with respect to the UI screen 60 (S41). Controller 11 displays a predicted descent time and a search irrigation scheduled time up to the lower limit value of target range Bw (S42). Note that, this search irrigation scheduled time is set to be the same as or near the predicted descent time.

Figure 18:
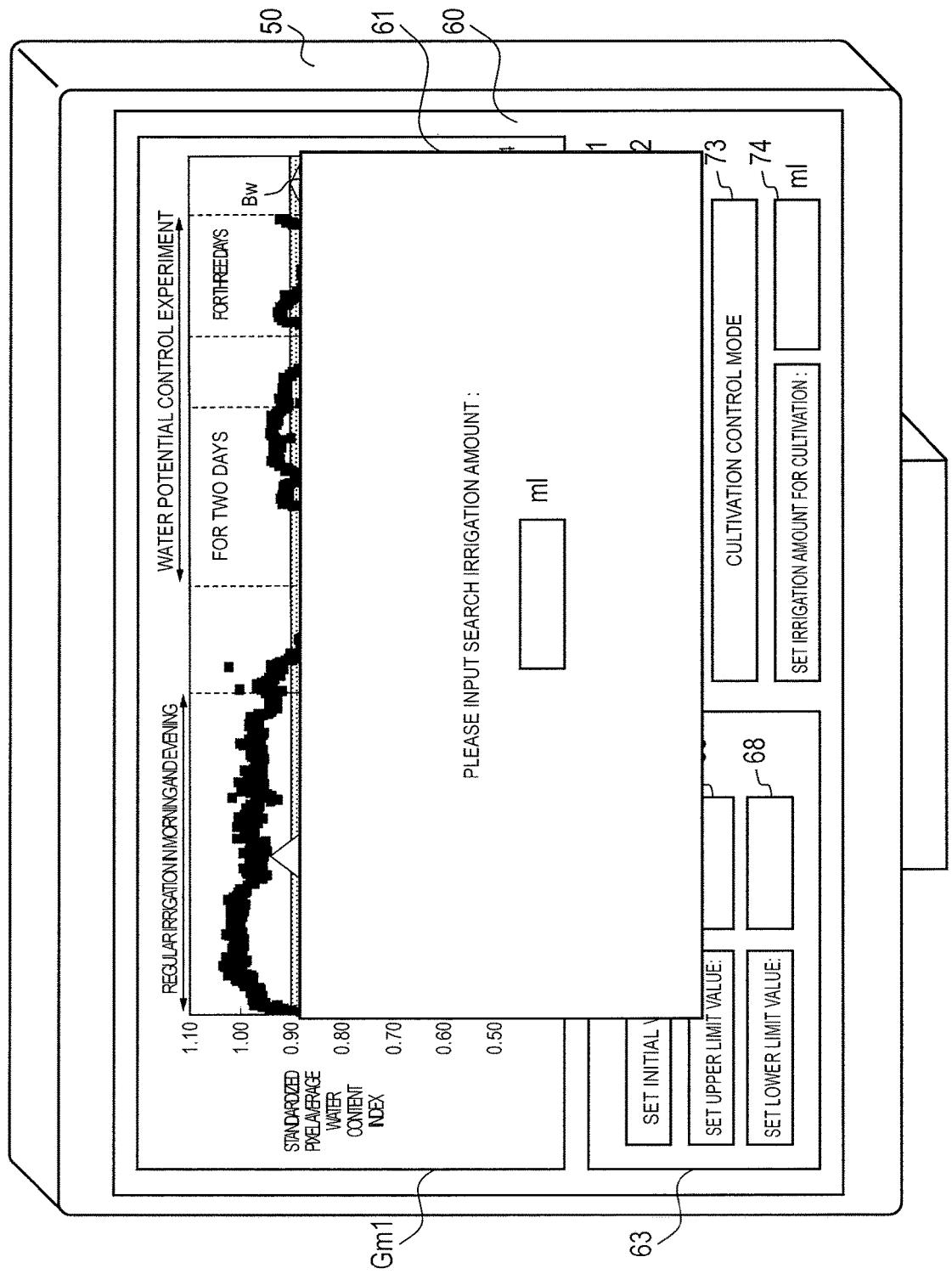
FIG. 18 is a diagram illustrating an example of a search irrigation amount input screen pop-up displayed on a UI screen.

Controller 11 displays search irrigation amount input screen 61 illustrated in FIG. 18 (S43). Controller 11 determines whether or not the input of the search irrigation amount has been completed (S44), and if the input is not completed, controller 11 continues to display search irrigation amount input screen 61 in step S43.

In addition, when the input of the search irrigation amount is completed, controller 11 measures standardized pixel average water content index Dw, and adds this measurement point to the graph in screen for monitoring water content in leaf Gm1 which is displayed on UI screen 60 (S45). Controller 11 determines whether or not search irrigation scheduled time has come (S46). In a case where the search irrigation scheduled time has come, controller 11 returns to the process of step S45.

When the search irrigation scheduled time has come, controller 11 controls the dripping of the water of the search irrigation amount (S47). The search irrigation amount corresponds to irrigation amounts K1 and K2 in FIG. 14. In addition, the dripping of the water of the search irrigation amount may be automatically performed by fertilizer water supply device WF, or may be performed manually by a person. After waiting until the designated time, controller 11 calculates the water content index (S48). This designated time is a time designated so that standardized pixel average water content index Dw reaches the upper limit value of target range Bw, and is set based on the predicted descent time and the search irrigation scheduled time.

Controller 11 compares standardized pixel average water content index Dw with the upper limit value of target range Bw (S49). In a case where standardized pixel average water content index Dw exceeds the upper limit value of target range Bw, controller 11 returns to step S42, and displays the predicted descent time and the search irrigation scheduled time on UI screen 60 again. In addition, in a case where standardized pixel average water content index Dw does not exceed the upper limit value of target range Bw, controller 11 returns to step S43, and displays search irrigation amount input screen 61.

Further, in a case where standardized pixel average water content index Dw becomes equal to the upper limit value of target range Bw, controller 11 displays the search irrigation amount as an optimum water content so as to change to the process of the cultivation control (S50). This display is pop-up displayed, for example, by a message or the like. Thereafter, controller 11 completes the present operation.

FIG. 17 is a diagram illustrating an example of a user interface (UI) screen 60 relating to water potential control. UI screen 60 includes screen for monitoring water content in leaf Gm1. A graph representing a time-serial change of standardized pixel average water content index Dw is displayed on screen for monitoring water content in leaf Gm1 disposed on the upper portion of UI screen 60. This graph is similar to the graph of FIG. 13 described above.

Set area 63 is displayed on the left side of the lower portion of UI screen 60. Initial setting button 64 and deviation threshold level setting button 66 are disposed in set area 63. In addition, input box 67 for setting the upper limit value of target range Bw and input box 68 for inputting the lower limit value of target range Bw are disposed. For inputting numerical values to input boxes 67 and 68, it is possible to use a touch panel, a numeric keypad, a portable terminal, or the like.

Figure 19:
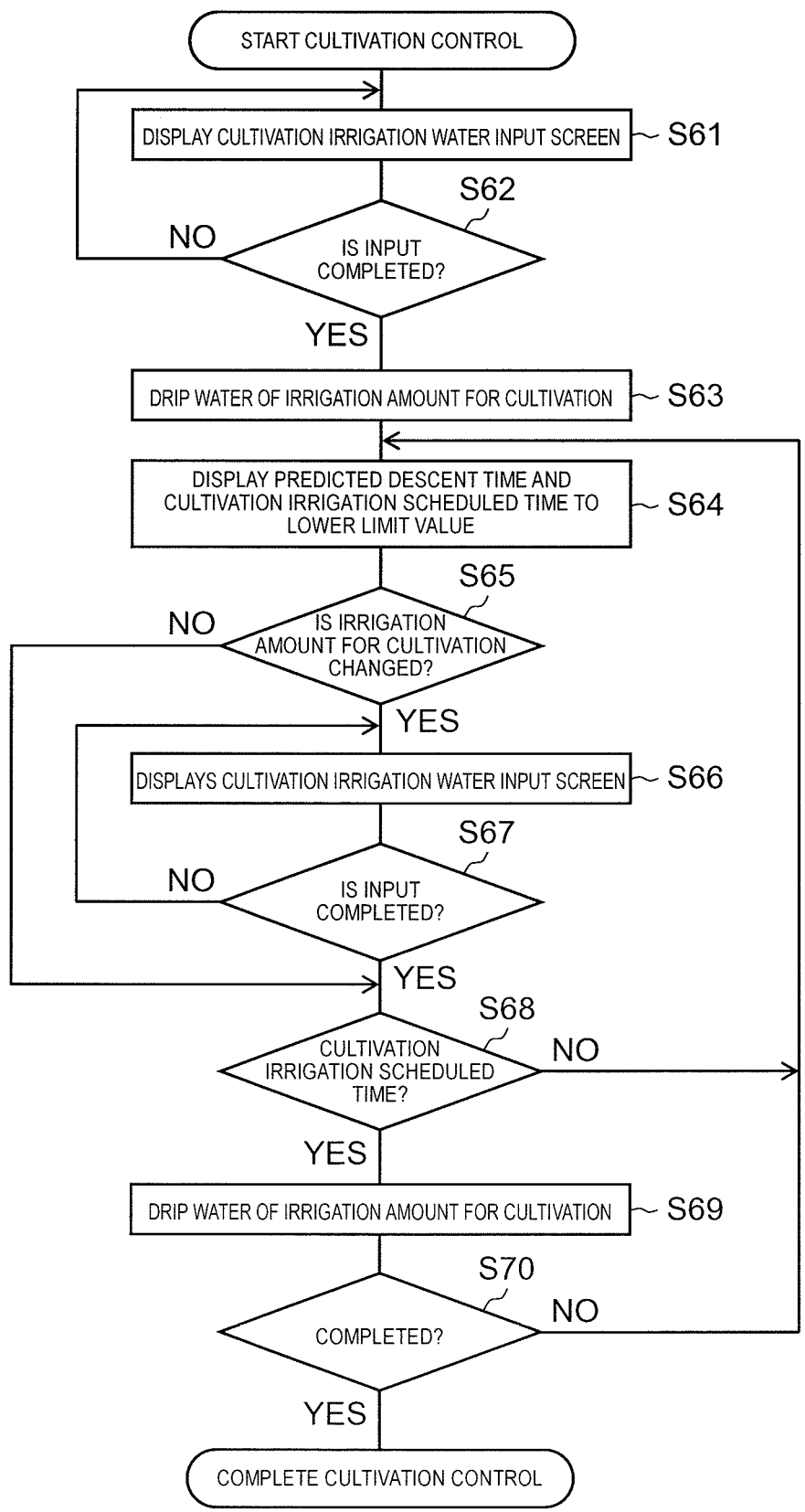
FIG. 19 is a flow chart illustrating an example of procedure of water stress control (cultivation control) of the first embodiment.

In addition, irrigation amount searching mode button 71 and water stress control (cultivation control) mode button 73 are disposed on the right side of the lower portion of UI screen 60. When irrigation amount searching mode button 71 is pressed, the optimum irrigation water amount searching operation as illustrated in FIG. 16 is started. When water stress control (cultivation control) mode button 73 is pressed, the cultivation control operation as illustrated in FIG. 19 to be described later is started. Further, on UI screen 60, display box 72 for displaying a setting value of the search irrigation amount and display box 74 for displaying a setting value of the irrigation amount for cultivation are disposed.

FIG. 18 is a diagram illustrating an example of search irrigation amount input screen 61 pop-up displayed on UI screen 60. In search irrigation amount input screen 61, the search irrigation amount is input and set by unit of milliliter (ml). A touch panel, a numeric keypad, a mobile terminal, and the like can be used for inputting the search irrigation amount.

FIG. 19 is a flow chart illustrating an example of procedure of water stress control (cultivation control) of the first embodiment. This cultivation control operation is a process executed in water stress control period TW3 as illustrated in FIG. 14. For example, when water stress control (cultivation control) mode button 73 is pressed on UI screen 60 as illustrated in FIG. 17, the optimum irrigation amount searching operation is executed.

In the water stress control operation, controller 11 firstly displays a cultivation (control) irrigation amount input screen (not shown) (S61). The input screen of irrigation amount for cultivation is pop-up displayed on UI screen 60 similar to the search irrigation amount input screen.

Controller 11 determines whether or not the input of the irrigation amount for cultivation is completed in the input screen of irrigation amount for cultivation (S62). The irrigation amount for cultivation represents the appropriate irrigation amount calculated in the searching process of optimum irrigation amount searching period TW2 (that is, the flow chart as illustrated in FIG. 16. In a case where the input of the irrigation amount for cultivation is completed, controller 11 returns to step S61 and continues to display the input screen of irrigation amount for cultivation.

On the other hand, when the input of the irrigation amount for cultivation is completed, controller 11 drips the water of the irrigation amount for cultivation (S63). Controller 11 displays the predicted descent time and the cultivation irrigation scheduled time up to the lower limit value of target range Bw (S64). Note that, the cultivation irrigation scheduled time is set to be the same as the predicted descent time, or the time near the predicted descent time.

Controller 11 determines whether or not the irrigation amount for cultivation is changed (S65). In a case where the irrigation amount for cultivation is not changed, controller 11 proceeds to the process of step S68. On the other hand, in a case where the irrigation amount for cultivation is changed, controller 11 displays the input screen of irrigation amount for cultivation again (S66). Controller 11 determines whether or not the input of the irrigation amount for cultivation is completed on the input screen of irrigation amount for cultivation (S67). In the case where the input of the irrigation amount for cultivation is completed, controller 11 returns to step S66 and continues to display the input screen of irrigation amount for cultivation.

On the other hand, when the input of the irrigation amount for cultivation is completed, controller 11 determines whether or not the cultivation irrigation scheduled time has come (S68). In a case where the cultivation irrigation scheduled time has come, controller 11 returns to the process of step S64. When the cultivation irrigation scheduled time has come, controller 11 drips the water of the irrigation amount for cultivation (S69). Controller 11 determines whether or not the cultivation control is completed (S30). In a case where the cultivation control is not completed, controller 11 returns to the process of step S64. On the other hand, in the case where the cultivation control is completed, controller 11 completes the present operation.

Next, a water stress profile for applying the water stress to the plant will be described. FIG. 20A to FIG. 20D are graphs schematically illustrating an example of the water stress profile. In water stress profile pf1 as illustrated in FIG. 20A, the irrigation is performed such that the water content index (that is, standardized pixel average water content index Dw) is fluctuated between the upper limit value and the limit value target range Bw (the range of the target water content). That is, the irrigation with the irrigation amount which reaches the upper limit value of target range Bw is performed at the timing of the lower limit value of target range Bw. In this case, the water stress is small.

In water stress profile pf2 as illustrated in FIG. 20B, the irrigation is performed by the lower limit value of target range Bw, and the peak of standardized pixel average water content index Dw falls in the middle of target range Bw such that the fluctuation of standardized pixel average water content index Dw is reduced. In this case, the water stress is slightly small.

In water stress profile pf3 as illustrated in FIG. 20C, after standardized pixel average water content index Dw falls down to an wilting point, a large amount of irrigation is performed, and after standardized pixel average water content index Dw rises until it exceeds the value of 1, it falls down again to the wilting point, and the irrigation is performed in the same manner. In this case, there is no water stress in an area where standardized pixel average water content index Dw exceeds the value of 1, and the water stress is large in the vicinity of the wilting point. This water stress profile pf3 is used, for example, in a case where the water content index is changed at flowering and fruiting season of the plant in another stage or the weather is changed.

In water stress profile pf4 as illustrated in FIG. 20D, after standardized pixel average water content index Dw falls down to the wilting point, the irrigation is performed with the irrigation amount that reaches the upper limit value of target range Bw, and when standardized pixel average water content index Dw reached the upper limit value of target range Bw, and then reaches the lower limit value of target range Bw again, the irrigation with the irrigation amount that reaches the upper limit value of target range Bw is performed.

Such operations are alternately repeated. In this case, when standardized pixel average water content index Dw is in the vicinity of the wilting point, the water stress becomes larger, and when standardized pixel average water content index Dw is in the vicinity of the lower limit value of target range Bw, the water stress becomes smaller. Note that, these water stress profiles are an example, and other water stress profiles can be applied.

As described above, in plant detection camera 1 according to the first embodiment, first beam source 13 of plant detection camera 1 performs optical scanning so that the near infrared light (reference light) of the first wavelength (905 nm), which has a characteristic in which light tends not to be absorbed in water is radiated toward leaf PT3 of plant PT. Second beam source 15 of plant detection camera 1 performs optical scanning so that the near infrared light (reference light) of the second wavelength (1550 nm), which has a characteristic easily absorbed by water is radiated toward leaf PT3 of plant PT. Threshold level setter/water content index detector 27a calculates a total sum of the water content index of one leaf, which is the total sum of the reflection intensity ratio $\Sigma$ Ln $(I_{905}/I_{1550})$, and the pixel average water content index based on the reflection light of 905 nm reflected on the entire irradiation position of leaf PT3 and the reflection light of 1550 nm reflected on the entire irradiation position of leaf PT3. Controller 11 displays a graph representing the time-serial change of the water content contained in leaf PT3 of plant PT from the start to the end of the measurement period on UI screen 60 of monitor 50. When viewed from first beam source 13 and second beam source 15, white reference substrate bd (background material) which covers a back surface of leaf PT3 of plant PT is disposed on leaf PT3 of plant PT.

As such, according to plant detection camera 1, it is possible to quantitatively and time-serially suggest the change of the water content contained in the plant by displaying the graph representing the time-serial change of the water content contained in leaf PT3 of plant PT on UI screen 60 of monitor 50. In addition, according to the time-serial change of standardized pixel average water content index Dw contained in leaf PT3 displayed on UI screen 60 of monitor 50, plant detection camera 1 can teach the user the timing of the irrigation to leaf PT3 and the irrigation amount. The user can perform the irrigation with an appropriate irrigation amount at an appropriate irrigation timing from the graph displayed on UI screen 60 of monitor 50. Accordingly, it is possible to perform optimum cultivation control when realizing a function of the plant such as a tomato so that yield can be improved and productivity can be enhanced.

Further, according to plant detection camera 1, target range Bw of standardized pixel average water content index Dw (water content) of the plant, an initial value of the water content, and the change of the water content fell down due to the non-irrigation as an example of the application of the stress (for example, water stress) are displayed, and thus the user can grasp the water content of the plant in time series.

In addition, according to plant detection camera 1, it is possible to search the optimum irrigation amount such that standardized pixel average water content index Dw (water content) of the plant is included within target range Bw.

Further, according to plant detection camera 1, both of falling down of the water content by the non-irrigation as an example of application of the stress (for example, water stress) and rising of the water content by the irrigation are displayed, and thus the optimum irrigation amount can be more easily searched such that standardized pixel average water content index Dw is included within target range Bw.

In addition, according to plant detection camera 1, target range Bw of the water content of the plant and the change of the water content by the irrigation for maintaining the water content of the plant within the target range are displayed, and thus the irrigation with the irrigation amount can be easily performed such that the water content of the plant is included within the target range.

Further, according to plant detection camera 1, the water content contained in the plant for which the irrigation is performed by the normal irrigation, and the water content contained in the plant for which the irrigation is performed while applying the water stress are relatively compared to each other, and thus the user can efficiently and highly accurately determine appropriateness of the irrigation amount and the irrigation timing.

Modification Example 1 of First Embodiment

Figure 21:
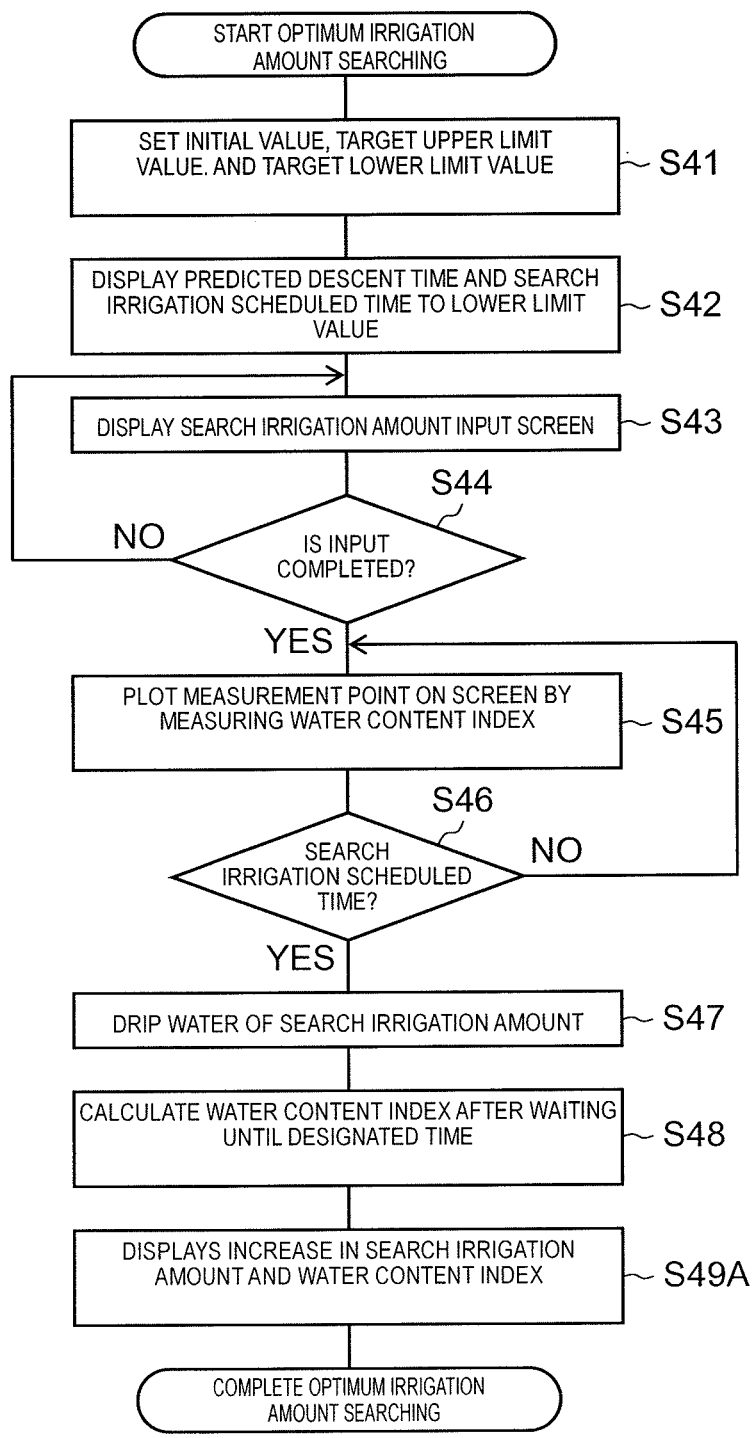
FIG. 21 is a flow chart illustrating an example of searching procedure of the optimum irrigation amount in Modification Example 1 of the first embodiment.

FIG. 21 is a flow chart illustrating an example of searching procedure of the optimum irrigation amount in Modification Example 1 of the first embodiment. The same step processing as in FIG. 16 is denoted by the same step number, and the description thereof will not be repeated. After waiting until the designated time in step S48, controller 11 calculates the water content index, and then displays the search irrigation amount and the increase in standardized pixel average water content index Dw so as to maintain the water content index within target range Bw (within the range) (S49A). Based on these displays, the user can infer the optimum water content. Thereafter, controller 11 completes the present operation.

Second Embodiment

The second embodiment describes a case where positional deviation of leaves occurs due to some influences during the continuous measurement of standardized pixel average water content index Dw in the leaf. In a case where a white reference substrate to which the leaf that is a measurement target is attached tilts due to, for example, strong wind and collision, and the positional deviation of the leaves occurs during the measurement of standardized pixel average water content index Dw in the leaf in time series, standardized pixel average water content index Dw in the leaf measured by the reflection intensity ratio due to the irradiation of the laser beam is rapidly changed.

In a case where the positional deviation of the leaf that is a measurement target occurs, data in which standardized pixel average water content index Dw in the leaf is recorded in time series is fluctuated at once, and the continuity thereof is lost, and thus, in the related art, data of standardized pixel average water content index Dw measured in time series so far is discarded, and the measurement is started again from the beginning. As a result, the acquisition efficiency of measurement data remarkably decreased.

In the second embodiment, even in a case where the positional deviation of the leaves occurs, by effectively utilizing the data measured in time series so far without discarding, the data of standardized pixel average water content index Dw in the leaf can be efficiently acquired and the increase of measurement time is suppressed.

FIG. 22A is a diagram illustrating an example of an image indicating a water content in a leaf that is a measurement target, which is imaged by plant detection camera 1 of the second embodiment, and an example of an image of a leaf before positional deviation. FIG. 22B is a diagram illustrating an example of an image indicating a water content in a leaf that is a measurement target, which is imaged by plant detection camera 1 of the second embodiment, and an example of an image of a leaf after positional deviation. In the drawings, an area which is dark and has a large number of dots is an area having a large water content. Area sc1 which is a darkest area (with the largest water content) exists inside the leaf. Area sc2 which is the next darkest area (with slightly large water content) exists around area sc1. Area sc3 which is a light area (with small water content) exists outside the leaf. In addition, compared with before the positional deviation, the size of area sc1 having a large water content is increased after the positional deviation.

Figure 23:
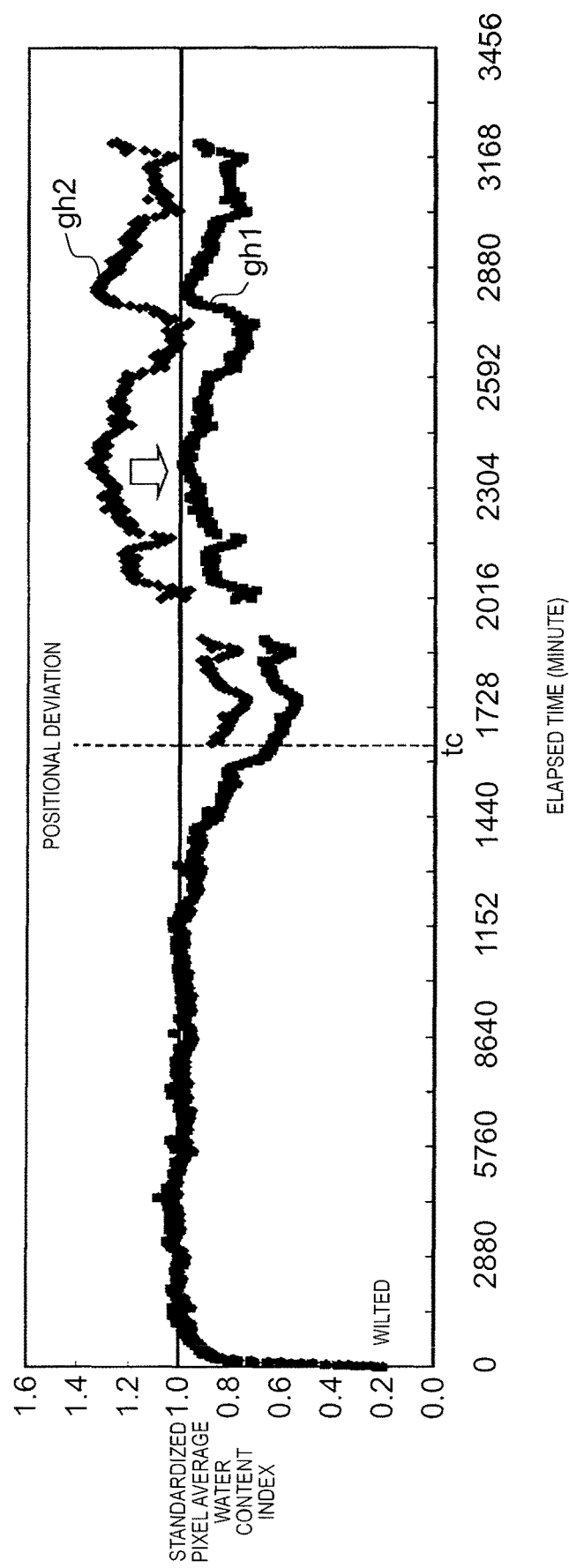
FIG. 23 is a graph illustrating an example of a time change of a standardized pixel average water content index in a water potential control experiment in a case where the positional deviation occurs.

FIG. 23 is a graph illustrating an example of a time change of standardized pixel average water content index Dw in the water potential control experiment in a case where the positional deviation occurs. This vertical axis of the graph indicates the standardized pixel average water content index similar to the first embodiment. The standardized pixel average water content index represents the water potential and represents a value corresponding to the water content contained per pixel in an image of the leaf of the plant. The horizontal axis of the graph represents the elapsed time in minutes.

When the positional deviation of leaves (refer to timing tc in the drawings) occurs, standardized pixel average water content index Dw is changed at once. Standardized pixel average water content index Dw in the leaf in a case where the positional deviation of leaves does not occur is changed as illustrated in graph gh1. On the other hand, standardized pixel average water content index Dw in the leaf in the case where the positional deviation of leaves occurs is changed as illustrated in graph gh2.

In the second embodiment, even in the case where the positional deviation of the leaves occurs, by performing the correction based on the following consideration, the data of standardized pixel average water content index Dw before the positional deviation of the leaves is effectively utilized, and the data of standardized pixel average water content index Dw in time series is acquired so as to maintain the continuity with the data of standardized pixel average water content index Dw after the positional deviation of the leaves.

In the following consideration, it is assumed that leaves are tilted as the positional deviation of the leaves. In this case, changing an angle as the leaves are tilted in a pan direction or a tilt direction corresponds to changing the thickness of the leaf as seen from the camera.

The water content (in other words, water potential) in the leaf is water amount contained in the leaf is proportional to standardized pixel average water content index Dw. Further, as described above, standardized pixel average water content index Dw is calculated by summing the reflection intensity ratio Ln ($I_{905}/I_{1550}$) and the number of pixels occupying green (G) out of the number of pixels constituting the invisible light image of the leaf or the number of pixels constituting the visible light captured image of the leaf.

It is known that the reflection intensity ratio Ln ($I_{905}/I_{1550}$) is substantially proportional to (correlated with) leaf thickness t, as represented by Expression (3) based on known Lambert Beer's law. In Expression (3), α is an absorption coefficient of water, t is a leaf thickness. C is water concentration, and β is a scattering loss term.

$$\text{Ln}(I_{905}/I_{1550}) = \alpha \cdot t \cdot C + \beta \quad (3)$$

In summary, the water content (water potential) in the leaf is represented by a linear function of standardized pixel average water content index Dw having leaf thickness t as a gradient (slope). That is, the slope of the water content in the leaf is changed with leaf thickness t.

As described above, from the fact that the change in the angle of the leaf due to the positional deviation corresponds to the change in the slope due to leaf thickness t, it is possible to obtain the data of standardized pixel average water content index Dw before the positional deviation by multiplying coefficient Q (correction coefficient) corresponding to the change (the change in the slope due to the leaf thickness t) in the leaf angle by the data of standardized pixel average water content index Dw after the positional deviation.

As a result, the data of standardized pixel average water content index Dw obtained in time series before and after the positional deviation can maintain the continuity. Here, since the acquisition of the water content immediately before and after the positional deviation is performed within a short time, the substantial water content is not changed between before and after the positional deviation.

In detail, a correction example of standardized pixel average water content index Dw before and after the positional deviation will be described. FIG. 24 is a table indicating an example of the standardized pixel average water content index before and after positional deviation correction in time series. In this table, in the graph illustrated in FIG. 23, in a case where the positional deviation occurs at the elapsed time of 16250 minutes (time 17:10), standardized pixel average water content index Dw before correction and standardized pixel average water content index Dw after correction are indicated. Here, coefficient Q corresponding to the change in the angle of the leaf is calculated by controller 11 as an example of the coefficient calculation unit, and specifically, the value is 0.7303 (=0.6416/0.8785).

Figure 25:
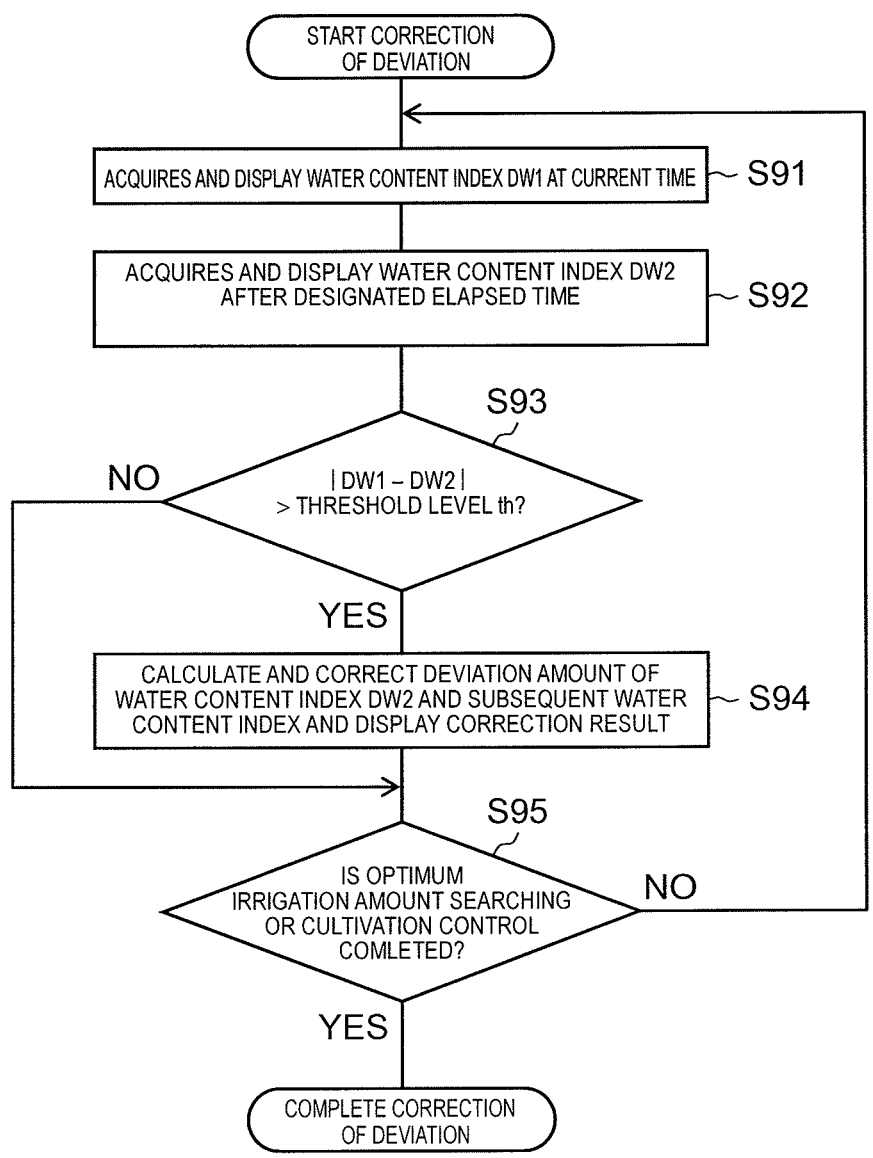
FIG. 25 is a flow chart illustrating an example of correction procedure of the positional deviation of second embodiment.

FIG. 25 is a flow chart illustrating an example of correction procedure of the positional deviation of second embodiment. Plant detection camera 1 of the second embodiment has substantially the same configuration as that of the first embodiment. The same reference numerals are used for the same constituent elements as those of the first embodiment, and a description thereof will not be repeated.

Controller 11 acquires and displays standardized pixel average water content index Dw1 at a current time on UI screen 60 (S91). Controller 11 acquires and displays standardized pixel average water content index Dw2 after designated elapsed time (for example, after 30 minutes) (S92). The designated elapsed time corresponds to a measurement interval.

Controller 11 determines whether or not the difference between standardized pixel average water content index Dw1 and standardized pixel average water content index Dw2 exceeds threshold level th (S93). This threshold level th is used for the determination of the value which is assumed to change standardized pixel average water content index Dw due to the positional deviation of the leaves.

Here, threshold level th is set in advance. At the time of setting threshold level th, controller 11 displays a deviation determining threshold level input screen (not shown). The user inputs threshold level th to the deviation determining threshold level input screen in order to determine that the positional deviation occurs. When the input is completed, controller 11 displays this input value and accepts the setting of threshold level th.

In a case where the difference between standardized pixel average water content index Dw1 and standardized pixel average water content index Dw2 does not exceed threshold level th, that is, in a case where it is assumed that the positional deviation of the leaves does not occur, controller 11 proceeds the process to step S95. On the other hand, in a case where the difference between standardized pixel average water content index Dw1 and standardized pixel average water content index Dw2 exceeds threshold level th, controller 11 determines that the positional deviation occurs, and displays the values of standardized pixel average water content index Dw2 and subsequent standardized pixel average water content index Dw on UI screen 60 by correcting the deviation amount (S94).

After that, controller 11 determines whether to complete the optimum irrigation amount searching control, to complete the cultivation control, or not to complete the cultivation control (S95). In the case where the optimum irrigation amount searching control is not completed, and the cultivation control is not completed, controller 11 returns to the process of step S91. On the other hand, in the case where the optimum irrigation amount searching control is completed, or the cultivation control is completed, controller 11 completes the present operation.

In this way, in plant detection camera 1 of second embodiment, controller 11 as an example of the detection unit detects the positional deviation of the plant. In a case where the positional deviation of the plant is detected, controller 11 calculates coefficient Q (correction coefficient) multiplied by the water content index after positional deviation based on the water content index in before and after the positional deviation. Controller 11 corrects the positional deviation amount by multiplying coefficient Q by the water content index after the positional deviation, and displays the result corrected such that water content index before the positional deviation and the water content index after the positional deviation maintain the continuity on UI screen 60 of monitor 50.

As a result, even in a case where the positional deviation of the leaves occurs, it is possible to maintain the continuity of standardized pixel average water content index Dw in the leaf measured in time series. Accordingly, the measured standardized pixel average water content index Dw in the leaf can be meaningfully and effectively utilized without being wasted. This makes it possible to efficiently acquire data of standardized pixel average water content index Dw in the leaf in time series, and suppress the increase in the measurement time of standardized pixel average water content index Dw even in a case where the positional deviation occurs on the way.

Modification Example 1 of Second Embodiment

In the second embodiment, the positional deviation of the leaves is determined based on whether or not the difference of standardized pixel average water content index Dw exceeds threshold level th; however, in Modification Example describes a case where the positional deviation of the leaves is physically detected.

Figure 26:
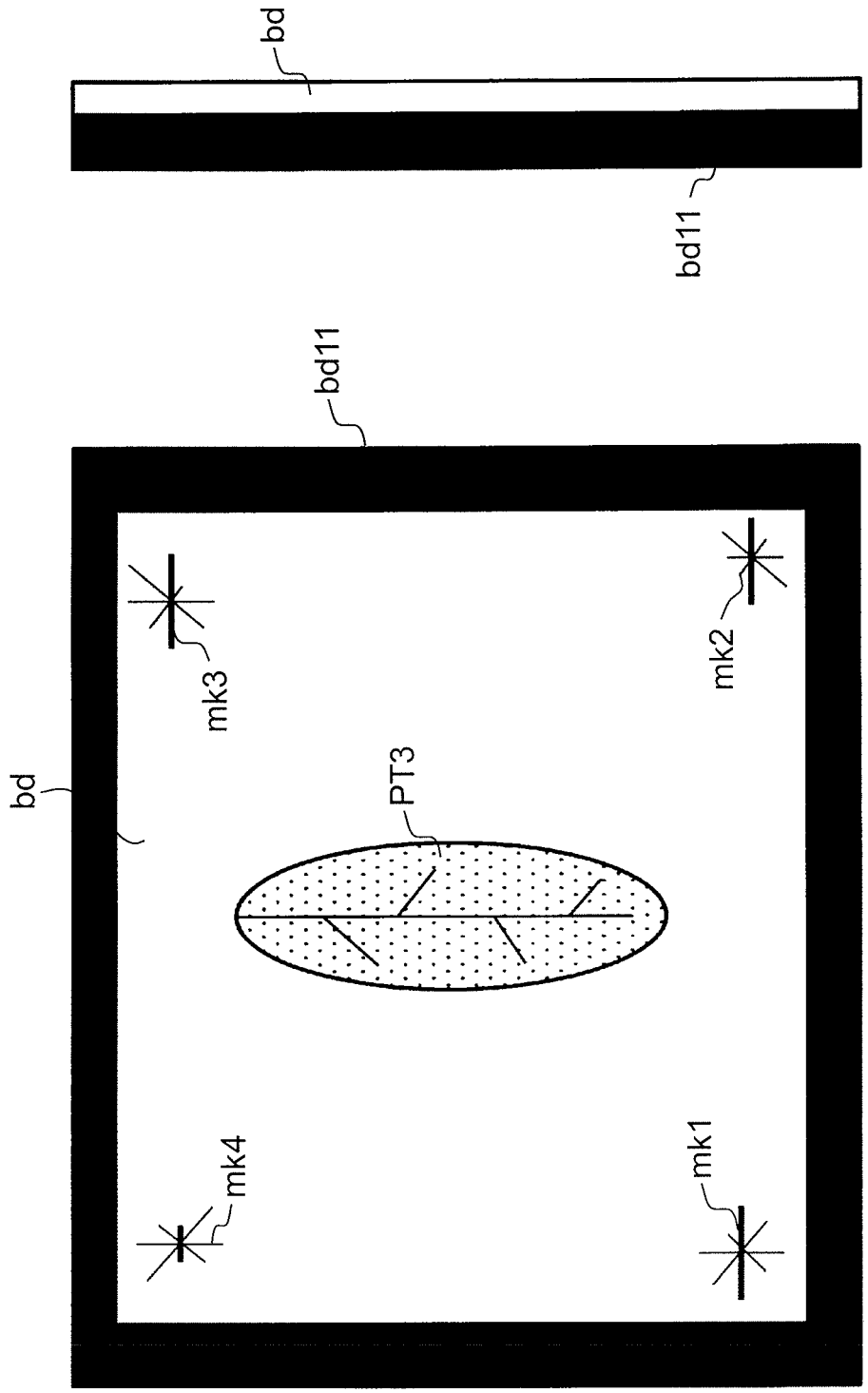
FIG. 26A is a diagram illustrating a white reference substrate used for detecting the positional deviation in Modification Example 1 of the second embodiment, and a front view of the white reference substrate.
FIG. 26B is a diagram illustrating the white reference substrate used for detecting the positional deviation in Modification Example 1 of the second embodiment, and a side view of the white reference substrate as illustrated in FIG. 26A.

FIG. 26A is a diagram illustrating white reference substrate bd used for detecting the positional deviation in Modification Example 1 of the second embodiment, and a front view of white reference substrate bd. FIG. 26B is a diagram illustrating white reference substrate bd used for detecting the positional deviation in Modification Example 1 of the second embodiment, and a side view of white reference substrate bd as illustrated in FIG. 26A.

At the periphery of white reference substrate bd, frame bd 11 of black rectangle having a shape like a picture frame is provided. In addition, marks mk 1 to mk 4 of rice marks are drawn at four corners of the surface (front surface) of white reference substrate bd. Also, leaf PT3 is attached to the center of the surface of white reference substrate bd.

When imaging leaf PT3 attached to white reference substrate bd with plant detection camera 1, parallelism between white reference substrate bd and the finder of plant detection camera 1 is obtained by aligning black frame bd 11 with a finder frame. By imaging white reference substrate bd in this state, each distance between marks mk 1 to mk 4 is compared with the reference distance registered in advance. This reference distance is a distance between marks mk 1 to mk 4 imaged in a case where white reference substrate bd is set to be parallel to plant detection camera 1. In a case where each distance between marks mk 1 to mk 4 is shorter than the reference distance, it is determined that white reference substrate bd is tilted to cause the positional deviation.

For example, it is found that as the distance between mark mk 1 and mark mk 4 is shorter than the reference distance, a tilt angle is larger. It is found that as the distance between mark mk 1 and mark mk 2 is shorter than the reference distance, a pan angle is larger.

In this way, it is possible to physically detect positional deviation of the leaves and to measure the positional deviation amount. Furthermore, by registering coefficient Q corresponding to the measured positional deviation amount, when performing the process of multiplying the data of standardized pixel average water content index Dw after the positional deviation, there is no need to use data of standardized pixel average water content index Dw before and after correction. Therefore, the processing load can be reduced.

Modification Example 2 of Second Embodiment

Figure 27:
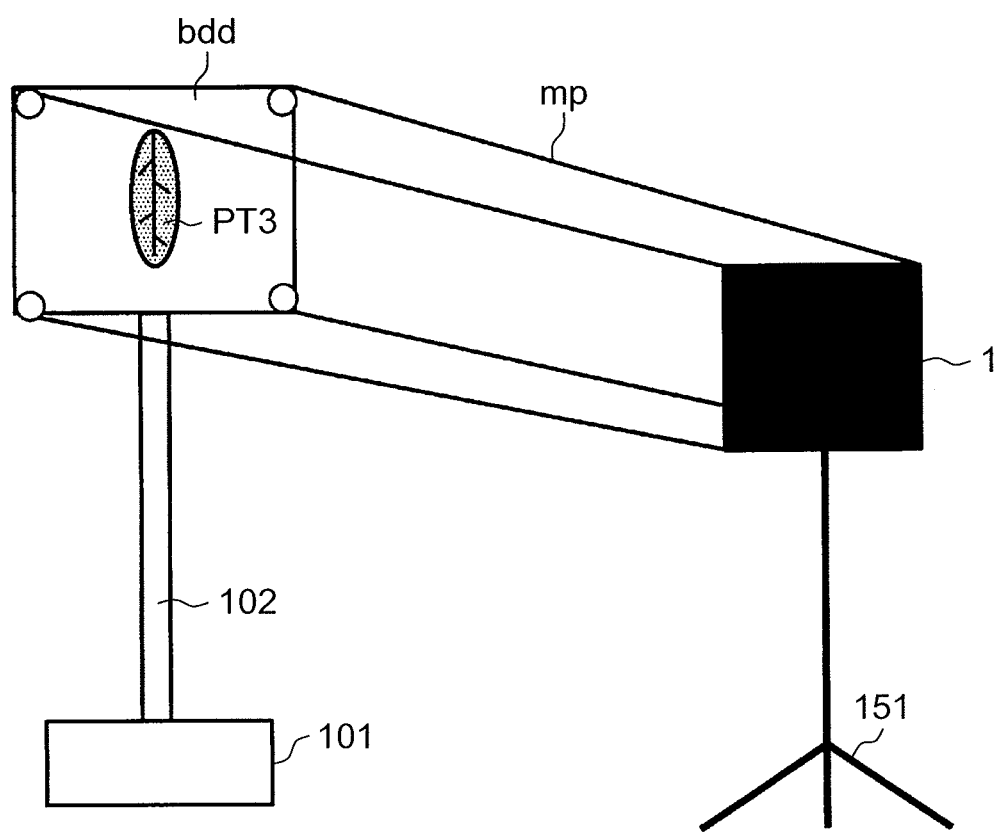
FIG. 27 is a diagram illustrating an example of mechanical disposition of the white reference substrate and the plant detection camera in Modification Example 2 of the second embodiment.

FIG. 27 is a diagram illustrating an example of mechanical disposition of white reference substrate bdd and plant detection camera 1 in Modification Example 2 of the second embodiment. White reference substrate bdd is mounted as a stand on bar 102 standing on base 101. Plant detection camera 1 is fixed to tripod 151. Further, white reference substrate bdd is mechanically connected and fixed to plant detection camera 1 by connecting member mp such as a wire or a bar. In the case where the positional deviation occurs on white reference substrate bdd, the change is transferred to plant detection camera 1 as it is. For example, in the case where large positional deviation occurs, a large change occurs in an image imaged by plant detection camera 1.

In a case where the degree of correlation of images imaged in time series becomes equal to or smaller than a threshold value, that is, in a case where the similarity between the previous frame image and the current frame image is significantly deteriorated, plant detection camera 1 may determine that the positional deviation occurs on white reference substrate bd. As a result, it is possible to relatively easily detect the positional deviation of white reference substrate bd.

In addition, a method for detecting the positional deviation is not limited to the above method. For example, plant detection camera 1 may be equipped with an acceleration sensor for sensing impact. When the positional deviation occurs on white reference substrate bdd, the change of white reference substrate bdd is transferred to plant detection camera 1 via connecting member mp.

In a case where the impact is detected by the acceleration sensor mounted on plant detection camera 1, it may be detected that the positional deviation occurs on white reference substrate bdd.

Third Embodiment

In the first embodiment, for example, as illustrated in FIG. 15, when the irrigation is performed to leaf PT3 that is an observation target, in the process that the standardized pixel average water content index is increased, but is decreased based on the subsequent non-irrigation, the irrigation timing is the time when the standardized pixel average water content index is decreased to near the lower limit of target range Bw.

In addition, the water content in the leaf at the next calculation in plant detection camera 1 is obtained by adding the amount of water absorption from the root to the water content in the leaf at the current time and further subtracting the amount of transpiration of the leaf (refer to Expression (2)). Generally, the root absorbs water by irrigation, and the water content in the leaf is increased at the next calculation. However, due to the non-irrigation in a time zone between the irrigation timing and the next irrigation timing, the amount of transpiration of the leaf during this time zone is fluctuated depending on the environmental conditions (for example, temperature and humidity). However, plant detection camera 1 of the first embodiment does not consider controlling the amount of transpiration in consideration of the environmental conditions surrounding the leaf.

Therefore, in the following third embodiment, consideration is given to the environmental conditions (for example, temperature and humidity) surrounding the leaf that determine the amount of transpiration of the leaf, and description of plant detection camera 1 instructing maintenance or change of the environmental conditions surrounding leaf PT3 in plastic greenhouse VGH in order to apply the water stress along the water stress profile including the irrigation timing and the like according to the user's preference for obtaining high sugar content and high yield will be given of an example of plant detection camera 1. Note that, since the configuration of plant detection camera 1 of the third embodiment is the same as that of plant detection camera 1 of the first embodiment, explanation of the same description will be omitted and different contents will be described.

Figure 31:
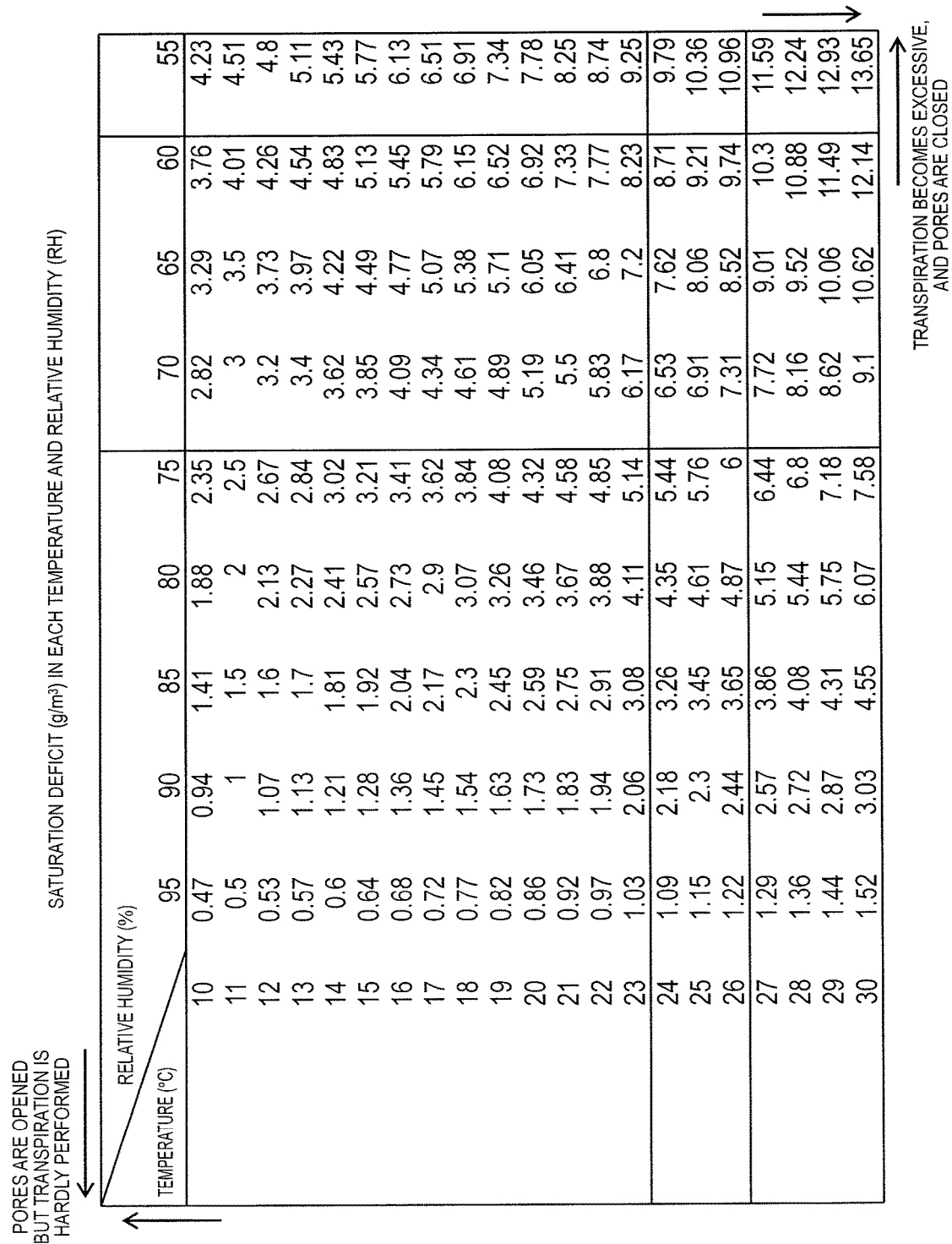
FIG. 31 is an explanatory diagram illustrating an example of relationship between temperature, relative humidity, and a saturation deficit.
Figure 32:
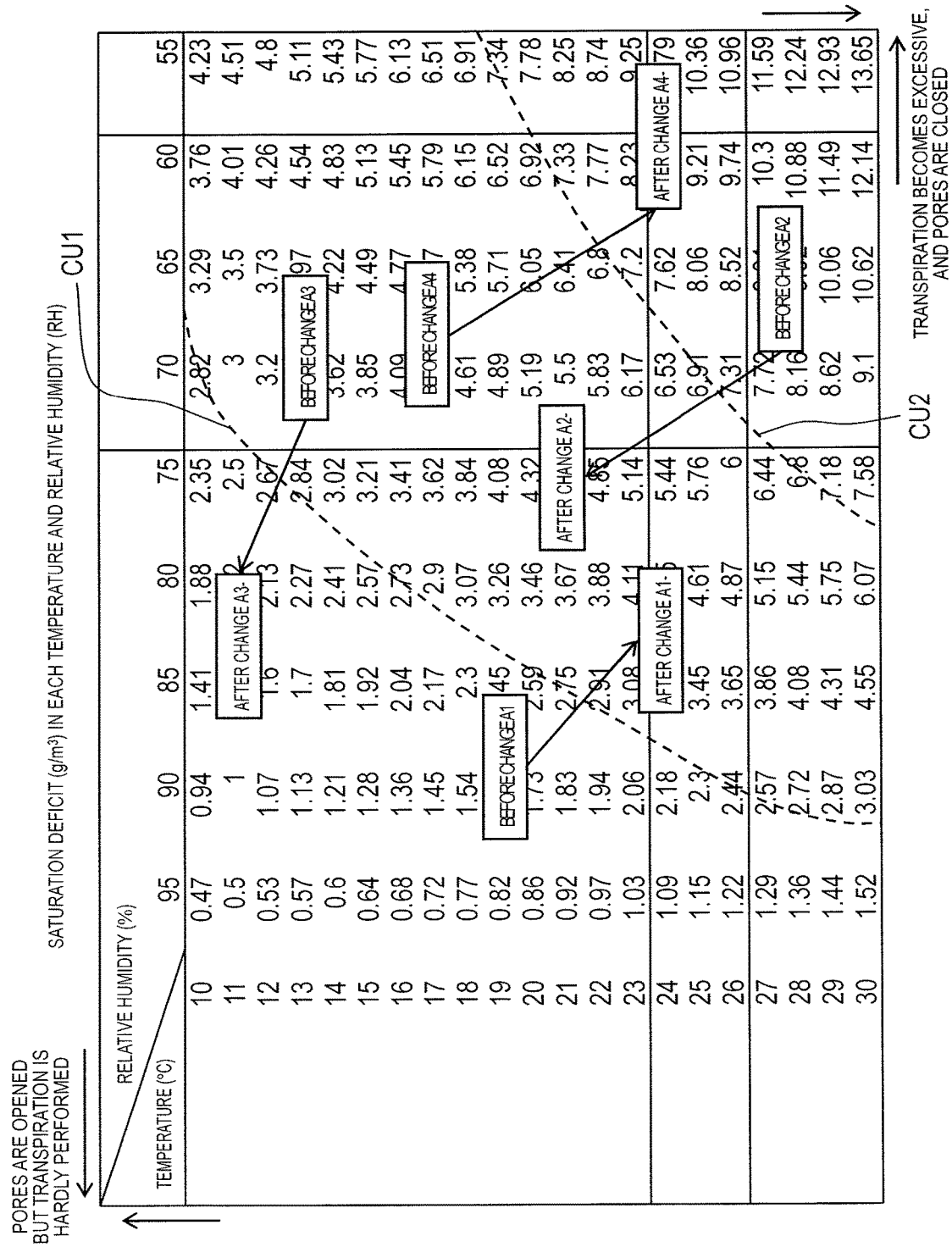
FIG. 32 is an explanatory diagram illustrating an example of change of transpiration of leaves by changing the temperature and the relative humidity.
Figure 33B:
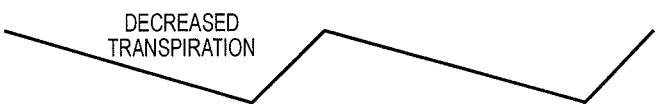
FIG. 33B is a schematic view illustrating an example of a water stress profile based on the transpiration of leaves by changing the temperature and the relative humidity.
Figure 33C:
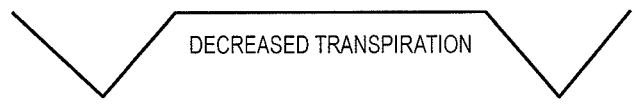
FIG. 33C is a schematic view illustrating an example of a water stress profile based on the transpiration of leaves by changing the temperature and the relative humidity.
Figure 33D:
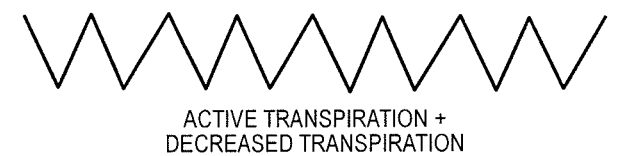
FIG. 33D is a schematic view illustrating an example of a water stress profile based on the transpiration of leaves by changing the temperature and the relative humidity.

FIG. 31 is an explanatory diagram illustrating an example of relationship between temperature, relative humidity, and a saturation deficit. FIG. 32 is an explanatory diagram illustrating an example of change of transpiration of leaves by changing the temperature and the relative humidity. FIG. 33A to FIG. 33D are schematic views illustrating an example of a water stress profile based on the transpiration of leaves by changing the temperature and the relative humidity. FIG. 33A to FIG. 33D schematically illustrate the time-serial changes of the standardized pixel average water content index or the total sum of the standardized water content index.

When the environmental conditions (for example, temperature and humidity) surrounding leaf PT3 are changed, as illustrated in FIG. 31, the saturation deficit of leaf PT3 is fluctuated. With this, the amount of transpiration of leaf PT3 is changed. More specifically, when the ambient temperature of leaf PT3 is decreased and the ambient humidity of leaf PT3 is increased, the saturation deficit becomes smaller, and leaf PT3 opens the pores but the transpiration is hardly performed. When the ambient temperature of leaf PT3 is increased and the ambient humidity of leaf PT3 is decreased, the saturation becomes larger and the transpiration becomes excessive, so that leaf PT3 closes the pores so as not to lose water. In general, it is said that the suitable saturation for active photosynthesis of leaf PT3 is 3 to 7 (g/m$^3$), and the temperature and the humidity at which the saturation deficit in a range surrounded by dashed line CU1 and dashed line CU2 as illustrated in FIG. 32 can be obtained are preferable as the environmental conditions surrounding leaf PT 3.

(1) State of Before change A1 in FIG. 32→State of After change A1– in FIG. 32

When this state change occurs, the temperature is increased and the humidity is decreased, but since the saturation deficit is included in the range suitable for the photosynthesis of leaf PT3, the transpiration of leaf PT3 becomes active. In other words, as the amount of transpiration of the leaf represented by Expression (2) is increased, slope-a illustrated in FIG. 15 becomes larger and the irrigation point is hastened. Accordingly, plant detection camera 1 instructs control device 200 so that the temperature and the humidity at which the saturation deficit in the state of after change A1– can be obtained, and thereby the slope-a illustrated in FIG. 15 becomes larger and the irrigation point is hastened.

(2) State of Before change A2 in FIG. 32→State of After change A2– in FIG. 32

When this state change occurs, the temperature is decreased and the humidity is increased, but since the saturation deficit is included in the range suitable for the photosynthesis of leaf PT3, the transpiration of leaf PT3 becomes active. In other words, as the amount of transpiration of the leaf represented by Expression (2) is increased, slope-a illustrated in FIG. 15 becomes larger and the irrigation point is hastened.

Accordingly, plant detection camera 1 instructs control device 200 so that the temperature and the humidity at which the saturation deficit in the state of after change A2– can be obtained, and thereby the slope-a illustrated in FIG. 15 becomes larger and the irrigation point is hastened.

(3) State of Before change A3 in FIG. 32→State of After change A3– in FIG. 32

When this state change occurs, the temperature is decreased and the humidity is increased, but since the saturation deficit is not included in the range suitable for the photosynthesis of leaf PT3, the transpiration of leaf PT3 is deteriorated. In other words, as the amount of transpiration of the leaf represented by Expression (2) is decreased, slope-a illustrated in FIG. 15 becomes smaller and the irrigation point is delayed. Accordingly, plant detection camera 1 instructs control device 200 so that the temperature and the humidity at which the saturation deficit in the state of After change A3– can be obtained, and thereby the slope-a illustrated in FIG. 15 becomes smaller and the irrigation point is delayed.

(4) State of Before change A4 in FIG. 32→State of After change A4– in FIG. 32

When this state change occurs, the temperature is increased and the humidity is decreased, but since the saturation deficit is not included in the range suitable for the photosynthesis of leaf PT3, the transpiration of leaf PT3 is deteriorated. In other words, as the amount of transpiration of the leaf represented by Expression (2) is increased, slope-a illustrated in FIG. 15 becomes larger and the irrigation point is delayed.

Accordingly, plant detection camera 1 instructs control device 200 so that the temperature and the humidity at which the saturation deficit in the state of after change A4– can be obtained, and thereby the slope-a illustrated in FIG. 15 becomes smaller and the irrigation point is delayed.

Accordingly, as illustrated in 33A, plant detection camera 1 can instruct control device 200 to control the ambient temperature and the humidity so as to obtain a water stress profile in which the slopes at the time of decreasing and increasing the standardized pixel average water content index or the total sum of the standardized water content index are set to be a predetermined value.

In addition, as illustrated in 33B, plant detection camera 1 can instruct control device 200 to control the ambient temperature and the humidity so as to obtain a water stress profile in which the slope at the time of decreasing the standardized pixel average water content index or the total sum of the standardized water content index becomes gentle and the slope at the time of increasing is the same as the slope at the time of increasing in FIG. 33A. In this case, as the slope at the time of decreasing the standardized pixel average water content index or the total sum of the standardized water content index becomes smaller, the irrigation timing interval becomes longer as compared with the irrigation timing in FIG. 33A.

Further, as illustrated in 33C, plant detection camera 1 can instruct control device 200 to control the ambient temperature and the humidity so as to obtain a water stress profile in which the standardized pixel average water content index or the total sum of the standardized water content index is not increased and decreased in a certain period. In this case, as the transpiration of leaf PT3 is decreased in a certain period, the irrigation timing interval becomes longer as compared with the irrigation timing in FIG. 33A.

In addition, as illustrated in 33D, plant detection camera 1 can instruct control device 200 to control the ambient temperature and the humidity so as to obtain a water stress profile in which the slopes at the time of decreasing and increasing the standardized pixel average water content index or the total sum of the standardized water content index are larger than the slopes at the time of decreasing and increasing in FIG. 33A. In this case, as the transpiration of leaf PT3 becomes active, decreased, or violently fluctuated, the irrigation timing becomes shorter than the irrigation timing in FIG. 33A.

Figure 34:
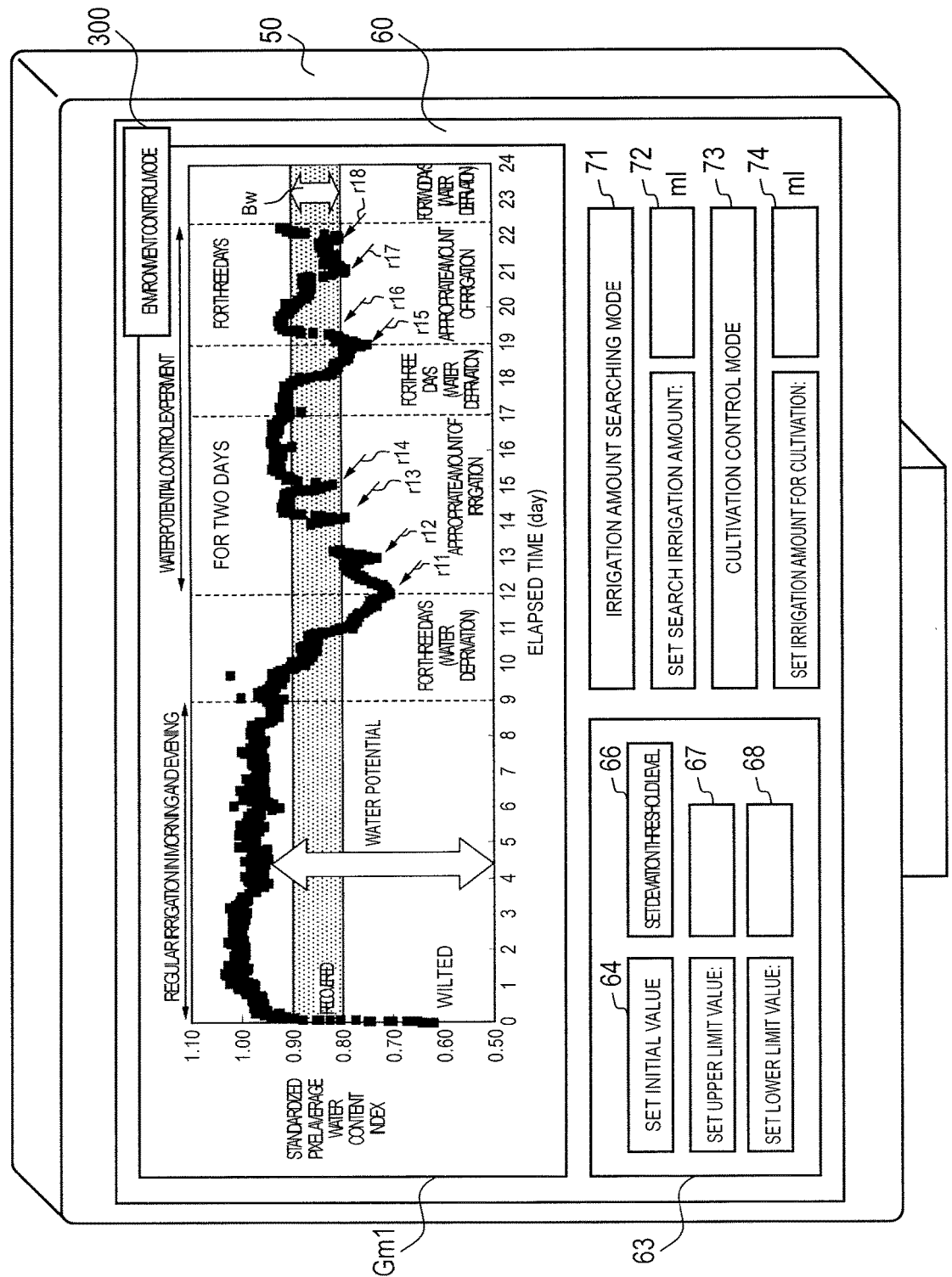
FIG. 34 is a diagram illustrating another example of a user interface (UI) screen relating to water potential control.
Figure 35:
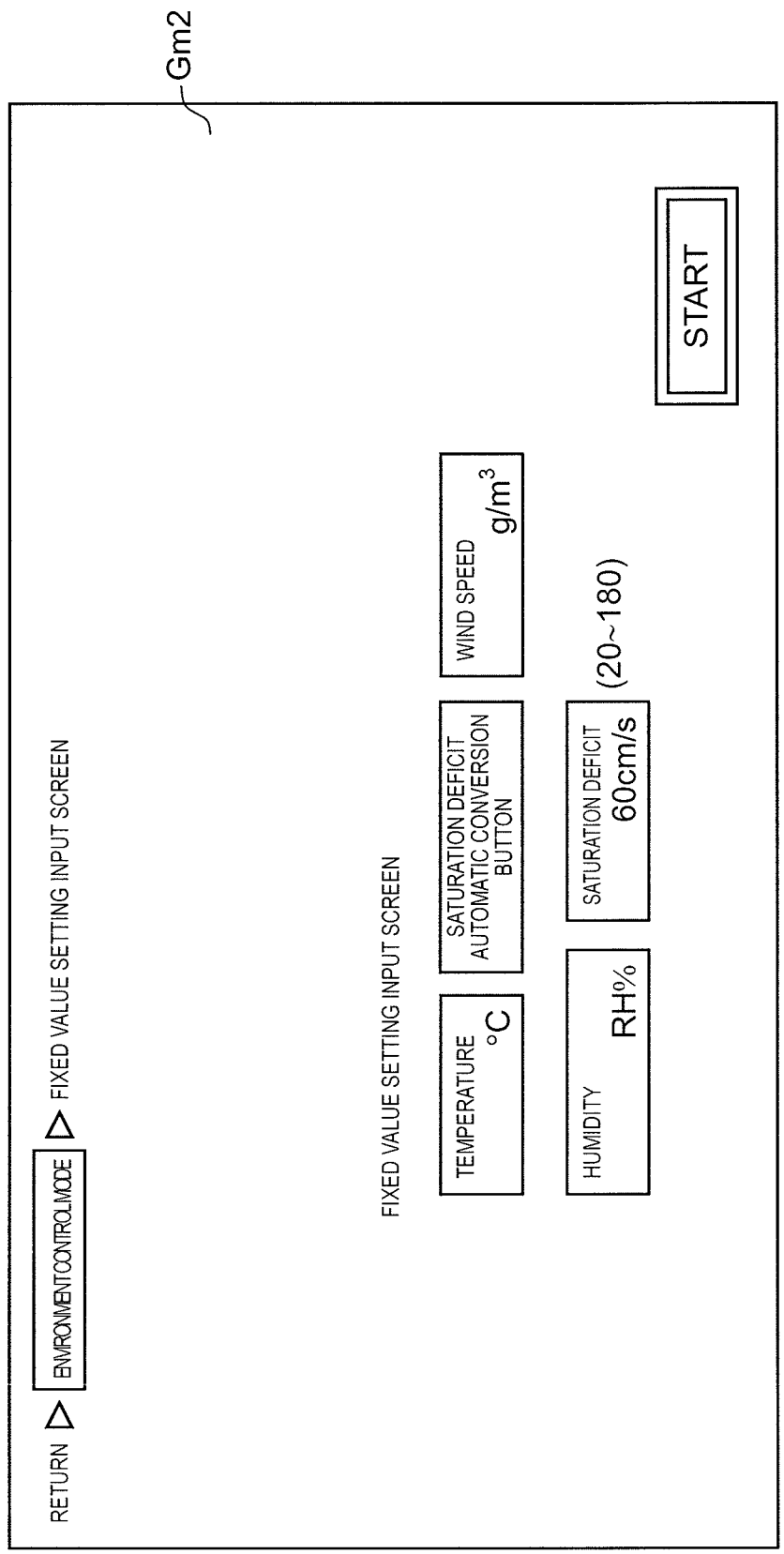
FIG. 35 is a diagram illustrating an example of a fixed value setting input screen of an environmental control mode designated in the UI screen illustrated in FIG. 34.
Figure 36:
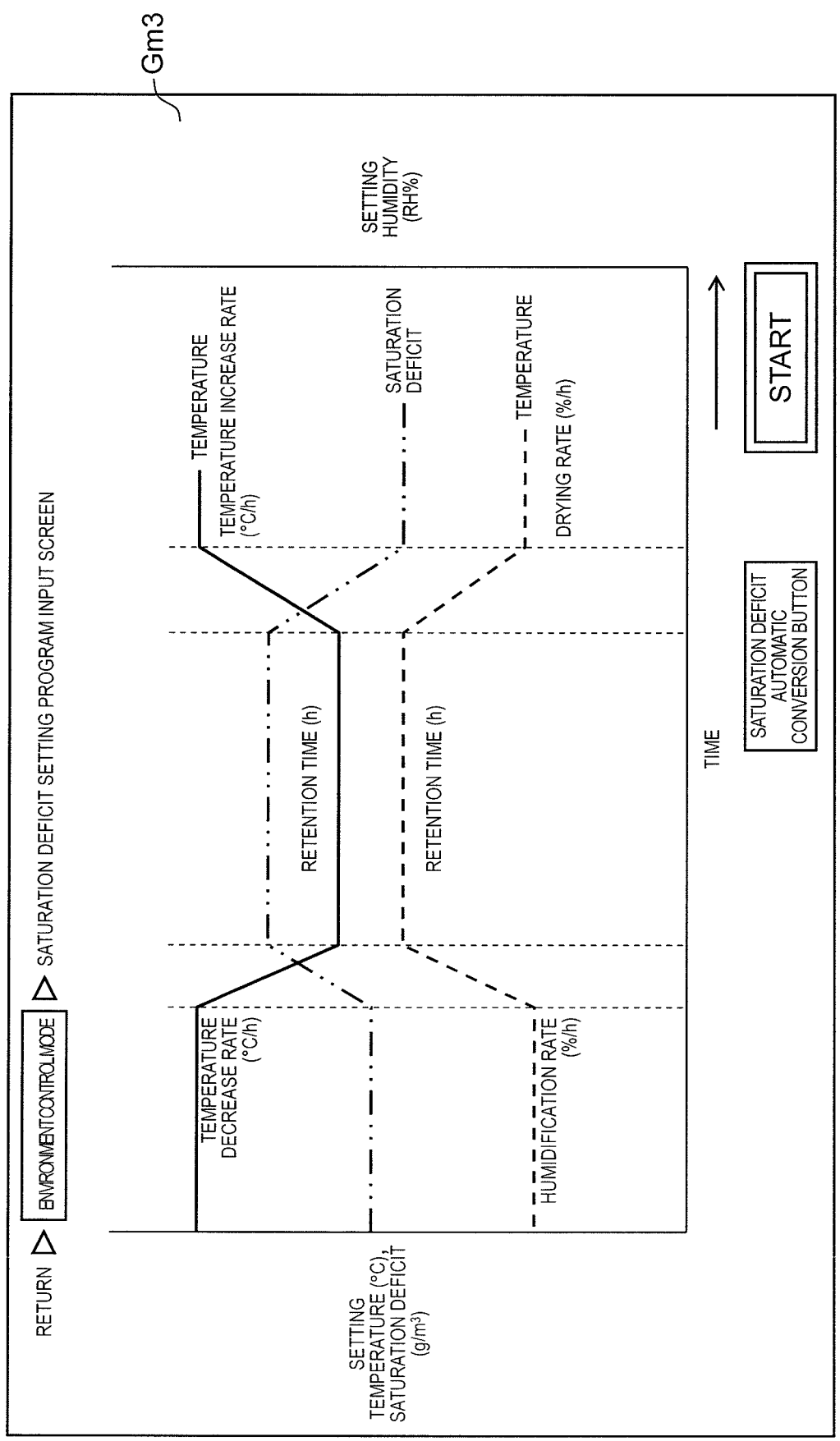
FIG. 36 is a diagram illustrating an example of a saturation deficit setting program input screen of an environmental control mode designated in the UI screen illustrated in FIG. 34.

FIG. 34 is a diagram illustrating another example of a user interface (UI) screen relating to water potential control. FIG. 35 is a diagram illustrating an example of a fixed value setting input screen of environment control mode 300 designated in UI screen 60 illustrated in FIG. 34. FIG. 36 is a diagram illustrating an example of a saturation deficit setting program input screen of an environment control mode designated in UI screen 60 illustrated in FIG. 34.

The difference between UI screen 60 in FIG. 34 and UI screen 60 in FIG. 17 will be described, and the same reference numerals will be given to the same items, and description thereof will not be repeated. A button of environment control mode 300 for controlling the environmental conditions (for example, temperature and humidity) surrounding leaf PT3 that is an observation target is provided on UI screen 60 in FIG. 34. When this button of environment control mode 300 is pressed by the user's operation, controller 11 of plant detection camera 1 displays fixed value setting input screen Gm2 as illustrated in FIG. 35 or the saturation deficit setting program input screen as illustrated in FIG. 36 on monitor 50.

On fixed value setting input screen Gm2 as illustrated in FIG. 35, an input area for each of the temperature (° C.), the humidity (RH %), the wind speed (cm/s), and the saturation deficit ($g/m^3$) is provided so as to obtain a certain saturation deficit ($g/m^3$), and a saturation deficit automatic conversion button for automatically calculating the saturation deficit is also provided. In FIG. 35, for example, 60 cm/s is input such that the wind speed becomes a certain value. Note that, it is possible to input the value of the wind speed, for example, 20 to 180 cm/s according to the performance of air conditioner 227.

The saturation deficit automatic conversion button is pressed after inputting the temperature and the humidity, controller 11 calculates the saturation deficit so as to display the value of the calculation result in the input area of the saturation deficit. When this calculated value or the saturation deficit value desired by the user is input and designated, and the start button is pressed, controller 11 transmits an environmental control instruction for obtaining the saturation deficit value designated surrounding leaf PT3 that is an observation target to control device 200. The environmental control instructions may include only a target saturation deficit value or may include not only the saturation deficit value but also the temperature and the humidity at which the saturation deficit value thereof can be obtained. When the environmental control instructions are received from plant detection camera 1, control device 200 starts control for each device in plastic greenhouse VGH or maintain the control so as to obtain the saturation deficit value included in the environmental control instruction, the temperature, the humidity, and the saturation deficit value.

In saturation deficit setting program input screen Gm3 as illustrated in FIG. 36, a drawing area with a time change of setting temperature (° C.) and setting humidity (RH %) is provided so that the user can designate arbitrary saturation deficit. In addition, as illustrated in FIG. 36, regarding the setting temperature (° C.), an input area of each of a temperature decrease rate (° C./h), a retention time (h), and a temperature increase rate (° C./h) may be provided. Similarly, regarding the setting humidity (RH %), an input area of each of a humidification rate (%/h), a retention time (h), and a drying rate (%/h) may be provided.

When the saturation deficit automatic conversion button is pressed after the setting temperature and the setting humidity are designated for drawing, controller 11 calculates the saturation deficit, and displays time change of the saturation deficit with a time change of the setting temperature (° C.) and the setting humidity on the same screen. After that, when the start button is pressed by the user's operation, controller 11 transmits an environmental control instruction for obtaining the time change of the saturation deficit value designated for drawing surrounding leaf PT3 that is an observation target to control device 200. The environmental control instructions may include only the time change of the target saturation deficit value or may include not only information on the time change of the saturation deficit value but also information on each time change of the temperature and the humidity at which the saturation deficit value thereof can be obtained. When the environmental control instructions are received from plant detection camera 1, control device 200 starts control for each device in plastic greenhouse VGH or maintain the control so as to obtain the time change of the saturation deficit value included in the environmental control instruction, the setting temperature, the setting humidity, and information on each time change of the saturation deficit value.

In FIG. 36, an example in which both the setting temperature and the setting humidity are changed by the user's operation is described, but the environmental condition for changing at least one of the setting temperature and the setting humidity may be controlled.

Figure 37:
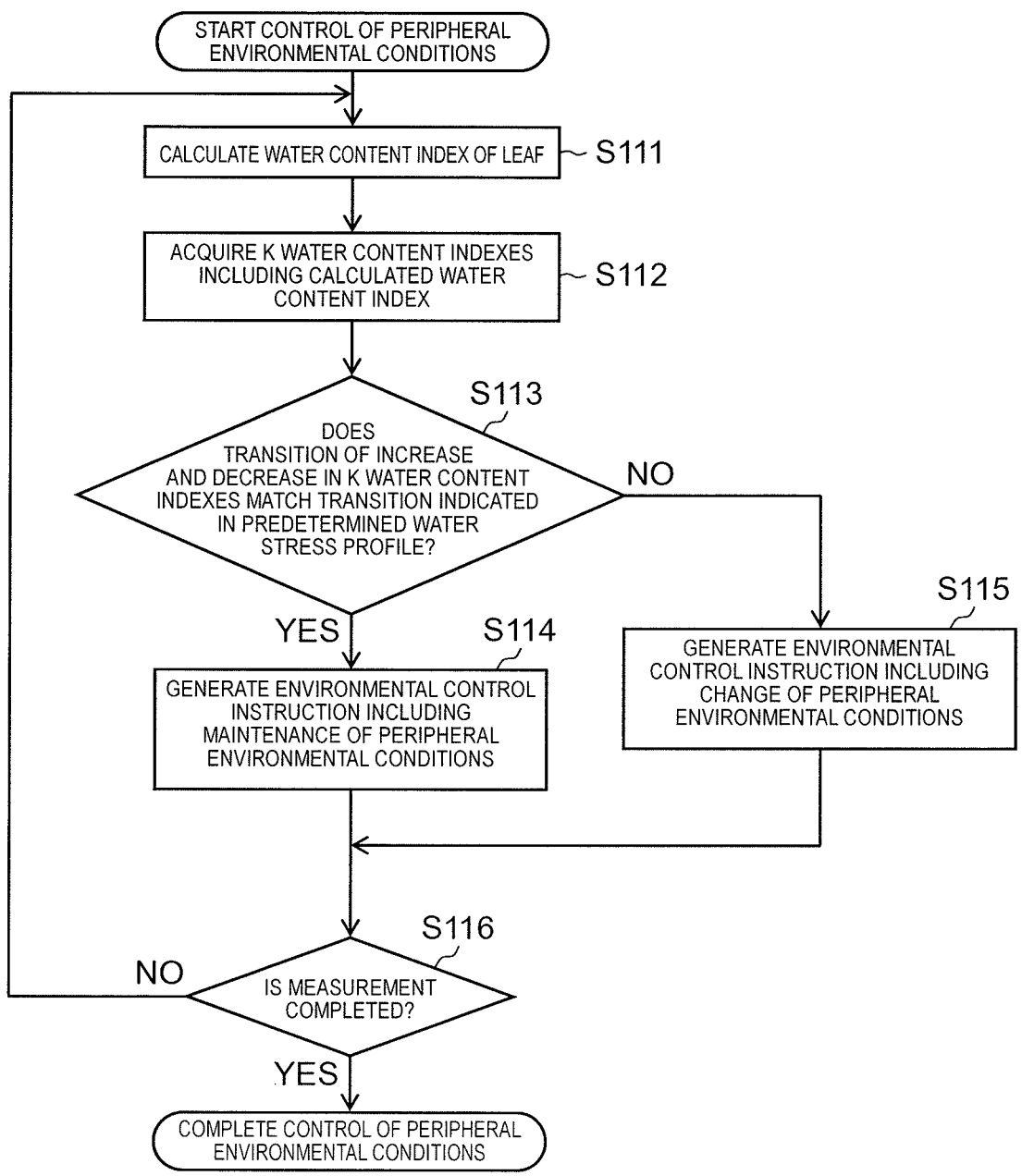
FIG. 37 is a flow chart illustrating an example of control operation procedure of peripheral environmental conditions of a plant of a third embodiment.

Next, operation procedure relating to control of the environmental conditions surrounding plant PT of plant detection camera 1 of the third embodiment will be described with reference to FIG. 37. FIG. 37 is a flow chart illustrating an example of control operation procedure of peripheral environmental conditions of a third embodiment.

In FIG. 37, every time threshold level setter/water content index detector 27a calculates the water content index (standardized pixel average water content index or the total sum of the standardized water content index) of leaf PT3 (S111), controller 11 acquires K (K: natural number of 2 or more) water content indexes including water content index of leaf PT3 calculated in step S111 (S112). That is, controller 11 can recognize the change of the increase and decrease in the water content index of leaf PT 3 by step S112. In a case where only one water content index is acquired, controller 11 does not perform the process after step S112 until two water content indexes are acquired.

Controller 11 determines whether or not the change of the increase and decrease in the K water content indexes matches the change indicated in the predetermined water stress profile (S113). The predetermined water stress profile is any one of the water stress profiles illustrated in, for example, FIGS. 33A to 33D, and is a water stress profile which is necessary for the farmer, who is the user, to increase the sugar content with respect to the growth of plant PT (for example, tomato).

In a case where it is determined that the change of the increase and decrease in the K water content indexes matches the change indicated in the predetermined water stress profile (YES in S113), the controller 11 performs transpiration so that leaf PT3 follows the predetermined water stress profile, generates an environmental control instruction including maintenance of the environmental conditions (for example, temperature and humidity) surrounding the leaf, and transmits a maintenance instruction thereof to control device 200 (S114).

On the other hand, in a case where it is determined that the change of the increase and decrease in the K water content indexes does not match the change indicated in the predetermined water stress profile (No in S113), the controller 11 does not perform transpiration so that leaf PT3 follows the predetermined water stress profile, generates an environmental control instruction including change of the environmental conditions (for example, temperature and humidity) surrounding the leaf, and transmits a maintenance instruction thereof to control device 200 (S115).

In a case where the control of the water potential (that is, the measurement of water content index) is not completed (NO in S116), the process of plant detection camera 1 returns to step S111, and processes of S111 to S115 are repeated until the water potential control (that is, the measurement of the water content index) is completed. On the other hand, when the control of the water potential (that is, measurement of water content index) is completed (YES in S116), the process illustrated in FIG. 37 is completed.

As described above, plant detection camera 1 of the third embodiment is connected to control device 200 for controlling the environmental conditions (for example, temperature and humidity) surrounding leaf PT3 of plant PT that is an observation target, and instructs control device 200 to change or instruct the environmental conditions at the latest water content index calculation time point based on a change of increase and decrease in the water content index (for example, standardized pixel average water content index) as the calculated water content contained in leaf PT 3.

Accordingly, plant detection camera 1 also considers the environmental conditions surrounding the leaf (for example, temperature, humidity) which determines the amount of transpiration of the leaf, and can instruct control device 200 to change the environmental conditions surrounding leaf PT3 in greenhouse VGH in a case where the water content index along the water stress profile according to the user's preference is not obtained. In other words, plant detection camera 1 instructs maintenance or change of the environmental conditions surrounding leaf PT3 in greenhouse VGH, so that plant detection camera 1 support the creation of an environment for applying the water stress along the water stress profile according to the user's preference including the irrigation timing or the like.

Further, plant detection camera 1 displays the change of the increase and decrease in the water content contained in leaf PT3 of plant PT from the start to the end of the control (measurement) of the water potential on monitor 50 in time series. With this, plant detection camera 1 can quantitatively and time-serially suggest the change of the water content contained in the plant by displaying the graph representing the time-serial change of the water content contained in leaf PT3 of plant PT on UI screen 60 of monitor 50.

Further, the environmental condition is the ambient temperature of leaf PT3 that is an observation target, and plant detection camera 1 transmits a change instruction for increasing or decreasing the ambient temperature of leaf PT3 to control device 200. Thus, in response to the change instruction from plant detection camera 1, control device 200 controls each device connected to control device 200 in greenhouse VGH so as to increase or decrease the ambient temperature of leaf PT3. Plant detection camera 1 can obtain the water content index along the water stress profile in response to the user's preference after executing the control of increasing or decreasing the ambient temperature in control device 200.

Further, the environmental condition is the ambient humidity of leaf PT3 that is an observation target, and plant detection camera 1 transmits a change instruction for increasing or decreasing the ambient humidity of leaf PT3 to control device 200. Thus, in response to the change instruction from plant detection camera 1, control device 200 controls each device connected to control device 200 in greenhouse VGH so as to increase or decrease the ambient humidity of leaf PT3. Plant detection camera 1 can obtain the water content index along the water stress profile in response to the user's preference after executing the control of increasing or decreasing the ambient humidity in control device 200.

Further, the environmental condition is the ambient temperature and humidity of leaf PT3 that is an observation target, and plant detection camera 1 transmits a change instruction for decreasing the ambient temperature of leaf PT3 and increasing the ambient humidity thereof, or decreasing the ambient temperature of leaf PT3 and increasing the ambient humidity of leaf PT3 to control device 200. Thus, in response to the change instruction from plant detection camera 1, control device 200 controls each device connected to control device 200 in greenhouse VGH so as to increase the ambient temperature of leaf PT3 and decrease the ambient humidity thereof, or decrease the ambient temperature of leaf PT3 and increase the ambient humidity thereof. Plant detection camera 1 can obtain the water content index along the water stress profile in response to the user's preference after executing the control of increasing or decreasing the temperature and humidity in control device 200.

Further, the environmental conditions are the ambient temperature and humidity of leaf PT3 that is an observation target, and plant detection camera 1 transmits a maintenance instruction for maintaining the ambient temperature and humidity of leaf PT3 to control device 200. Thus, in response to the maintenance instruction from plant detection camera 1, control device 200 controls each device connected to control device 200 in greenhouse VGH so as to maintain the ambient temperature and humidity of leaf PT3. Plant detection camera 1 can obtain the water content index along the water stress profile in response to the user's preference after executing the control of maintaining the temperature and humidity in control device 200.

When viewed from first beam source 13 and second beam source 15, white reference substrate bd which covers a back surface of leaf PT3 of plant PT is disposed on leaf PT3 of plant PT. With this, with plant detection camera 1, it is possible to eliminate influence due to scattered light (light scattered externally) from the peripheral leaf and accurately measure the water content of leaf PT3 even within the foliage in which multiple leaves grow in abundance on a periphery of leaf PT3 that is the measurement target of plant observation.

Although various embodiments are described above while referring to the drawings, needless to say, the present disclosure is not limited to Examples. It is obvious that it is possible for those skilled in the art to conceive of various Modification Examples and Correction Examples within the scope which is set forth in the claims, and therein is naturally understood as belonging to the technical scope of the present disclosure.

Meanwhile, in the description of the cultivation device of the present embodiment described above, the process of non-irrigation such as interrupting irrigation to the plant was performed in order to apply stress (for example, water stress) to the plant (for example, leaf of tomato). However, in the cultivation device of the present embodiment, the method of applying the stress (for example, water stress) to the plant is not limited to the non-irrigation. For example, in order to apply the stress (for example, water stress) to the plant, for example, the cultivation device of the present embodiment may change the electric conductivity of the liquid fertilizer (that is, liquid fertilizer) which is supplied to the plant to be equal to or larger than a predetermined value without using the non-irrigation. In other words, the cultivation device consequently applies water stress equivalent to the non-irrigation to the plant by changing the electric conductivity of the liquid fertilizer so that the electric conductivity of the liquid fertilizer is equal to or larger than a predetermined value. The reason for this is that when the electric conductivity of the liquid fertilizer is changed so as to be equal to or larger than a predetermined value, the root cannot absorb water due to an osmotic pressure relationship (in other words, salt stress is applied), and as a result, the water stress is applied to the plant similar to the case of non-irrigation. Note that, the aforementioned predetermined value is a known value obtained from the experience of the breeder and is the lower limit value of the electric conductivity of the liquid fertilizer when the salt stress is applied to the plant.

INDUSTRIAL APPLICABILITY

The present disclosure is useful as a device for observing water content, a method for observing water content and a cultivation device that can flexibly control the water content contained in a plant including a fruit such as a tomato in consideration of the influence of surrounding environmental conditions.

REFERENCE MARKS IN THE DRAWINGS

1 PLANT DETECTION CAMERA
11 CONTROLLER
11a TIMING CONTROLLER
13 FIRST BEAM SOURCE
15 SECOND BEAM SOURCE
17 BEAM SCANNER
21, 31 IMAGING OPTICS
23, 33 PHOTO DETECTOR
25 SIGNAL PROCESSOR
25a I/V CONVERTER
25b AMPLIFIER
25c COMPARATOR/PEAK HOLD
27 DETECTION PROCESSOR
27a THRESHOLD LEVEL SETTER/WATER CONTENT INDEX DETECTOR
27b MEMORY
27c DETECTION RESULT FILTER
29 DISPLAY PROCESSOR
35 IMAGE SIGNAL PROCESSOR
37 DISPLAY CONTROLLER
50 MONITOR
60 UI (USER INTERFACE) SCREEN
61 SEARCH IRRIGATION AMOUNT INPUT SCREEN
63 SET AREA
64 INITIAL SETTING BUTTON
66 DEVIATION THRESHOLD LEVEL SETTING BUTTON
67, 68 INPUT BOX
71 IRRIGATION AMOUNT SEARCHING MODE BUTTON 71
72, 74 DISPLAY BOX
73 WATER STRESS CONTROL (CULTIVATION CONTROL) MODE BUTTON
200 CONTROL DEVICE
201 I/F
203 INTERNAL CLOCK
205 CALCULATION PROCESSOR
207 STORAGE
211 ENVIRONMENT SENSOR
213, 215 ON-OFF VALVE
217 WATER SUPPLY PUMP
219 SIDE WINDOW
221 VENTILATION DEVICE
223 CEILING CURTAIN
225 SIDE CURTAIN
227 AIR CONDITIONER
1000 PLANT OBSERVATION SYSTEM
ARE AREA
BB BASE
bd, bdd WHITE REFERENCE SUBSTRATE
bd1 APERTURE
bd2 HOLE
bd3, bd4, bd5, bd21 SLIT
bd11 FRAME
Bw TARGET RANGE
gh1, gh2 GRAPH
Gm1 SCREEN FOR MONITORING WATER CONTENT IN LEAF
JG DETERMINER
PT3, PT3t LEAF
LS1 REFERENCE BEAM
LS2 MEASURING BEAM
MT COMMUNICATION TERMINAL
NVSS INVISIBLE LIGHT SENSOR
pf1, pf2, pf3, pf4 WATER STRESS PROFILE
PJ BEAM OUTPUT
TR TIMING SIGNAL FOR BEAM SCANNING
RF BEAM OUTPUT SIGNAL
RV0 AMBIENT LIGHT
RV1, RV2 DIFFUSE REFLECTION LIGHT
VGH GREENHOUSE
VSC VISIBLE LIGHT SENSOR
WF FERTILIZER OR WATER SUPPLY DEVICE

The invention claimed is:
1. A device for observing water content contained in a plant, the device comprising:

a first light source configured to irradiate the plant with a near infrared laser reference beam of a first wavelength having a characteristic in which light tends not to be absorbed in water;

a second light source configured to irradiate the plant with a near infrared laser measuring beam of a second wavelength having a characteristic in which light tends to be absorbed in water;

a processor configured to repeatedly calculate the water content contained in the plant based on reflection light of the near infrared laser reference beam reflected by the plant and reflection light of the near infrared laser measuring beam reflected by the plant, in a certain measurement period; and a display configured to display a time-serial change of the water content, which is contained in the plant from start to end of a measurement period, calculated by the processor, wherein the processor is further configured to detect a positional deviation of the plant, wherein the processor is further configured to calculate a correction coefficient with respect to the water content after the positional deviation based on the water content before and after the positional deviation in a case where the positional deviation of the plant is detected, and wherein the processor corrects the water content after the positional deviation using the correction coefficient and the display displays a correction result.

2. A system for observing water content, the system comprising:

the device of claim 1; and a background material disposed on the plant which covers a back surface of the plant as seen from the first light source and second light source.

3. The system for observing water content of claim 2, wherein the first light source is further configured to irradiate a second plant with the near infrared laser reference beam, wherein the second plant is configured to be periodically irrigated and is a same type as the plant, wherein the second light source is further configured to irradiate the second plant with the near infrared laser measuring beam, wherein the processor is further configured to calculate a second water content contained in the second plant based on reflection light of the near infrared laser reference beam reflected by the second plant and reflection light of the near infrared laser measuring beam reflected by the second plant, in the certain measurement period, and wherein the display is further configured to display a second time-serial change of the second water content, which is contained in the second plant from start to end of the measurement period so as to be compared with the time-serial change of the plant.

4. The system for observing water content of claim 3, further comprising:

a second background material disposed on the second plant which is a same type as that of the background material, the second background material covering a back surface of the second plant as seen from the first light source and second light source.

5. The device for observing water content of claim 1, wherein the display is further configured to display, as the time-serial change of the water content, at least a range of a target water content, a water content of an initial value set as a reference at the start of the measurement period, and a change in the water content falling down based on application of stress to the plant after the initial value is set.

6. The device for observing water content of claim 1, wherein the display is further configured to display, as the time-serial change of the water content, at least a range of a target water content and a change in the water content in a searching period of an irrigation amount to the plant for maintaining the water content within the range.

7. The device for observing water content of claim 6, wherein the display is further configured to display, as the change in the water content in the searching period of the irrigation amount, both of a change in the water content falling down based on application of stress to the plant, and a change in the water content rising based on irrigation to the plant.

8. The device for observing water content of claim 1, wherein the display is further configured to display, as the time-serial change of the water content, a range of a target water content and a change in the water content based on irrigation with an irrigation amount to the plant for maintaining the water content within the range of the target water content.

9. The device for observing water content of claim 1, wherein the processor is connected to an environmental control device configured to control environmental conditions surrounding the plant for controlling an amount of transpiration of water contained in the plant, and the processor is further configured to control the environmental control device to change or maintain the environmental conditions based on at least one of an increase or a decrease in the water content contained in the plant.

10. The device for observing water content of claim 9, wherein the environmental conditions include an ambient temperature of the plant, and wherein the processor is further configured to transmit a change instruction for increasing or decreasing the ambient temperature of the plant to the environmental control device.

11. The device for observing water content of claim 9, wherein the environmental conditions include an ambient humidity of the plant, and wherein the processor is further configured to transmit a change instruction for increasing or decreasing the ambient humidity of the plant to the environmental control device.

12. The device for observing water content of claim 9, wherein the environmental conditions include an ambient temperature and an ambient humidity of the plant, and wherein the processor is further configured to transmit at least one of a first change instruction for increasing the ambient temperature of the plant and decreasing the ambient humidity of the plant, or a second change instruction for decreasing the ambient temperature of the plant and increasing the ambient humidity of the plant to the environmental control device.

13. The device for observing water content of claim 9, wherein the processor is further configured to transmit a maintenance instruction for not changing the environmental conditions to the environmental control device.

14. A cultivation device comprising:

the device for observing water content of claim 1; and a cultivation controller configured to irrigate the plant with a predetermined amount of water based on the time-serial change of the water content calculated by the processor in a certain period of the measurement period.

15. The device for observing water content of claim 1, further comprising:
at least one sensor configured to convert the reflection light of the near infrared laser reference beam reflected by the plant and the reflection light of the near infrared laser measuring beam reflected by the plant to at least one electric signal,
wherein the processor is configured to repeatedly calculate the water content contained in the plant based on the at least one electric signal.

16. The device for observing water content of claim 1, further comprising:
a camera configured to image the plant,
wherein the processor is configured to detect the positional deviation of the plant based on imaging of the plant by the camera.

17. A method for observing water content contained in a plant, the method comprising:
radiating, by a first light source, a near infrared laser reference beam of a first wavelength having a characteristic in which light tends not to be absorbed in water;
radiating, by a second light source, a near infrared laser measuring beam of a second wavelength having a characteristic in which light tends to be absorbed in water;
repeatedly calculating, by a processor, the water content contained in the plant based on reflection light of the near infrared laser reference beam reflected by the plant and reflection light of the near infrared laser measuring beam reflected by the plant, in a certain measurement period; and
displaying, on a display, a time-serial change of the water content contained in the plant calculated from start to end of a measurement period,
wherein the method further comprises:
detecting, by the processor, a positional deviation of the plant;
calculating, by the processor, a correction coefficient with respect to the water content after the positional deviation based on the water content before and after the positional deviation in a case where the positional deviation of the plant is detected; and
correcting, by the processor, the water content after the positional deviation using the correction coefficient, and
wherein the display displays a correction result of the correcting.

18. The method for observing water content of claim 17, further comprising:
connecting a device, including at least the processor, to an environmental control device configured to control environmental conditions surrounding the plant for controlling an amount of transpiration of water contained in the plant; and
instructing, by the processor, the environmental control device to change or maintain the environmental conditions based on an increase or a decrease in the water content contained in the plant.

19. A system for observing water content contained in a plant, the system comprising:
a first light source configured to irradiate the plant with a near infrared laser reference beam of a first wavelength having a characteristic in which light tends not to be absorbed in water;
a second light source configured to irradiate the plant with a near infrared laser measuring beam of a second wavelength having a characteristic in which light tends to be absorbed in water;
at least one processor configured to perform operations, the operations including:
repeatedly calculating the water content contained in the plant based on reflection light of the near infrared laser reference beam reflected by the plant and reflection light of the near infrared laser measuring beam reflected by the plant, in a certain measurement period;
detecting a positional deviation of the plant;
calculating a correction coefficient with respect to the water content after the positional deviation based on the water content before and after the positional deviation in a case where the positional deviation of the plant is detected; and
correcting the water content after the positional deviation using the correction coefficient; and
a display configured to display a time-serial change of the water content, which is contained in the plant from start to end of a measurement period and includes a correction result of the correcting, calculated by the at least one processor.

20. The system for observing water content of claim 19, further comprising:
at least one sensor configured to convert the reflection light of the near infrared laser reference beam reflected by the plant and the reflection light of the near infrared laser measuring beam reflected by the plant to at least one electric signal; and
a camera configured to image the plant,
wherein the at least one processor is configured to repeatedly calculate the water content contained in the plant based on the at least one electric signal, and
wherein the at least one processor is configured to detect the positional deviation of the plant based on imaging of the plant by the camera.

* * * * *